(12) United States Patent
Toyama

(10) Patent No.: US 7,821,723 B2
(45) Date of Patent: Oct. 26, 2010

(54) HIGH POWER ZOOM LENS SYSTEM AND IMAGE PICKUP APPARATUS

(75) Inventor: Nobuaki Toyama, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 159 days.

(21) Appl. No.: 12/274,707

(22) Filed: Nov. 20, 2008

(65) Prior Publication Data
US 2009/0128923 A1 May 21, 2009

(30) Foreign Application Priority Data
Nov. 21, 2007 (JP) .......................... P2007-301645

(51) Int. Cl.
*G02B 15/14* (2006.01)
(52) U.S. Cl. ...................... 359/683; 359/676
(58) Field of Classification Search .................. 359/676, 359/683
See application file for complete search history.

(56) References Cited

U.S. PATENT DOCUMENTS

| | | | |
|---|---|---|---|
| 5,561,560 A | 10/1996 | Tsutsumi | |
| 7,385,766 B2 * | 6/2008 | Ohtake | 359/676 |
| 2006/0132928 A1 | 6/2006 | Nakatani et al. | |

FOREIGN PATENT DOCUMENTS

| DE | 195 08 278 A 1 | 10/1995 |
|---|---|---|
| JP | 3031598 B2 | 2/2000 |
| JP | 2007-219473 | 8/2007 |

OTHER PUBLICATIONS

Extended European Search Report, Mar. 8, 2010.

* cited by examiner

*Primary Examiner*—Scott J Sugarman
(74) *Attorney, Agent, or Firm*—Birch, Stewart, Kolasch & Birch, LLP

(57) ABSTRACT

A high power zoom lens system includes, in order from the object side: a first lens group having a positive refractive power and remaining stationary during zooming; a second lens group having a negative refractive power and moving during zooming; a third lens group and a fourth lens group having a positive refractive power and being movable relative to each other to correct image plane variation accompanied by zooming; and a fifth lens group having a positive refractive power and including an aperture diaphragm, the fifth lens group being used for forming an image. The second lens group and a composite lens group formed by combining the third lens group and the fourth lens group pass simultaneously through −1× magnification points of the groups during zooming from a wide-angle end to a telephoto end. The fourth lens group has at least one aspheric surface.

8 Claims, 64 Drawing Sheets

EXAMPLE 1

EXAMPLE 2

EXAMPLE 3

EXAMPLE 4

EXAMPLE 5

EXAMPLE 6

EXAMPLE 7

EXAMPLE 1

EXAMPLE 1

EXAMPLE 1

EXAMPLE 2

EXAMPLE 2

EXAMPLE 3

EXAMPLE 3

EXAMPLE 3

EXAMPLE 4

EXAMPLE 4

EXAMPLE 4

EXAMPLE 5

EXAMPLE 5

EXAMPLE 5

EXAMPLE 6

EXAMPLE 6

EXAMPLE 6

EXAMPLE 7

EXAMPLE 7

EXAMPLE 7

FIG. 31
EXAMPLE 4
2×
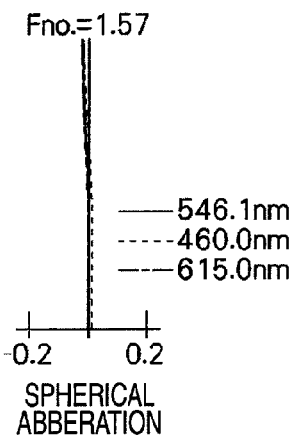
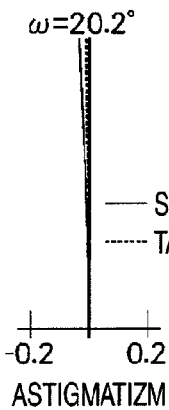
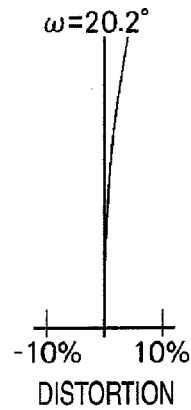
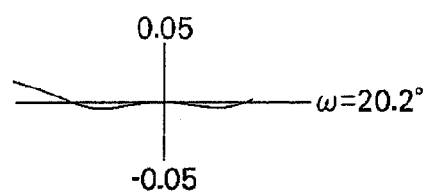
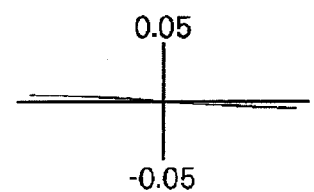
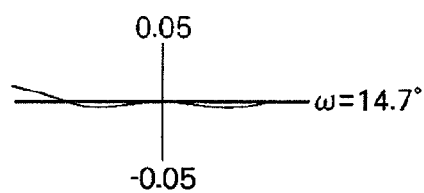
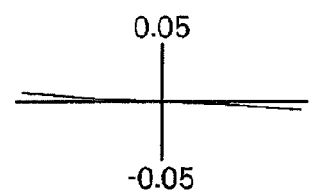
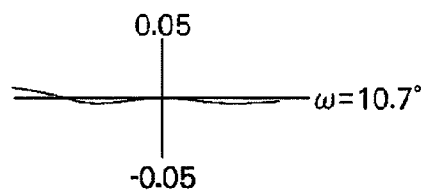
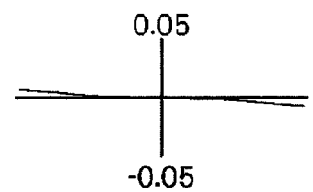
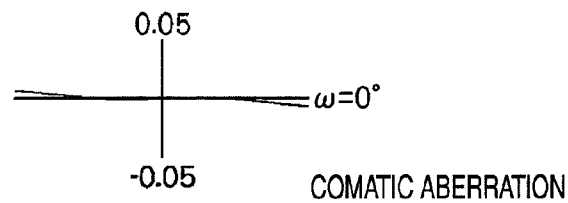
COMATIC ABERRATION

FIG. 36
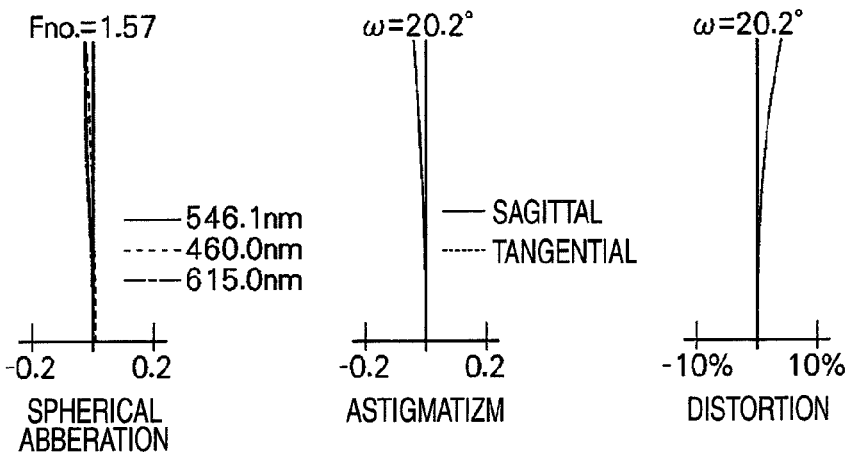
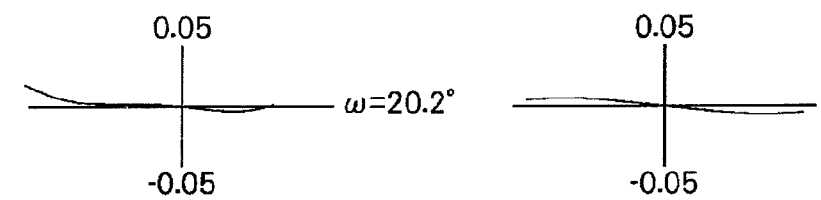
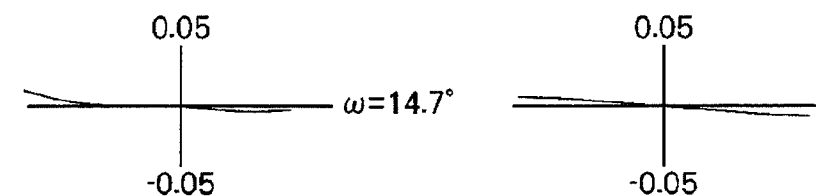
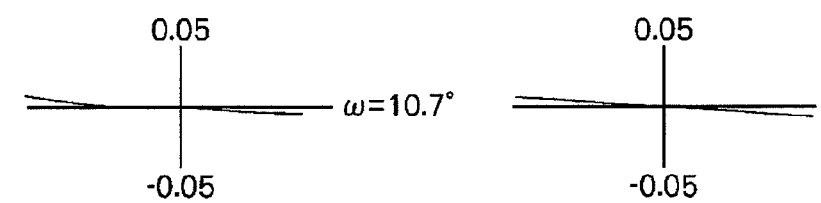
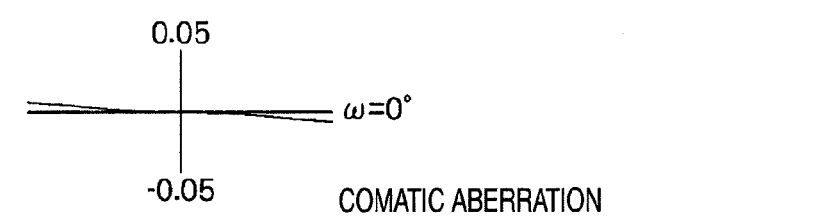

FIG. 40

EXAMPLE 6
1×

Fno.=1.57
— 546.1nm
----- 460.0nm
--- 615.0nm

-0.2  0.2
SPHERICAL ABBERATION

ω=39.8°
— SAGITTAL
----- TANGENTIAL

-0.2  0.2
ASTIGMATIZM

ω=39.8°

-10%  10%
DISTORTION 0.05
—— ω=39.8°
-0.05

0.05

-0.05

0.05
—— ω=29.8°
-0.05

0.05

-0.05

0.05
—— ω=21.9°
-0.05

0.05

-0.05

0.05
—— ω=0°
-0.05

COMATIC ABERRATION

HIGH POWER ZOOM LENS SYSTEM AND IMAGE PICKUP APPARATUS

CROSS-REFERENCE TO RELATED APPLICATIONS

This application is based on and claims priority under 35 USC 119 from Japanese Patent Application No. 2007-301645 filed Nov. 21, 2007; the entire of which are incorporated herein by reference.

BACKGROUND

1. Technical Field

The present invention relates to a high power zoom lens system and an image pickup apparatus, and more particularly to a high power zoom lens system suitable for being mounted on a television camera, a video camera, and the like and an image pickup apparatus having the high power zoom lens system.

2. Related Art

Generally, as zoom lens systems mounted on a television camera, a video camera, and the like, zoom lens systems formed of four groups have been known. An exemplary zoom lens system formed of four groups includes in order from an object side: a first lens group having a positive refractive power; a second lens group having a negative refractive power and serving as a zooming group movable for varying power during zooming; a third lens group having a positive or a negative refractive power and correcting image plane variation accompanied by zooming; and a fourth lens group having a positive refractive power.

Meanwhile, zoom lens systems mounted on a television camera and the like demand good operability, a small size with high performance, and a high zoom ratio. To satisfy the demands, zoom lens systems formed of five lens groups have been proposed. For example, Patent Document 1 (Japanese Patent No. 3031598 corresponding to U.S. Pat. No. 5,561,560) describes a zoom lens system that includes in order from an object side: a first lens group having a positive refractive power and remaining stationary during zooming; a second lens group formed of three groups serving as a movable lens group for zooming; a third lens group; a fourth lens group; an aperture diaphragm; and a fifth lens group used for forming an image. The zoom lens system has 17× zoom ratio, and is able to change a space between the third lens group and the fourth lens group to correct variation of comatic aberration accompanied by zooming by interlocking with movement of the second lens group during zooming.

Recently, it has been required that zoom lens systems mounted on a television camera and the like have high power without change of a total length of the optical system. Particularly, it has been further required that the lens systems have high power of 20× magnification. However, as magnifying power increases, aberration variation accompanied by zooming remarkably deteriorates. Thus, it is hard to achieve a high power while satisfying a constraint condition of the total length of the optical system. In addition, it is also hard to obtain high optical performance in the entire range of zooming by suppressing aberration variation accompanied by zooming.

The invention has been made in consideration of the situation mentioned above, and its object is to provide a high power zoom lens system capable of achieving high power without an increase in the total length of the optical system and marinating excellent optical performance by suppressing variation of spherical aberration and comatic aberration during zooming. In addition, it is also an object of the invention to provide an image pickup apparatus having the high power zoom lens system.

SUMMARY

According to an aspect of the invention, a high power zoom lens system includes, in order from an object side: a first lens group, a second lens group, a third lens group, a fourth lens group and a fifth lens group. The first lens group has a positive refractive power and remains stationary during zooming. The second lens group has a negative refractive power and moving during zooming. The third lens group and the fourth lens group respectively have a positive refractive power and are movable relative to each other to correct image plane variation accompanied by zooming. The fifth lens group has a positive refractive power and including a stop, the fifth lens group being used to form an image. A composite lens group is formed by combining the third lens group and the fourth lens group. The second lens group and the composite lens group pass simultaneously through −1× magnification points of the respective groups during zooming from a wide-angle end to a telephoto end. The fourth lens group has at least one aspheric surface.

In the configuration having the five groups, the high power zoom lens system according to the aspect of the invention employs a so-called floating mode for relatively moving the third lens group and the fourth lens group. Thus, it is possible to satisfactorily correct image plane variation during zooming and satisfactorily suppress variation of spherical aberration and comatic aberration during zooming. In addition, by providing an aspheric lens having a high aberration correction performance to the fourth lens group used for the floating mode, it is possible to effectively suppress occurrence and variation of various aberrations. In this manner, according to the high power zoom lens system of the aspect of the invention, it is possible to embody a zoom lens system capable of achieving miniaturization with a high zoom ratio and suppressing variation of spherical aberration and comatic aberration during zooming.

In the high power zoom lens system according to the aspect of the invention, it is preferred that the fourth lens group has at least, three positive lenses and one negative lens.

In the high power zoom lens system according to the aspect of the invention, it is preferred that the at least one aspheric surface of the fourth lens group have a shape showing that a positive refractive power is gradually reduced from an optical axis toward a periphery of the aspheric surface.

In the high power zoom lens system according to the aspect of the invention, it is preferred that the at least one aspheric surface of the fourth lens group be an object side surface of a positive lens of the fourth lens group closest to an image side.

In the high power zoom lens system according to the aspect of the invention, it is preferred that the third lens group be formed of two or less lenses.

In the high power zoom lens system according to the aspect of the invention, the second lens group may have at least one aspheric surface. In this case, It is preferred that the at least one aspheric surface of the second lens group be a surface of a negative lens of the second lens group closest to the object side.

According to another aspect of the invention, an image pickup apparatus includes: the high power zoom lens system mentioned above; and an image pickup device taking an object image formed by the high power zoom lens system. Examples of the image pickup apparatus include a television camera, a video camera, a surveillance camera, and the like.

Furthermore, if there is no specific description about that in the invention, e-line (wavelength of 546.07 nm) is assumed as a reference wavelength.

According to the aspects of the invention, the zoom lens system is configured to have at least five groups. In the lens system, the configurations of the lens groups are appropriately set. In particular, the third lens group and the fourth lens group are operable to be movable relative to each other during zooming, and the fourth lens group is configured to have the aspheric lens. Thus, it is possible to provide a high power zoom lens system capable of achieving high power without increasing a total length of the optical system and maintaining excellent optical performance by suppressing variation of spherical aberration and comatic aberration during zooming. In addition, it is also possible to provide an image pickup apparatus having the high power zoom lens system.

BRIEF DESCRIPTION OF THE DRAWINGS

FIG. 31 is a diagram illustrating aberrations of the high power zoom lens system according to Example 4 of the invention.

FIG. 36 is a diagram illustrating aberrations of the high power zoom lens system according to Example 5 of the invention.

FIG. 40 is a diagram illustrating aberrations of the high power zoom lens system according to Example 6 of the invention.

DETAILED DESCRIPTION

Hereinafter, embodiments of the invention will be described in detail with reference to the drawings.

Figure 1:
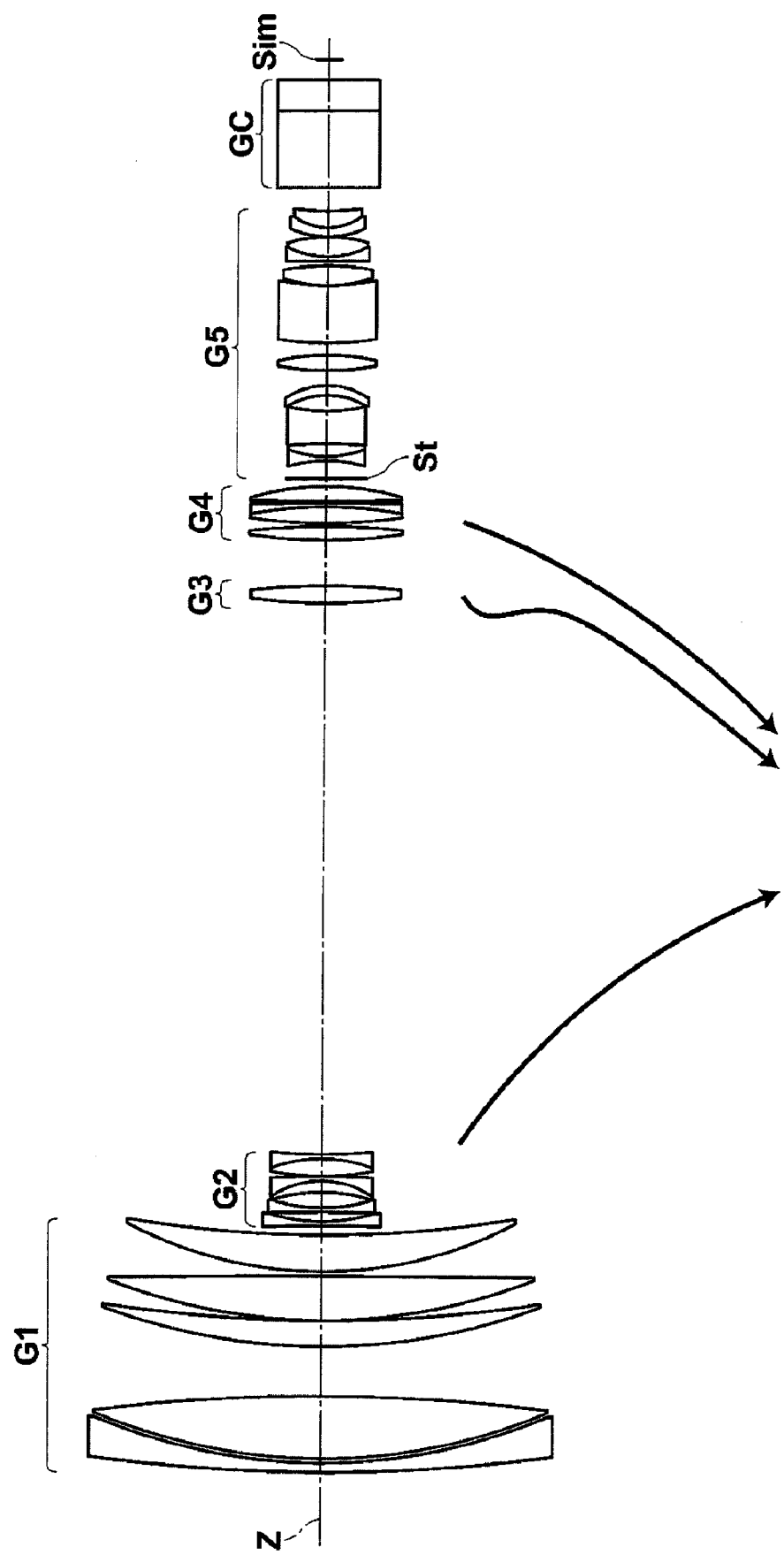
FIG. 1 is a sectional diagram illustrating a lens configuration of a high power zoom lens system according to Example 1 of the invention.

FIG. 1 is a sectional diagram illustrating a configuration of a high power zoom lens system according to an embodiment of the invention, and corresponds to Example 1 to be described later. Furthermore, FIGS. 2 to 7 are sectional diagrams illustrating configurations of the high power zoom lens systems according to other embodiments of the invention, and correspond to high power zoom lens systems according to Examples 2 to 7.

In each of FIGS. 1 to 7, the left side is an object side, and the right side is an image side, there is shown lens arrangement in a state where an object at infinity is in focus at the wide-angle end. In addition, moving loci of movable lens groups during zooming from the wide-angle end to the telephoto end are schematically represented by arrows under the lens arrangement.

Furthermore, the zoom lens system according to each embodiment of the invention can be appropriately used by being mounted on a high-performance television camera, a high-performance video camera, and the like employing, for example, a solid-state image pickup device. For example, the lens system is appropriately used in the telephoto range from the standard of 20× zoom ratio or more.

The high power zoom lens system includes, along an optical axis Z, in order from the object side: a first lens group G1 having a positive refractive power and remaining stationary during zooming; a second lens group G2 having a negative refractive power and moving during zooming; a third lens group G3 and a fourth lens group G4 having a positive refractive power and being movable relative to each other to correct image plane variation accompanied by zooming; and a fifth lens group G5 having a positive refractive power and including an aperture diaphragm St, the fifth lens group G5 being used for forming an image. In addition, the aperture diaphragm St shown in each drawing does not illustrate a shape and a size thereof, but illustrates a position thereof on the optical axis Z.

On an imaging plane (image pickup surface) Sim of the zoom lens system, for example, an image pickup device not shown in the drawings is disposed. Between the fifth lens group G5 and the image pickup surface, various optical members may be disposed in accordance with a configuration of a camera equipped with the lens system. In the exemplary configuration shown in the drawing, a color separating optical system GC including a color separating prism and the like is disposed.

For example, the first lens group G1 may use five-lens configuration including in order from an object side, one negative lens and four positive lenses as shown in FIG. 1.

The second lens group G2, the third lens group G3, and the fourth lens group G4 are movable during zooming, and have a function as zoom groups. The zoom lens system has a configuration of a so-called inner zoom mode of performing zooming by moving not a leading end part of the optical system but a group inside the optical system. In television cameras and video cameras, such an inner zoom mode may be preferably used since it has less change of weight balance and a total length of the optical system during zooming.

In the zoom groups, the second lens group G2 has a function as a variator group, and the third lens group G3 and fourth lens group G4 have a function as compensator groups. More specifically, zooming is performed by moving the second lens group G2 along the optical axis, and correction of image plane variation is performed by moving the third lens group G3 and fourth lens group G4 along the optical axis.

In particular, the zoom lens system employs a so-called floating mode in which the third lens group G3 and the fourth lens group G4 move relatively during zooming. With such a configuration, it is possible to correct image plane variation accompanied by zooming and maintain excellent optical performance by suppressing variation of various aberrations during zooming.

In the zoom lens system, it is preferred that the second lens group G2 and a composite lens group formed by combining the third lens group G3 and the fourth lens group G4 pass simultaneously through −1× magnification points of the groups during zooming from the wide-angle end to the telephoto end. With such a configuration, it is possible to correct longitudinal chromatic aberration, and the configuration is advantageous to achieve high power.

For example, as shown in FIG. 1, the second lens group G2 may use six-lens configuration including in order from an object side: two negative lenses; a cemented lens of positive and negative lenses; and a cemented lens of positive lens and negative lenses.

It is preferred that the second lens group G2 should have at least one aspheric surface. It is also preferred that a negative lens of the second lens group G2 closest to the object side should have the aspheric surface. To provide an aspheric lens to the second lens group G2 movable during zooming is advantageous in aberration correction. Furthermore, the negative lens of the zoom group located closest to the object side is formed as an aspheric lens, and thus it is possible to obtain an improved result in aberration correction.

For example, as shown in FIG. 1, the third lens group G3 may be formed of one positive lens. As seen from the moving loci in FIGS. 1 to 7, during zooming from the wide-angle end to the telephoto end, the third lens group G3 does not always move in one direction from the image side to the object side, but may move in a direction opposite thereto. The third lens group G3 moving in such a manner has great influence on operability. Accordingly, to obtain excellent operability, it is preferred that the third lens group G3 be light in weight.

Hence, it is preferred that the third lens group G3 be formed of a small number of lenses, more specifically, two or less lenses.

Furthermore, the zoom lens system disclosed in Patent Document 1 allows the third lens group and fourth lens group to perform the floating mode. However, the third lens group of the zoom lens system is formed of four to five lenses. Accordingly, as compared with the zoom lens system disclosed in Patent Document 1, the zoom lens system according to the embodiment is able to obtain better operability.

For example, as shown in FIG. 1, the fourth lens group may use four-lens configuration including in order from an object side: a positive lens; a cemented lens of positive and negative lenses; and a positive lens. It is preferred that the fourth lens group G4 be formed of at least, three positive lenses and one negative lens. With such a configuration, it is possible to satisfactorily correct longitudinal chromatic aberration.

Furthermore, it is preferred that the fourth lens group G4 should have at least one aspheric surface. In addition, it is also preferred that the aspheric surface be an object side surface of the positive lens of the fourth lens group G4 closest to the image side. To provide an aspheric lens to the fourth lens group G4 movable during zooming is advantageous in aberration correction. Furthermore, an object side surface of the positive lens of the zoom group located closest to the object side is formed as an aspheric surface, and thus it is possible to obtain an improved result in aberration correction. Particularly, it is possible to satisfactorily correct spherical aberration, comatic aberration, and image field curvature.

Furthermore, it is preferred that the at least one aspheric surface of the fourth lens group G4 should have a shape by which a positive refractive power is gradually reduced from the optical axis toward the periphery of the aspheric surface. Accordingly, the configuration is advantageous to suppress variation of various aberrations during zooming.

The fifth lens group G5 has a function as a relay (master) group. For examples as shown in FIG. 1, the fifth lens group G5 may use eleven-lens configuration. The eleven-lens configuration includes in order from the object side: an aperture diaphragm St; a cemented lens of negative, positive and negative lenses; two positive lenses; a negative lens; a positive lens; a cemented lens of negative and positive lenses; and a cemented lens of negative and positive lenses.

As described above, the zoom lens system according to the embodiment is formed of five groups as a whole, and the configuration of each lens group is appropriately set. In particular, the floating mode for moving relatively the third lens group G3 and the fourth lens group G4 during zooming, and the fourth lens group G4 which is the group of the zoom groups closest to the image side has a aspheric lens. With such a configuration, it is possible to embody a high-performance zoom lens system capable of achieving miniaturization with a high zoom ratio and reducing variation of various aberrations such as spherical aberration and comatic aberration during zooming.

EXAMPLES

Hereinafter, specific numerical examples of high power zoom lens system according to the embodiments will be described.

Example 1

Figure 8A:
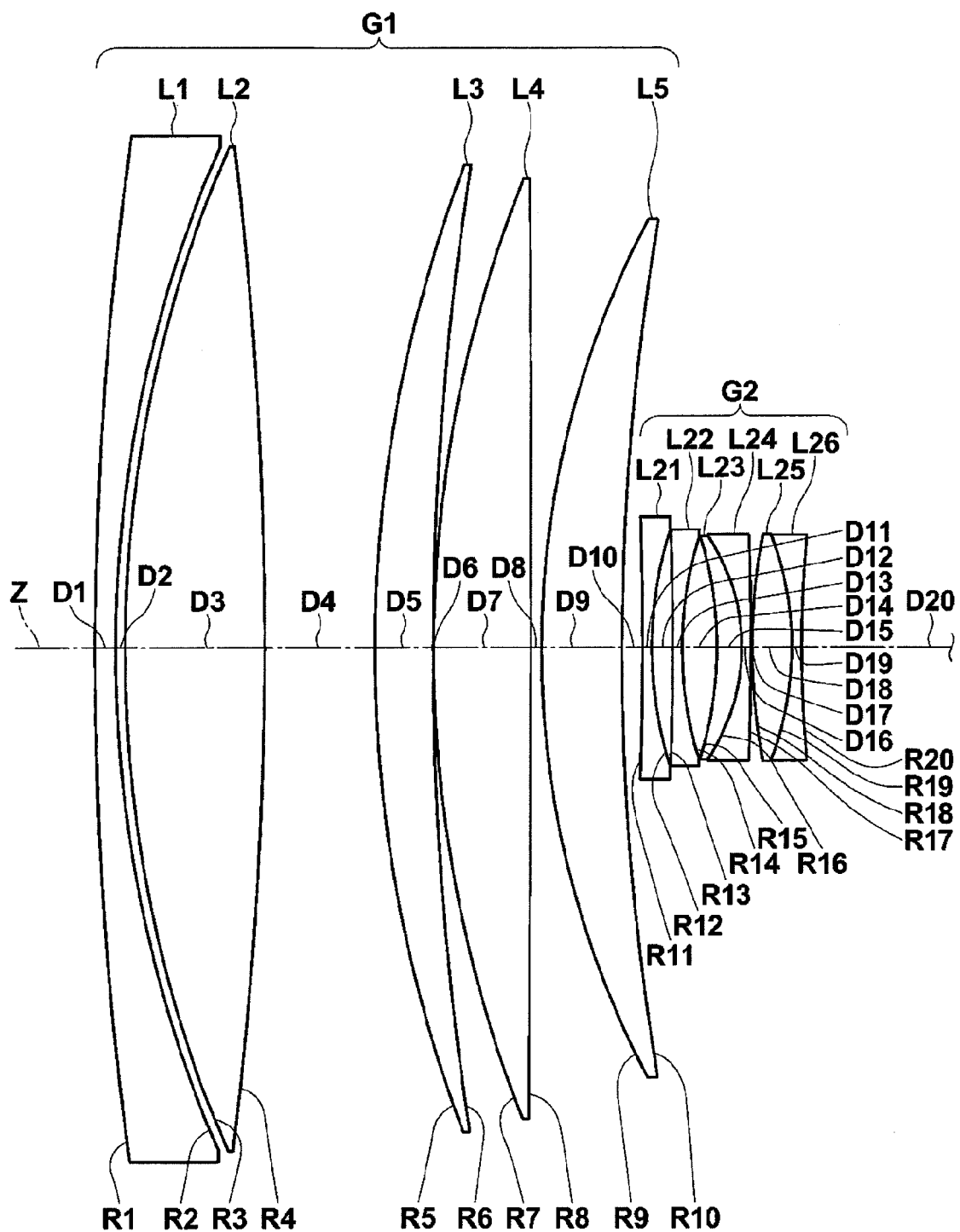
FIG. 8A is a sectional diagram illustrating a detailed configuration of a first lens group and a second lens group of the high power zoom lens system according to Example 1 of the invention.
Figure 8B:
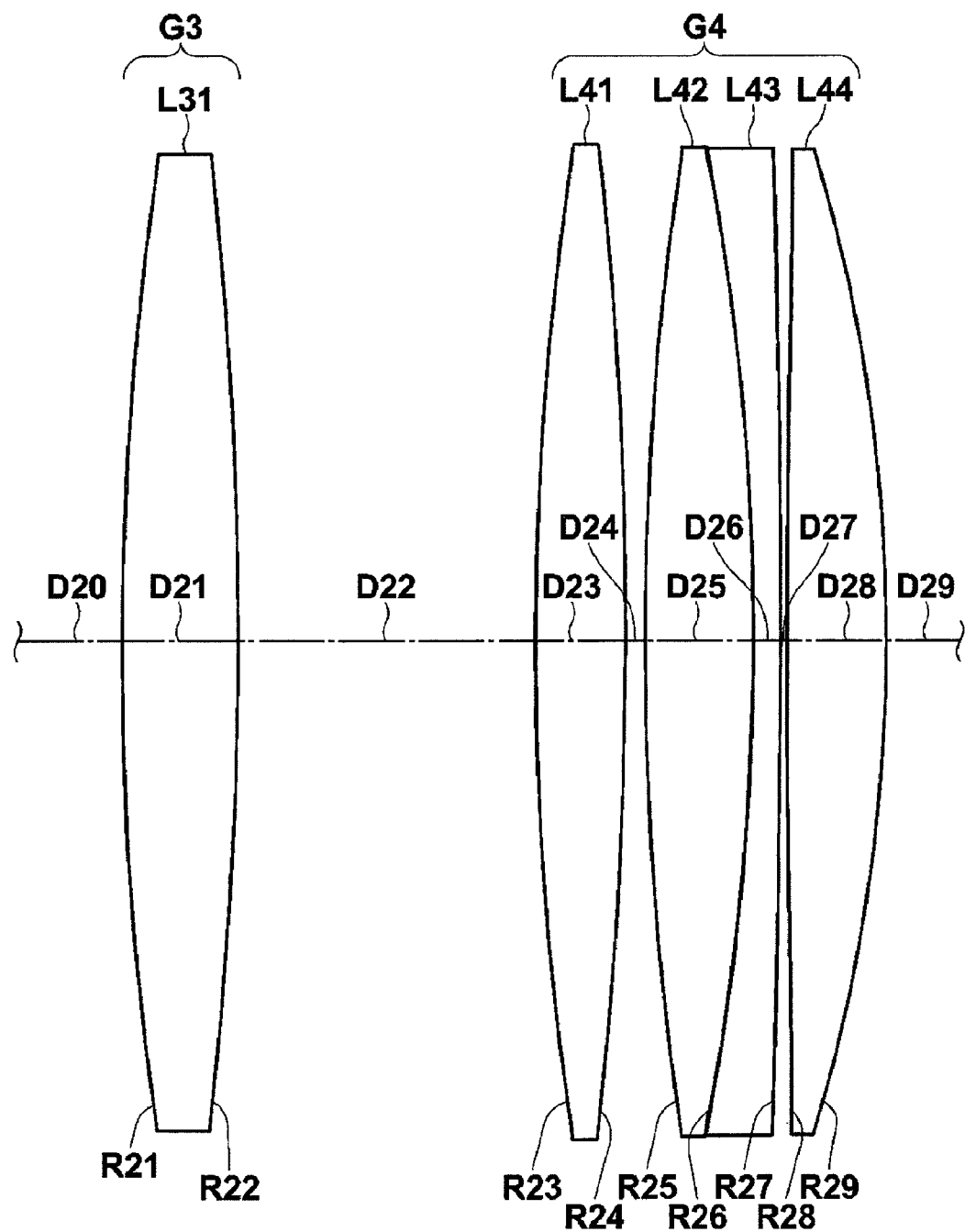
FIG. 8B is a sectional diagram illustrating a detailed configuration of a third lens group and a fourth lens group of the high power zoom lens system according to Example 1 of the invention.
Figure 8C:
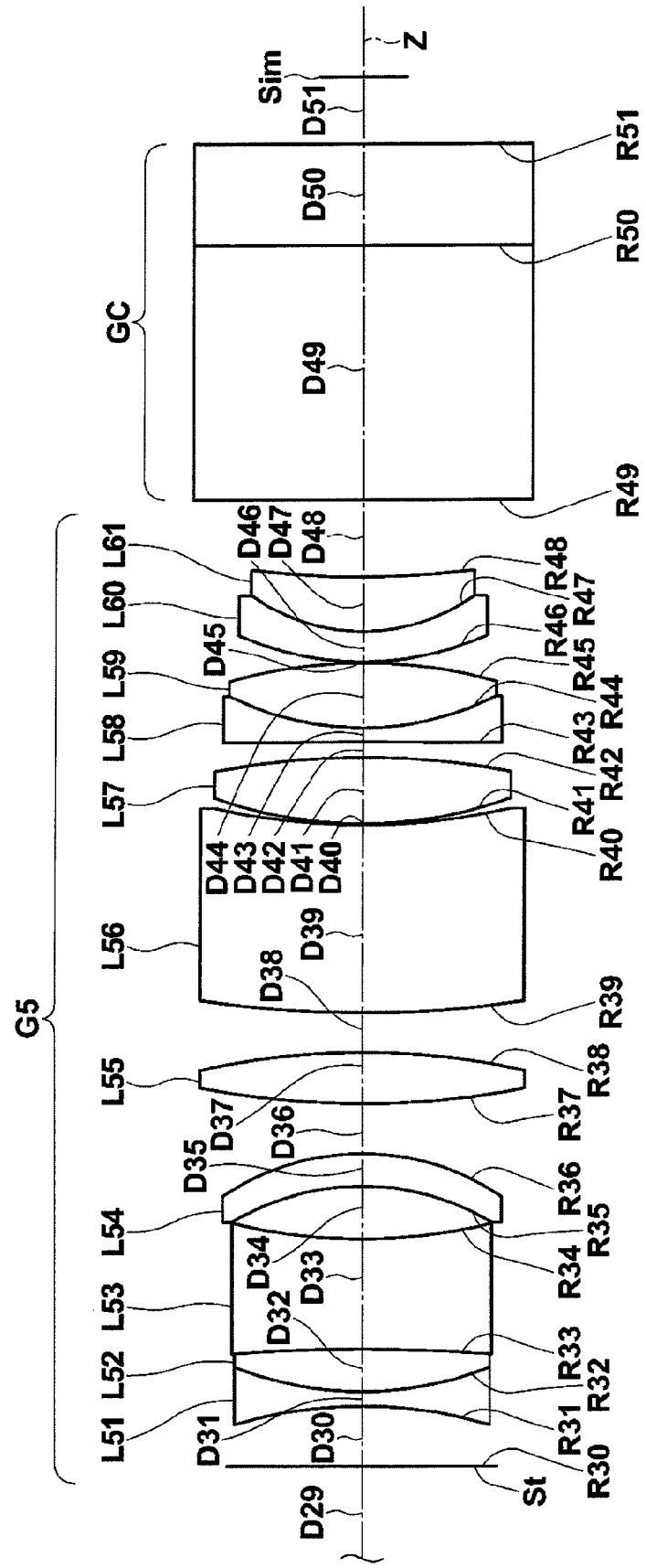
FIG. 8C is a sectional diagram illustrating a detailed configuration from a fifth lens group to an imaging plane of the high power zoom lens system according to Example 1 of the invention.

A lens sectional diagram of Example 1 is shown in FIG. 1, and the detailed configuration is shown in FIGS. 8A to 8C. FIG. 8A shows a detailed configuration of the first lens group G1 and the second lens group G2. FIG. 8B shows a detailed configuration of the third lens group G3 and the fourth lens group G4. FIG. 8C shows a detailed configuration from the fifth lens group G5 to the imaging plane Sim.

In Example 1, the first lens group G1 has a five-lens configuration of lenses L1 to L5, the second lens group G2 has a six-lens configuration of lenses L21 to L26, the third lens group G3 has an one-lens configuration of a lens L31, the fourth lens group has a four-lens configuration of lenses L41 to L44, and the fifth lens group G5 has an eleven-lens configuration of lenses L51 to L61 and an aperture diaphragm St.

The surface data of the high power zoom lens system according to Example 1 is represented in Table 1. The various data thereof is represented in Table 2. The aspheric data thereof is represented in Table 3. Furthermore, the reference signs of Tables 1 to 3 have the same meaning the reference signs in Examples to be described later.

In the surface data of Table 1, SNo. represents a surface number as the sequential number of i-th (i=1, 2, 3 . . . ) surface that sequentially increases as it gets closer to the image side when a surface of a component closest to the object side is defined as a first surface. In addition, Ri represents a radius of curvature of i-th surface, and Di represents an on-axis surface spacing on the optical axis Z between the i-th surface and the (i+1)th surface on the optical. Furthermore, Nej represents a refractive index at e-line (wavelength of 546.07 nm) in a j-th (j=1, 2, 3 . . . ) optical element of which the sequential number sequentially increases as it gets closer to the image side when a surface of the optical element closest to the object side is defined as a first surface. In addition, vdj represents an Abbe number of the j-th optical element at d-line (wavelength of 587.6 nm). In the surface data of Table 1, the surface numbers are also noted on the aperture diaphragm St and the color separating optical system GC. In the surface data, a direction in which the radius of curvature is convex toward the object side is defined as a positive direction, and a direction in which the radius of curvature is convex toward the image side is defined as a negative direction. Furthermore, the Ri and Di shown in Table 1 correspond to the Ri and Di in FIGS. 8A to 8C. In addition, AP represents the aperture diaphragm and IP represents the image plane.

TABLE 1

Surface Data of Example 1

| SNo. | Ri | Di | Nej | vdj |
|---|---|---|---|---|
| 1 | 734.5879 | 3.960 | 1.83929 | 37.3 |
| 2 | 246.6243 | 1.800 | | |
| 3 | 246.7278 | 26.861 | 1.43496 | 95.1 |
| 4 | −789.7847 | 21.115 | | |
| 5 | 266.6778 | 11.067 | 1.43496 | 95.1 |
| 6 | 613.1681 | 0.120 | | |
| 7 | 249.6878 | 18.758 | 1.43496 | 95.1 |
| 8 | −10340.4476 | 2.000 | | |
| 9 | 177.7605 | 15.550 | 1.43985 | 95.0 |
| 10 | 497.6202 | Variable | | |
| 11 | −738.4868 | 1.800 | 1.91048 | 31.3 |
| 12 | 75.4031 | 4.015 | | |
| 13 | −781.5799 | 1.800 | 1.83148 | 29.8 |
| 14 | 72.0657 | 6.738 | | |
| 15 | −74.2311 | 4.750 | 1.81643 | 22.8 |
| 16 | −39.1590 | 1.800 | 1.75006 | 53.1 |
| 17 | −506.6693 | 0.120 | | |
| 18 | 113.7835 | 7.604 | 1.81643 | 22.8 |
| 19 | −61.7248 | 1.800 | 1.88522 | 40.0 |
| 20 | 236.7192 | Variable | | |
| 21 | 226.4352 | 7.584 | 1.43985 | 95.0 |
| 22 | −278.6995 | Variable | | |
| 23 | 220.2000 | 5.994 | 1.57098 | 71.3 |
| 24 | −289.2588 | 1.219 | | |
| 25 | 225.6174 | 7.172 | 1.43985 | 95.0 |
| 26 | −169.7682 | 1.800 | 1.88984 | 21.0 |
| 27 | −949.8613 | 0.401 | | |
| *28 | 709.8660 | 6.564 | 1.52686 | 76.1 |

TABLE 1-continued

Surface Data of Example 1

| SNo. | Ri | Di | Nej | vdj |
|---|---|---|---|---|
| 29 | −112.8584 | Variable | | |
| 30 | ∞(AP) | 7.772 | | |
| 31 | −57.3322 | 1.800 | 1.77621 | 49.6 |
| 32 | 44.8190 | 5.503 | 1.81264 | 25.5 |
| 33 | −208.9503 | 14.127 | 1.80811 | 46.6 |
| 34 | 70.4318 | 6.841 | | |
| 35 | −32.6912 | 4.238 | 1.51825 | 64.1 |
| 36 | −32.0161 | 6.449 | | |
| 37 | 110.6886 | 6.638 | 1.48915 | 70.2 |
| 38 | −96.4415 | 5.041 | | |
| 39 | 137.6670 | 24.476 | 1.88814 | 40.8 |
| 40 | 86.5827 | 0.120 | | |
| 41 | 56.5047 | 8.727 | 1.52033 | 59.0 |
| 42 | −101.6544 | 2.000 | | |
| 43 | −1621.3147 | 1.800 | 1.83932 | 37.2 |
| 44 | 38.4358 | 8.431 | 1.48915 | 70.2 |
| 45 | −63.4548 | 0.120 | | |
| 46 | 39.3850 | 3.929 | 1.81077 | 40.9 |
| 47 | 24.7796 | 7.097 | 1.51825 | 64.1 |
| 48 | 114.2036 | 0.000 | | |
| 49 | ∞ | 33.000 | 1.61173 | 46.6 |
| 50 | ∞ | 13.200 | 1.51825 | 64.1 |
| 51 | ∞ | 18.661 | | |
| IP | ∞ | | | |

In the surface data of Table 1, "Variable" is noted on items of on-axis surface spacings D10, D20, D22, and D29 which are variable for zooming. The on-axis surface spacings correspond to a space of the first group G1 and the second group G2, a space of the second group G2 and the third group G3, and a space of the third group G3 and the fourth group G4, respectively.

In the various data of Table 2, magnifying power (1×, 1.8×, 5×, 28×, and 54×) during zooming and the variable on-axis surface spacings D10, D20, D22, and D29 for each magnifying power are represented. Furthermore, in Table 2, a focal length and a F number (Fno.) of the whole system at the wide-angle end and the telephoto end are represented as data for zooming. In the surface data and the various data, a unit of length is mm.

TABLE 2

Various data of Example 1

| | D10 | D20 | D22 | D29 |
|---|---|---|---|---|
| 1× | 3.979 | 236.964 | 19.449 | 3.293 |
| 1.8× | 52.775 | 184.673 | 15.178 | 11.059 |
| 5× | 110.577 | 127.214 | 0.345 | 25.549 |
| 28× | 150.640 | 41.065 | 0.208 | 71.771 |
| 54× | 157.809 | 5.500 | 1.707 | 98.669 |

| Focal length | 9.80~529.20 |
|---|---|
| Fno. | 1.76~2.93 |

In the surface data of Table 1, the reference sign * is noted on each surface number of aspheric surfaces. In the aspheric data of Table 3, values of coefficients K and B3 to B20 of the aspheric surfaces defined by the following Numerical Expression 1 which is an aspheric expression are represented.

$$Zh = \frac{CY^2}{1 + (1 - K \cdot C^2 Y^2)^{1/2}} + \sum_{m=3}^{20} Bm Y^m$$ [Numerical Expression 1]

TABLE 3

Aspheric data of Example 1
28th surface

| | |
|---|---|
| K | 1.000000E+00 |
| B3 | 3.825187E−09 |
| B4 | −3.861406E−07 |
| B5 | 8.207870E−10 |
| B6 | −1.827335E−10 |
| B7 | 1.191492E−11 |
| B8 | −5.539491E−13 |
| B9 | 1.206170E−14 |
| B10 | 2.757793E−16 |
| B11 | −1.832683E−17 |
| B12 | 1.845813E−19 |
| B13 | −2.054973E−21 |
| B14 | 3.150426E−22 |
| B15 | 1.785787E−25 |
| B16 | −3.938262E−25 |
| B17 | −2.620213E−27 |
| B18 | 6.193696E−28 |
| B19 | −1.414705E−29 |
| B20 | 1.025584E−31 |

Example 2

Figure 2:
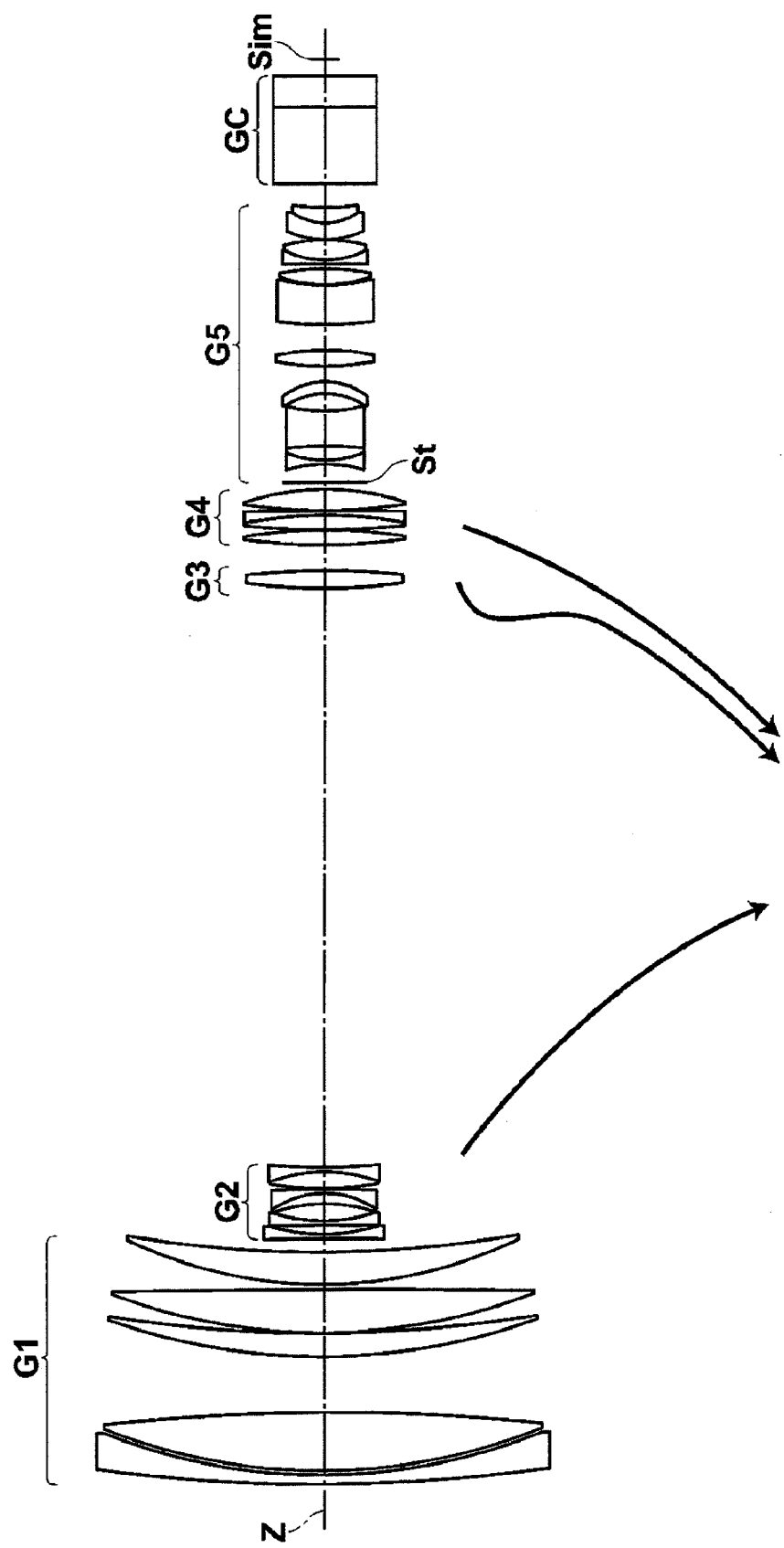
FIG. 2 is a sectional diagram illustrating a lens configuration of a high power zoom lens system according to Example 2 of the invention.
Figure 9A:
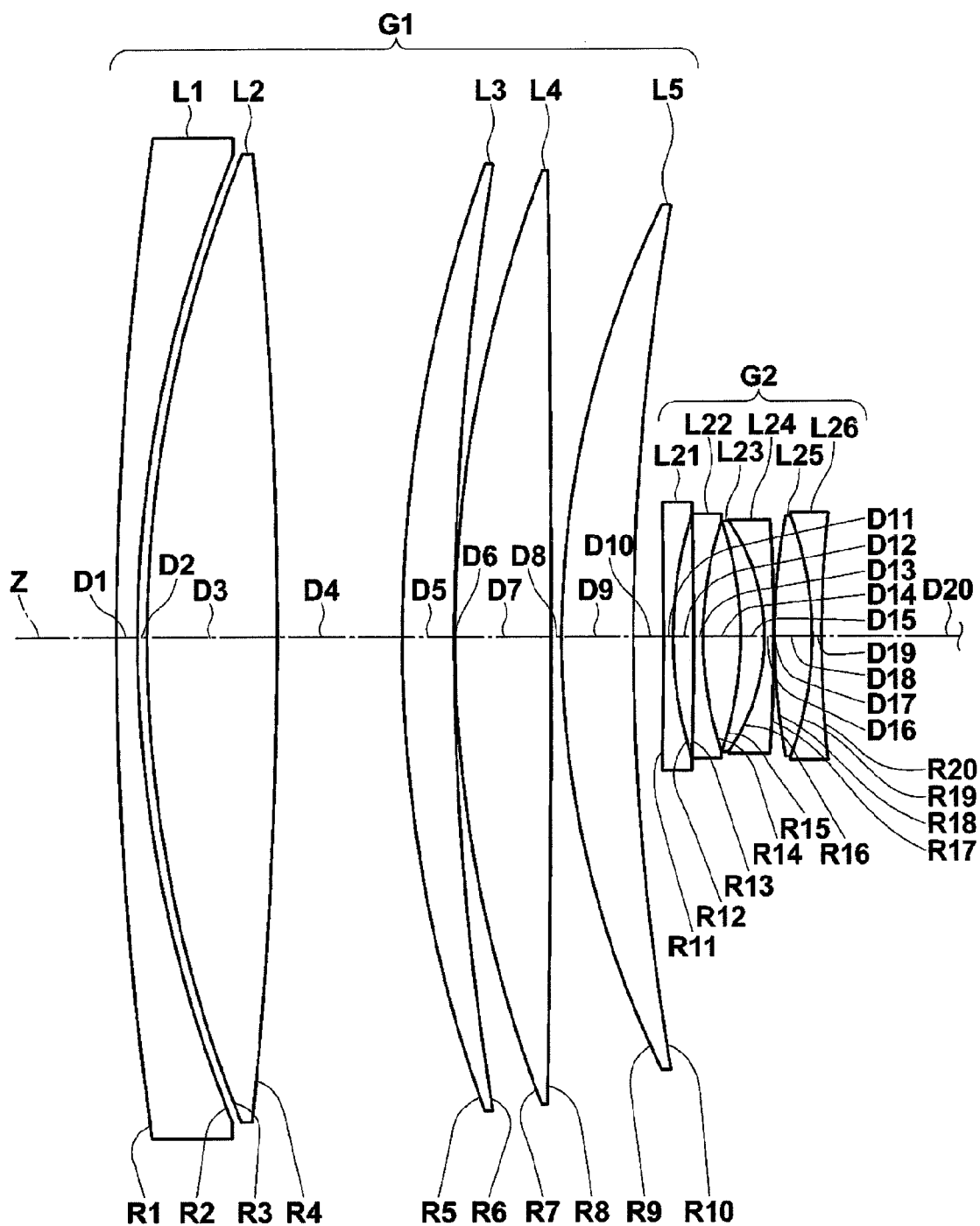
FIG. 9A is a sectional diagram illustrating a detailed configuration of a first lens group and a second lens group of the high power zoom lens system according to Example 2 of the invention.
Figure 9B:
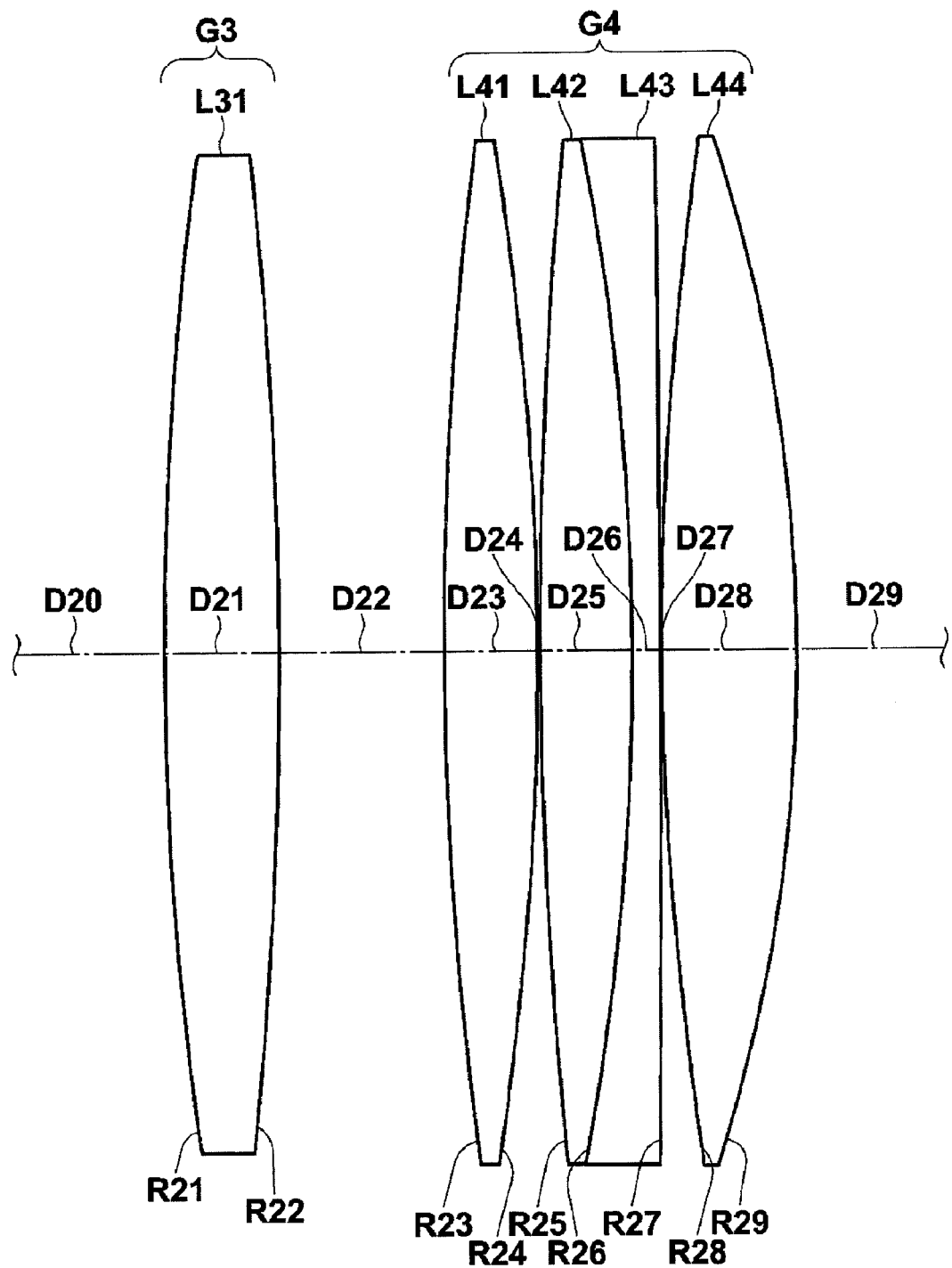
FIG. 9B is a sectional diagram illustrating a detailed configuration of a third lens group and a fourth lens group of the high power zoom lens system according to Example 2 of the invention.
Figure 9C:
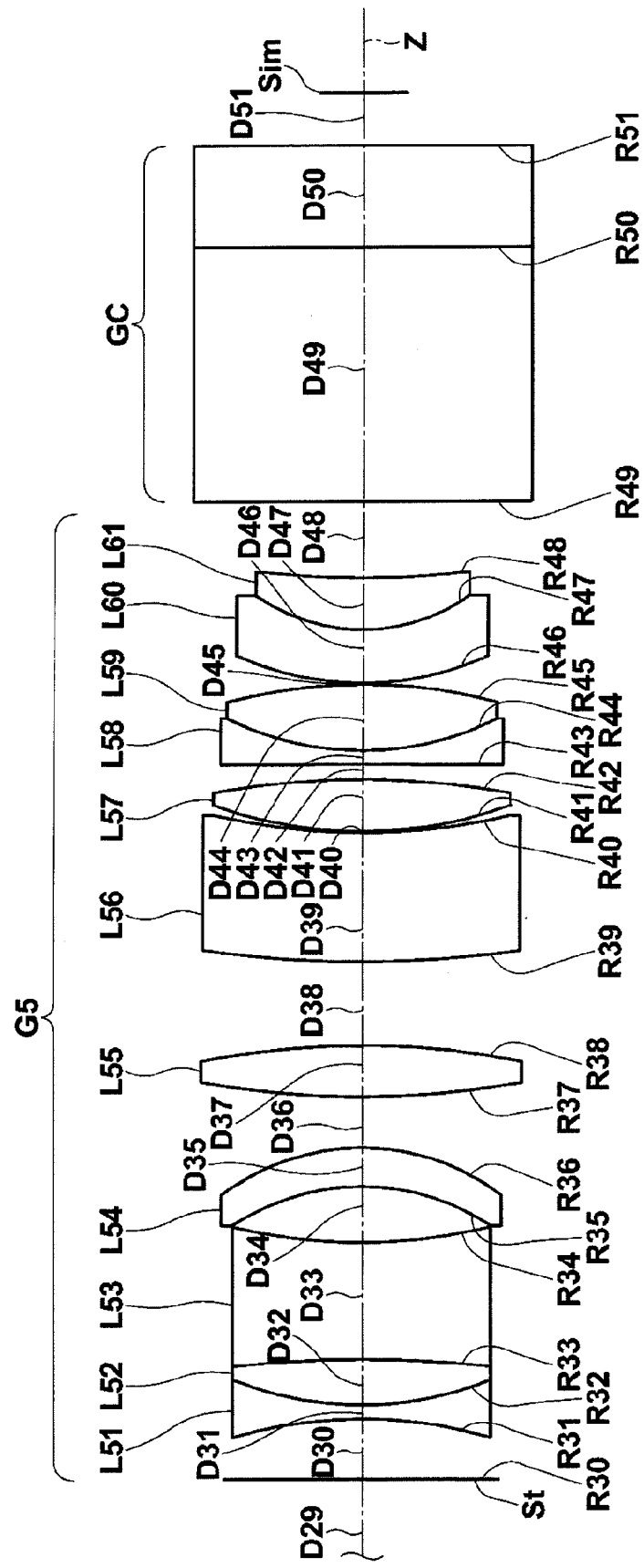
FIG. 9C is a sectional diagram illustrating a detailed configuration from a fifth lens group to an imaging plane of the high power zoom lens system according to Example 2 of the invention.

A lens sectional diagram of Example 2 is shown in FIG. 2, and the detailed configuration is shown in FIGS. 9A to 9C. FIG. 9A shows a detailed configuration of the first lens group G1 and the second lens group G2. FIG. 9B shows a detailed configuration of the third lens group G3 and the fourth lens group G4. FIG. 9C shows a detailed configuration from the fifth lens group G5 to the imaging plane Sim.

In Example 2, the first lens group G1 has a five-lens configuration of lenses L1 to L5, the second lens group G2 has a six-lens configuration of lenses L21 to L26, the third lens group G3 has an one-lens configuration of a lens L31, the fourth lens group has a four-lens configuration of lenses L41 to L44, and the fifth lens group G5 has an eleven-lens configuration of lenses L51 to L61 and an aperture diaphragm St.

The surface data of the high power zoom lens system according to Example 2 is represented in Table 4. The various data thereof is represented in Table 5. The aspheric data thereof is represented in Table 6.

[Table 4]
Surface Data of Example 2

[Table 5]
Various Data of Example 2

[Table 6]
Aspheric Data of Example 2

Example 3

Figure 3:
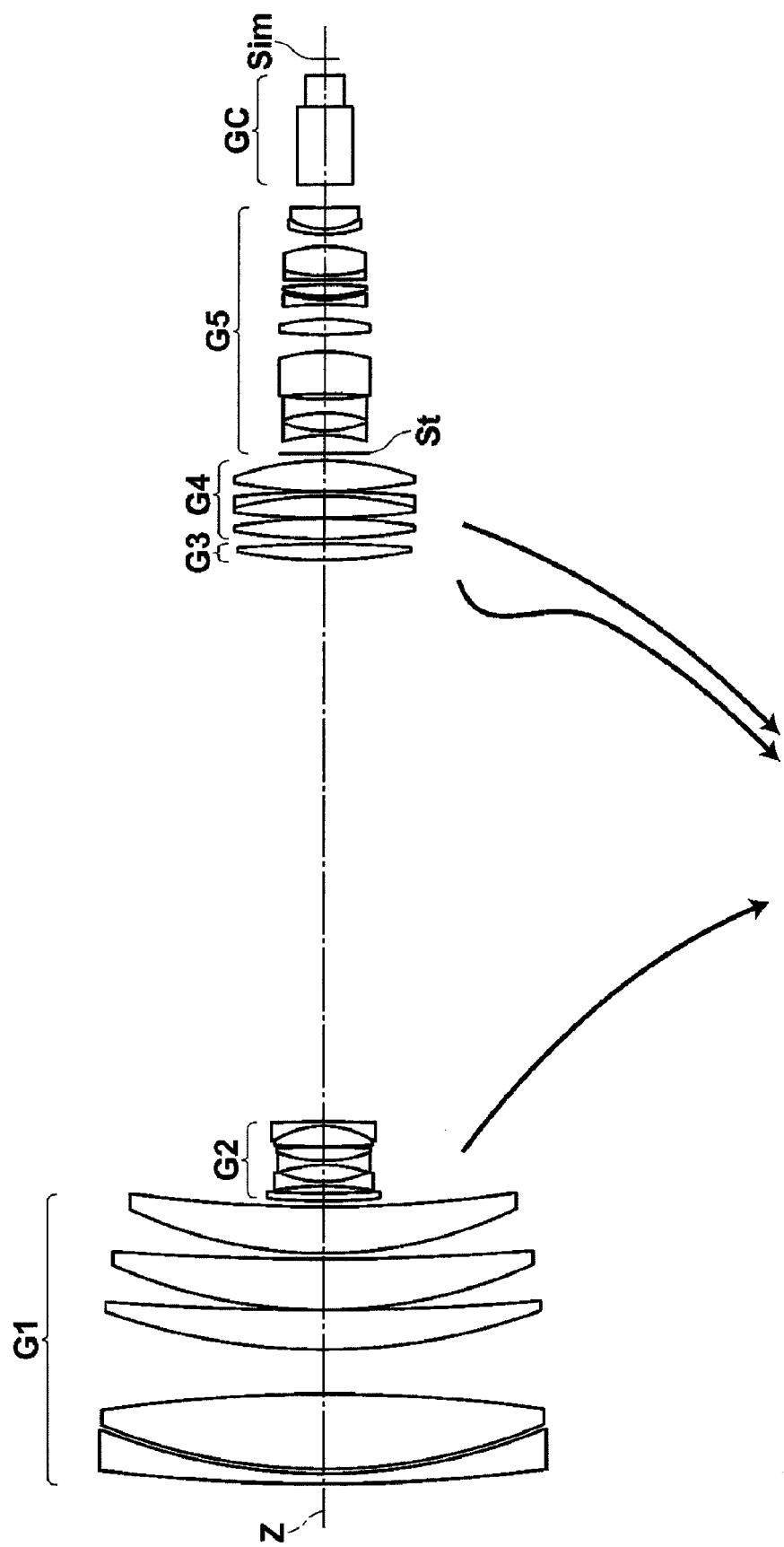
FIG. 3 is a sectional diagram illustrating a lens configuration of a high power zoom lens system according to Example 3 of the invention.
Figure 10A:
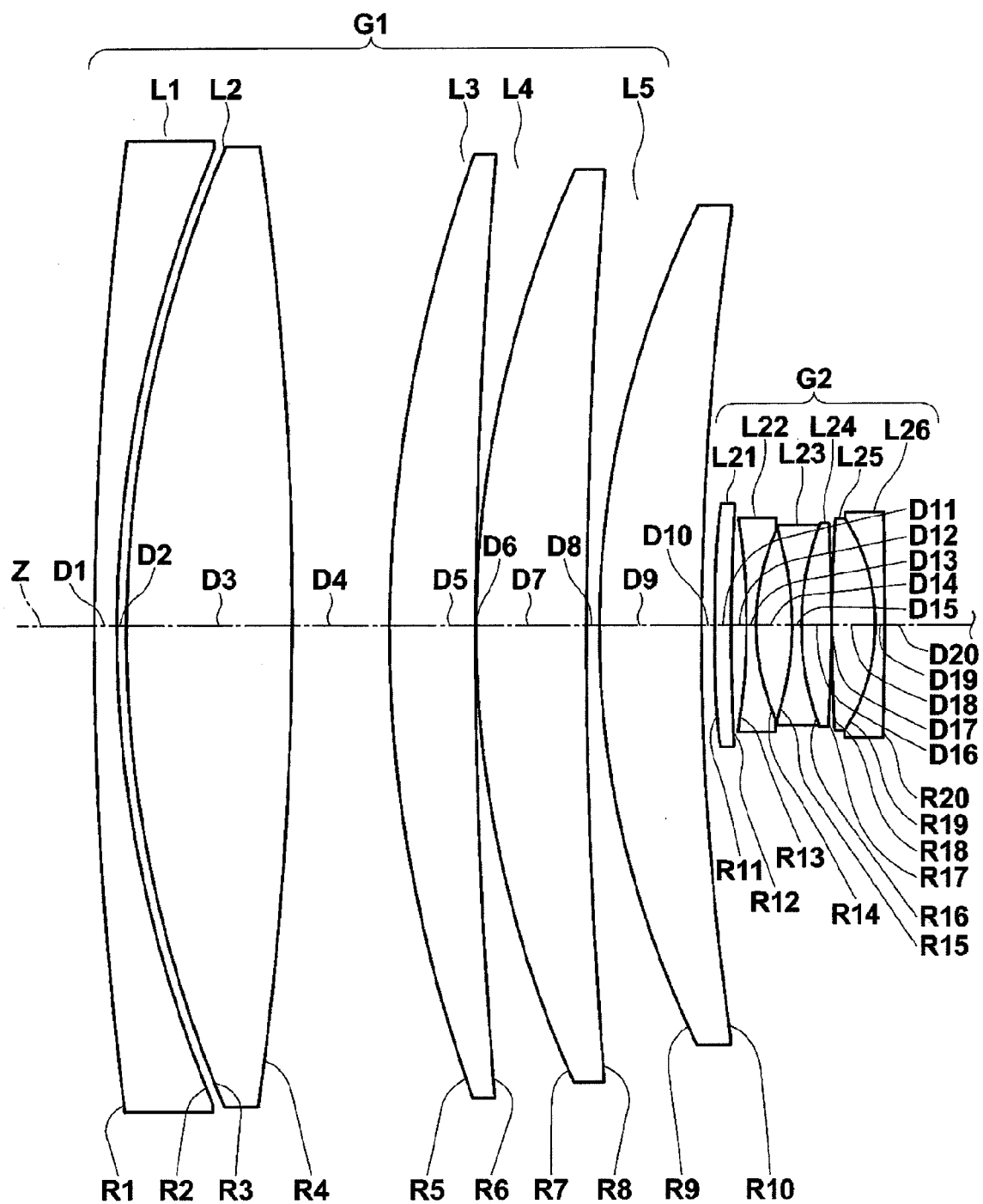
FIG. 10A is a sectional diagram illustrating a detailed configuration of a first lens group and a second lens group of the high power zoom lens system according to Example 3 of the invention.
Figure 10B:
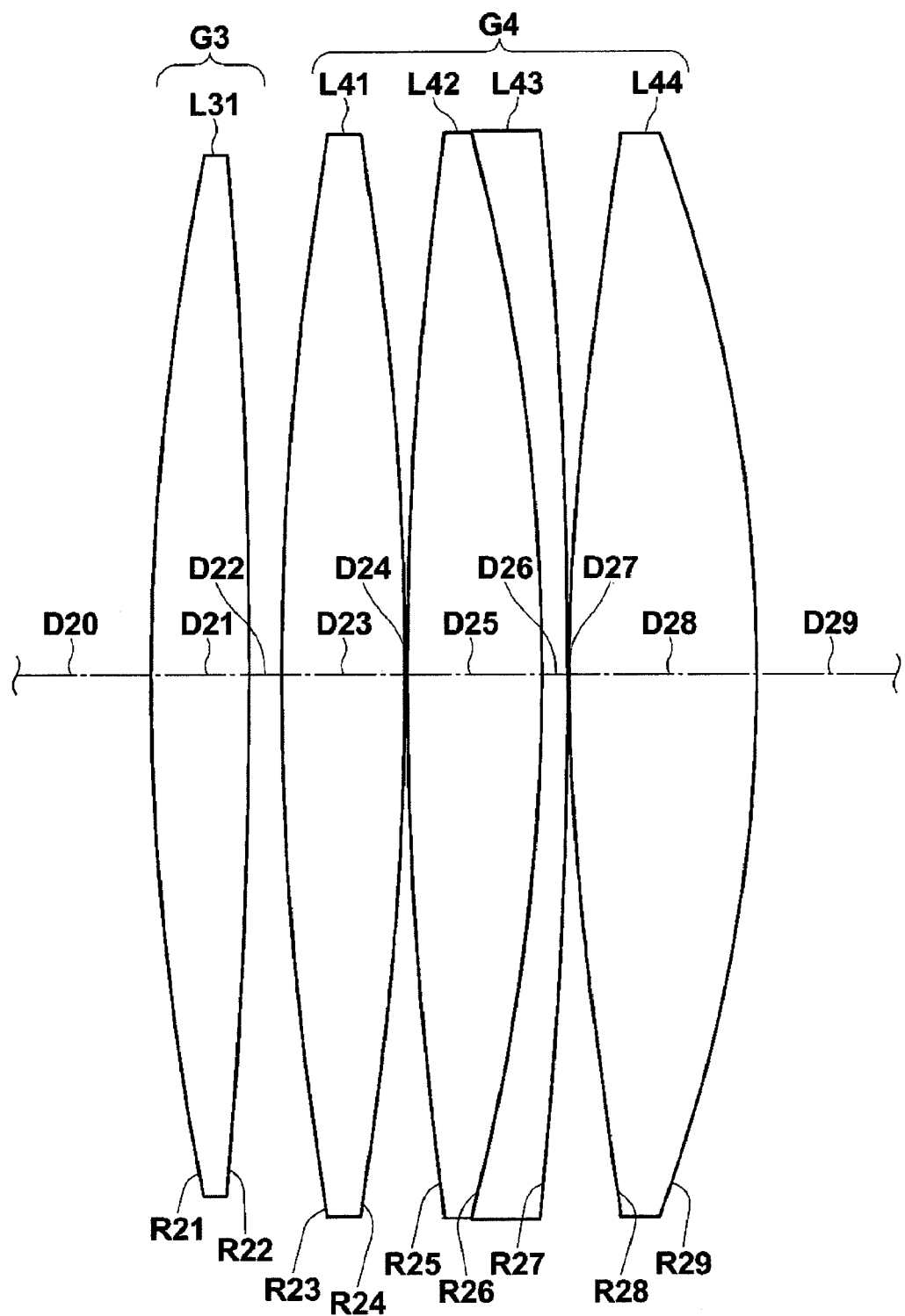
FIG. 10B is a sectional diagram illustrating a detailed configuration of a third lens group and a fourth lens group of the high power zoom lens system according to Example 3 of the invention.
Figure 10C:
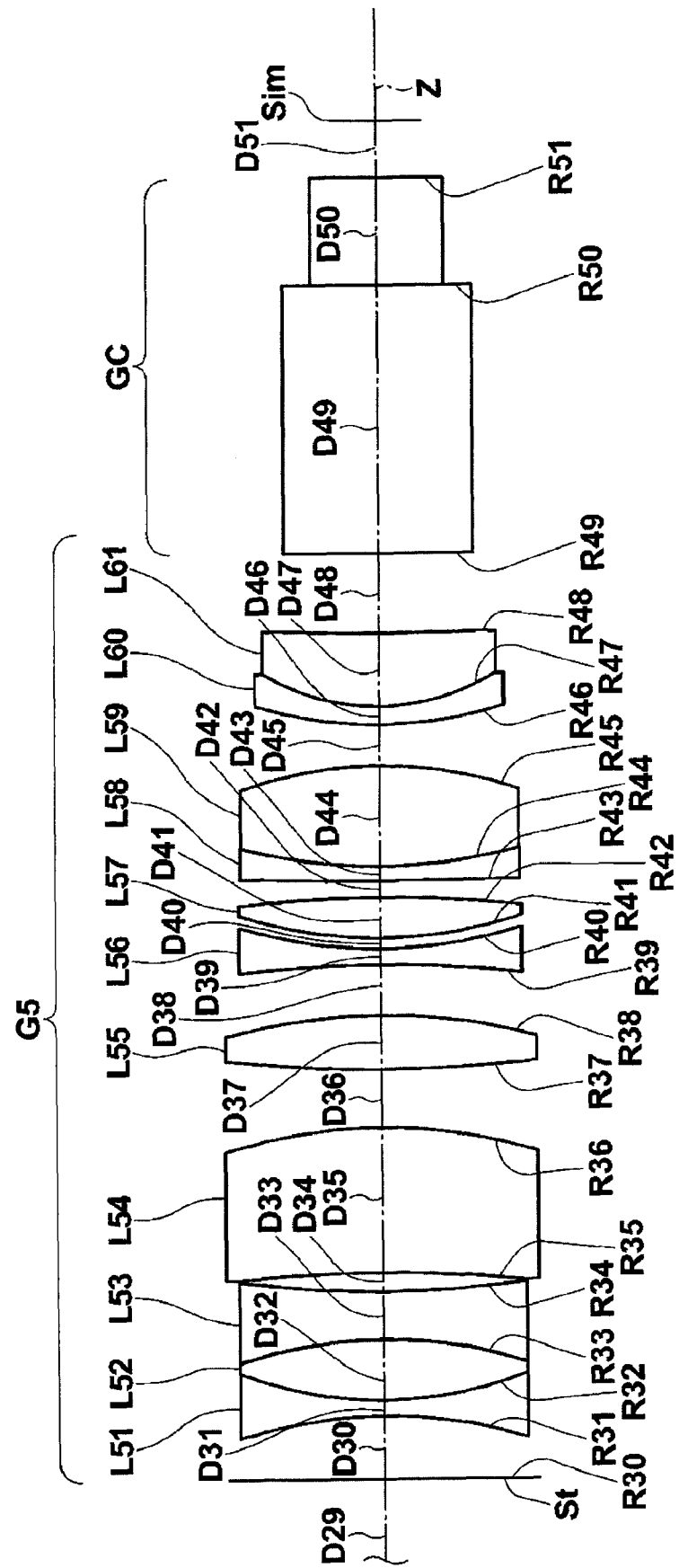
FIG. 10C is a sectional diagram illustrating a detailed configuration from a fifth lens group to an imaging plane of the high power zoom lens system according to Example 3 of the invention.

A lens sectional diagram of Example 3 is shown in FIG. 3, and the detailed configuration is shown in FIGS. 10A to 10C. FIG. 10A shows a detailed configuration of the first lens group G1 and the second lens group G2. FIG. 10B shows a detailed configuration of the third lens group G3 and the fourth lens group G4. FIG. 10C shows a detailed configuration from the fifth lens group G5 to the imaging plane Sim.

In Example 3, the first lens group G1 has a five-lens configuration of lenses L1 to L5, the second lens group G2 has a six-lens configuration of lenses L21 to L26, the third lens group G3 has an one-lens configuration of a lens L31, the fourth lens group has a four-lens configuration of lenses L41 to L44, and the fifth lens group G5 has an eleven-lens configuration of lenses L51 to L61 and an aperture diaphragm St.

The surface data of the high power zoom lens system according to Example 3 is represented in Table 7. The various data thereof is represented in Table 8. The aspheric data thereof is represented in Table 9.

TABLE 7

Surface data of Example 3

| S No. | Ri | Di | Nej | vdj |
|---|---|---|---|---|
| 1 | 755.8203 | 4.400 | 1.83932 | 37.2 |
| 2 | 244.1862 | 1.800 | | |
| 3 | 242.2962 | 31.984 | 1.43496 | 95.1 |
| 4 | −672.8827 | 18.620 | | |
| 5 | 271.2990 | 16.616 | 1.43496 | 95.1 |
| 6 | 1113.9934 | 0.120 | | |
| 7 | 217.0679 | 21.586 | 1.43496 | 95.1 |
| 8 | 1140.5834 | 2.502 | | |
| 9 | 187.7547 | 19.678 | 1.43985 | 94.9 |
| 10 | 573.1932 | Variable | | |
| *11 | 413.7351 | 3.157 | 1.91048 | 31.3 |
| 12 | 440.7192 | 3.104 | | |
| 13 | −129.5488 | 1.800 | 2.01168 | 28.3 |
| 14 | 46.3519 | 7.068 | | |
| 15 | −59.9220 | 1.800 | 1.82016 | 46.6 |
| 16 | 57.0405 | 5.875 | 1.81643 | 22.8 |
| 17 | −346.9044 | 0.120 | | |
| 18 | 344.9272 | 8.674 | 1.81643 | 22.8 |
| 19 | −38.1965 | 1.804 | 1.88814 | 40.8 |
| 20 | −948.3552 | Variable | | |
| 21 | 190.2030 | 6.819 | 1.43985 | 94.9 |
| 22 | −426.1942 | Variable | | |
| 23 | 232.9396 | 8.601 | 1.49845 | 81.5 |
| *24 | −239.4574 | 0.120 | | |
| 25 | 289.5385 | 9.460 | 1.49845 | 81.5 |
| 26 | −148.9040 | 1.800 | 1.93428 | 18.9 |
| 27 | −371.4814 | 0.120 | | |
| *28 | 146.6106 | 13.224 | 1.43985 | 94.9 |
| 29 | −109.9825 | Variable | | |
| 30 | ∞(AP) | 7.682 | | |
| 31 | −60.0747 | 1.956 | 1.80811 | 46.6 |
| 32 | 48.4365 | 7.472 | 1.81264 | 25.4 |
| 33 | −56.4226 | 5.889 | 1.80811 | 46.6 |
| 34 | 128.9964 | 2.276 | | |
| 35 | −180.7233 | 17.899 | 1.52033 | 58.9 |
| 36 | −64.2348 | 7.144 | | |
| 37 | 169.1999 | 6.640 | 1.48915 | 70.2 |
| 38 | −73.4957 | 6.268 | | |
| 39 | −159.5431 | 2.018 | 1.88814 | 40.8 |
| 40 | 57.8616 | 1.303 | | |
| 41 | 55.5371 | 5.047 | 1.52033 | 58.9 |
| 42 | −156.7261 | 2.002 | | |
| 43 | 681.2418 | 1.807 | 1.85503 | 23.8 |
| 44 | 66.7774 | 12.465 | 1.51825 | 64.1 |
| 45 | −52.3424 | 5.118 | | |
| 46 | 51.2651 | 2.264 | 1.80811 | 46.6 |
| 47 | 27.5378 | 9.010 | 1.62067 | 49.8 |
| 48 | 298.1648 | 0.000 | | |
| 49 | ∞ | 33.000 | 1.61173 | 46.6 |
| 50 | ∞ | 13.200 | 1.51825 | 64.1 |
| 51 | ∞ | 16.988 | | |
| IP | ∞ | | | |

TABLE 8

Various data of Example 3

| | D10 | D20 | D22 | D29 |
|---|---|---|---|---|
| 1x | 2.583 | 239.402 | 2.272 | 2.997 |
| 1.8x | 43.918 | 179.172 | 14.121 | 10.043 |
| 5x | 98.412 | 120.703 | 5.323 | 22.816 |

TABLE 8-continued

Various data of Example 3

| | | | | |
|---|---|---|---|---|
| 28x | 138.739 | 46.260 | 3.345 | 58.910 |
| 54x | 145.742 | 17.563 | 3.995 | 79.954 |
| Focal length | | 9.80~529.21 | | |
| Fno. | | 1.76~2.93 | | |

[Table 9]
Aspheric Data of Example 3

Example 4

Figure 4:
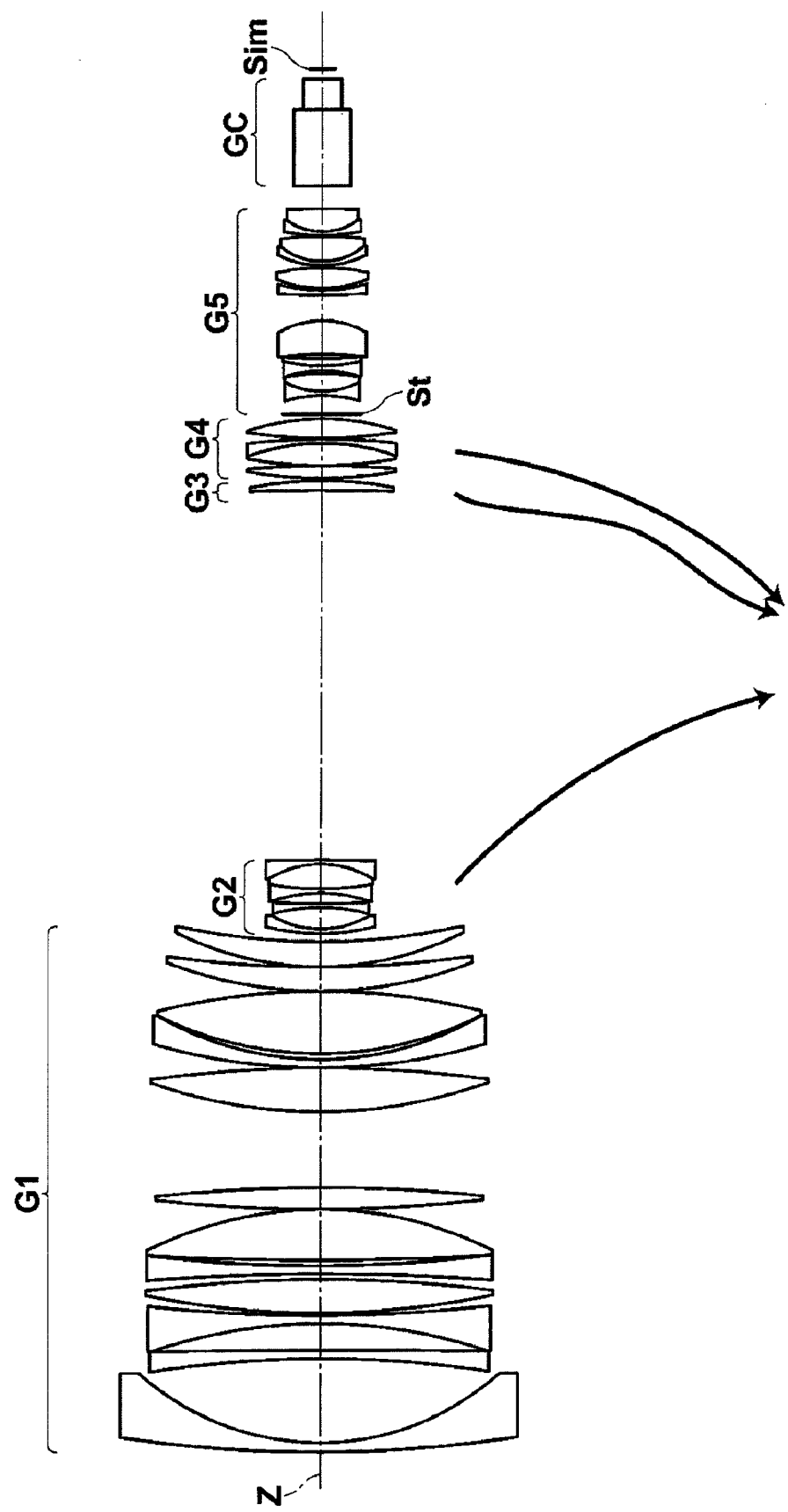
FIG. 4 is a sectional diagram illustrating a lens configuration of a high power zoom lens system according to Example 4 of the invention.
Figure 11A:
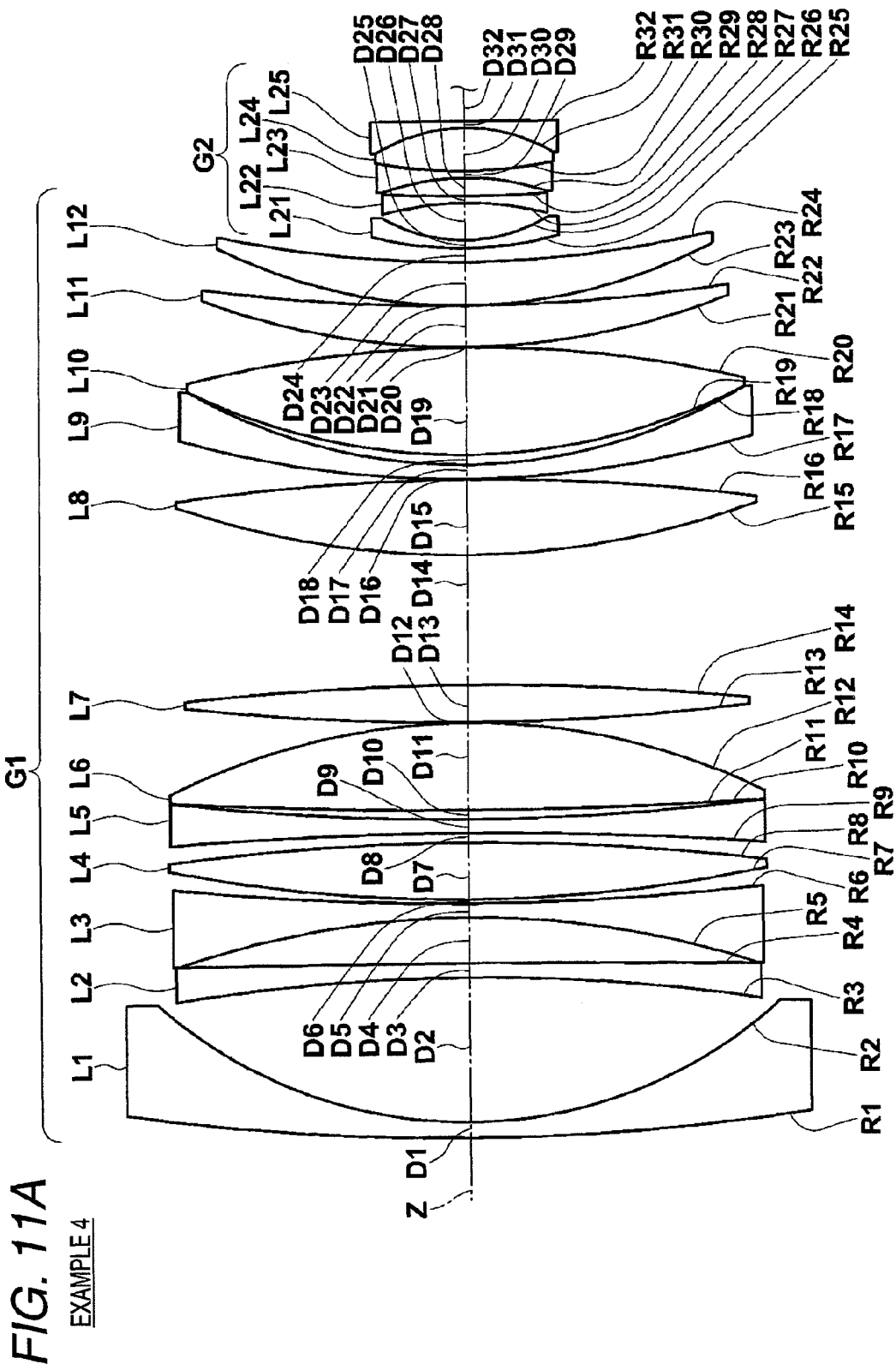
FIG. 11A is a sectional diagram illustrating a detailed configuration of a first lens group and a second lens group of the high power zoom lens system according to Example 4 of the invention.
Figure 11B:
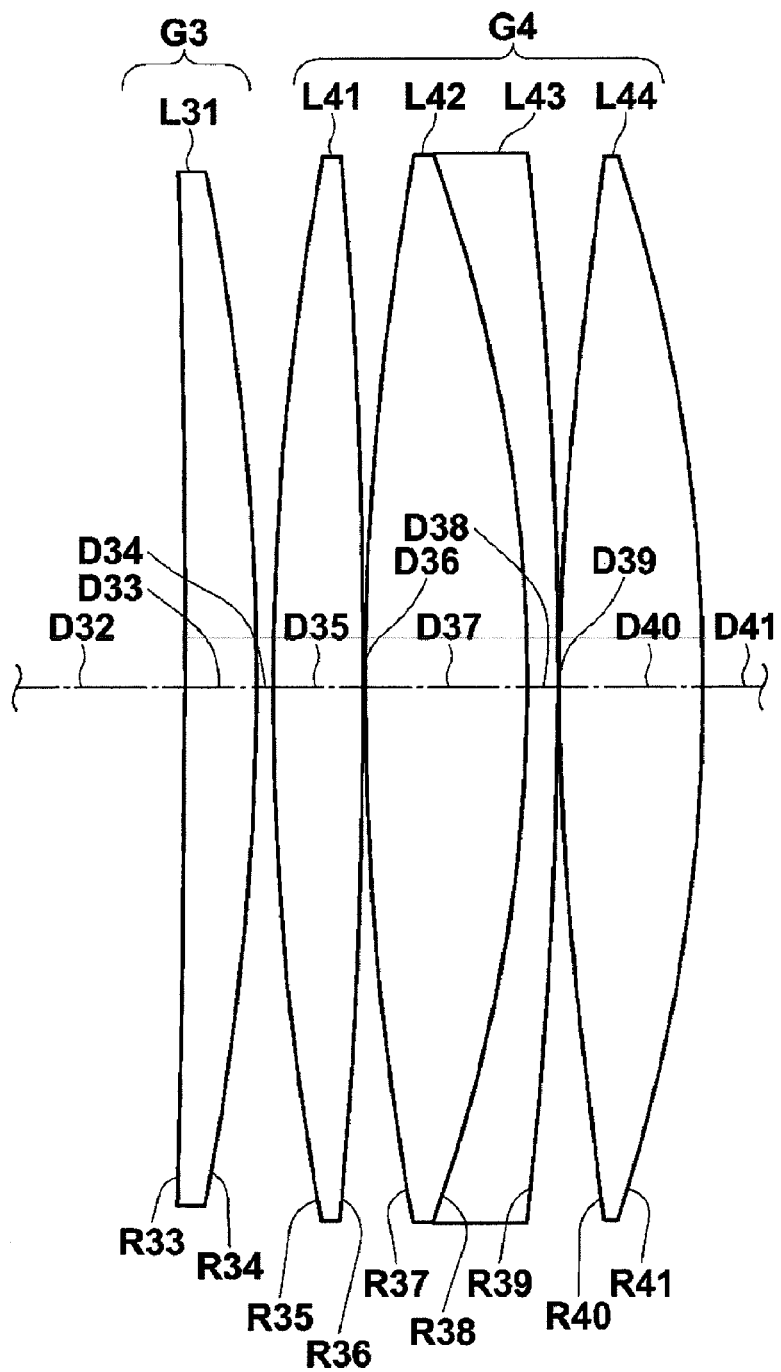
FIG. 11B is a sectional diagram illustrating a detailed configuration of a third lens group and a fourth lens group of the high power zoom lens system according to Example 4 of the invention.
Figure 11C:
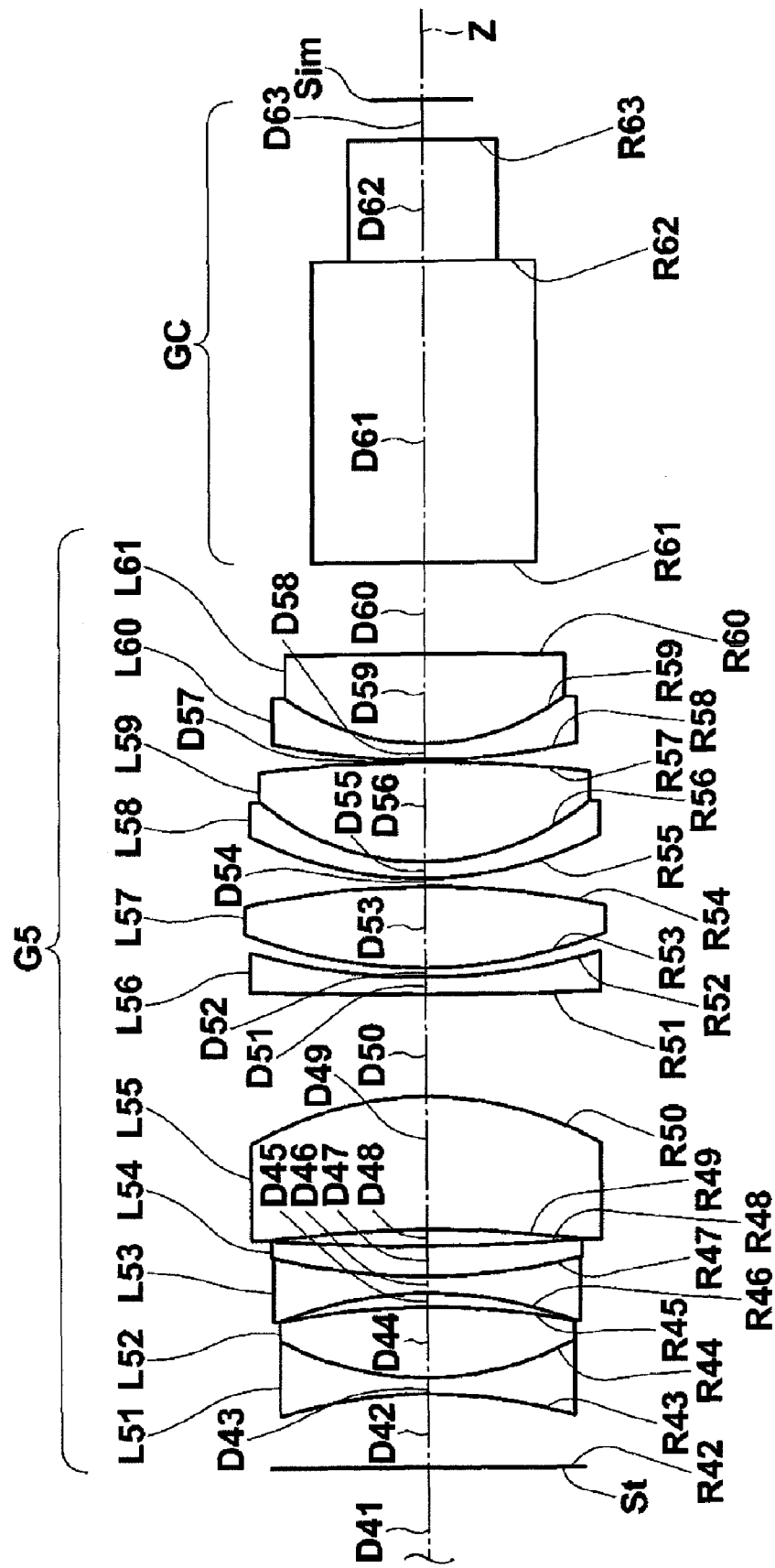
FIG. 11C is a sectional diagram illustrating a detailed configuration from a fifth lens group to an imaging plane of the high power zoom lens system according to Example 4 of the invention.

A lens sectional diagram of Example 4 is shown in FIG. 4, and the detailed configuration is shown in FIGS. 11A to 11C. FIG. 11A shows a detailed configuration of the first lens group G1 and the second lens group G2. FIG. 11B shows a detailed configuration of the third lens group G3 and the fourth lens group G4. FIG. 11C shows a detailed configuration from the fifth lens group G5 to the imaging plane Sim.

In Example 4, the first lens group G1 has a twelve-lens configuration of lenses L1 to L12, the second lens group G2 has a five-lens configuration of lenses L21 to L25, the third lens group G3 has an one-lens configuration of a lens L31, the fourth lens group has a four-lens configuration of lenses L41 to L44, and the fifth lens group G5 has an eleven-lens configuration of lenses L51 to L61 and an aperture diaphragm St.

The surface data of the high power zoom lens system according to Example 4 is represented in Table 10. The various data thereof is represented in Table 11. The aspheric data thereof is represented in Table 12.

TABLE 10

Surface data of Example 4

| S No. | Ri | Di | Nej | vdj |
|---|---|---|---|---|
| 1 | 587.7323 | 4.000 | 1.75844 | 52.3 |
| 2 | 116.6848 | 35.992 | | |
| 3 | −473.2793 | 3.500 | 1.74435 | 52.7 |
| 4 | −5216.1535 | 11.465 | | |
| 5 | −226.2869 | 3.500 | 1.73233 | 54.7 |
| 6 | 697.5690 | 1.000 | | |
| 7 | 374.2424 | 14.267 | 1.81263 | 25.4 |
| 8 | −583.7634 | 2.402 | | |
| 9 | −999.8767 | 3.500 | 1.81263 | 25.4 |
| 10 | 625.0341 | 2.271 | | |
| 11 | 1259.0818 | 21.993 | 1.43496 | 95.1 |
| 12 | −165.4801 | 0.120 | | |
| 13 | 625.4922 | 9.344 | 1.43496 | 95.1 |
| 14 | −674.7695 | 32.709 | | |
| 15 | 216.9399 | 18.897 | 1.43496 | 95.1 |
| 16 | −536.1769 | 0.120 | | |
| 17 | 256.5588 | 3.600 | 1.72309 | 29.5 |
| 18 | 138.8871 | 2.500 | | |
| 19 | 157.8598 | 26.771 | 1.43496 | 95.1 |
| 20 | −291.7324 | 0.120 | | |
| 21 | 182.6123 | 10.366 | 1.49845 | 81.6 |
| 22 | 472.2026 | 0.120 | | |
| 23 | 136.0740 | 10.920 | 1.49845 | 81.6 |
| 24 | 283.8380 | Variable | | |
| 25 | 94.7064 | 2.000 | 1.74435 | 52.7 |
| 26 | 40.7484 | 9.367 | | |
| 27 | −78.8538 | 1.700 | 1.71615 | 53.9 |
| 28 | 398.3624 | 4.542 | | |
| 29 | −61.5823 | 1.700 | 1.71615 | 53.9 |
| 30 | 115.8458 | 10.829 | 1.81263 | 25.4 |
| 31 | −42.4778 | 1.700 | 1.80811 | 46.6 |
| 32 | −2267.7791 | Variable | | |
| 33 | −1053.6125 | 4.206 | 1.43985 | 95.0 |

TABLE 10-continued

Surface data of Example 4

| S No. | Ri | Di | Nej | vdj |
|---|---|---|---|---|
| 34 | −159.6085 | Variable | | |
| 35 | 176.1530 | 5.381 | 1.43985 | 95.0 |
| *36 | −462.4801 | 0.120 | | |
| 37 | 179.0535 | 9.650 | 1.49845 | 81.6 |
| 38 | −93.5811 | 1.800 | 1.85495 | 23.9 |
| 39 | −278.7906 | 0.120 | | |
| *40 | 150.9652 | 8.550 | 1.49845 | 81.6 |
| 41 | −101.6180 | Variable | | |
| 42 | ∞(AP) | 8.011 | | |
| 43 | −56.0750 | 1.800 | 1.77621 | 49.6 |
| 44 | 33.7589 | 7.676 | 1.81263 | 25.4 |
| 45 | −86.3003 | 1.517 | | |
| 46 | −43.9945 | 1.800 | 1.80811 | 46.6 |
| 47 | 69.1015 | 3.263 | 1.81263 | 25.4 |
| 48 | 206.6832 | 1.852 | | |
| 49 | −129.3972 | 14.518 | 1.57088 | 63.1 |
| 50 | −38.0253 | 11.230 | | |
| 51 | 698.9706 | 1.800 | 1.88814 | 40.8 |
| 52 | 66.3305 | 1.057 | | |
| 53 | 53.1830 | 8.898 | 1.51825 | 64.1 |
| 54 | −91.8786 | 0.854 | | |
| 55 | 41.5182 | 1.800 | 1.81643 | 22.8 |
| 56 | 27.7114 | 11.030 | 1.48915 | 70.2 |
| 57 | −139.4367 | 0.120 | | |
| 58 | 77.1116 | 1.800 | 1.88814 | 40.8 |
| 59 | 25.5760 | 9.867 | 1.62033 | 63.4 |
| 60 | −1008.2935 | 0.000 | | |
| 61 | ∞ | 33.000 | 1.61170 | 46.5 |
| 62 | ∞ | 13.200 | 1.51825 | 64.1 |
| 63 | ∞ | 14.315 | | |
| IP | ∞ | | | |

TABLE 11

Various data of Example 4

| | D24 | D32 | D34 | D41 |
|---|---|---|---|---|
| 1x | 3.498 | 160.425 | 0.957 | 2.000 |
| 2x | 37.057 | 114.346 | 3.560 | 11.917 |
| 6x | 70.972 | 63.798 | 0.120 | 31.991 |
| 18x | 88.849 | 11.589 | 5.053 | 61.390 |
| 23x | 90.693 | 2.789 | 0.192 | 73.207 |
| Focal length | | 7.20~165.61 | | |
| Fno. | | 1.57~2.10 | | |

TABLE 12

Aspheric data of Example 4

| | 36th surface | | 40th surface |
|---|---|---|---|
| K | 1.000000E+00 | K | 1.000000E+00 |
| B3 | −7.926635E−09 | B3 | 6.710207E−09 |
| B4 | −2.305349E−07 | B4 | −7.267862E−07 |
| B5 | −1.445592E−09 | B5 | 1.408982E−09 |
| B6 | −3.290103E−10 | B6 | −6.799842E−10 |
| B7 | −1.814670E−11 | B7 | 1.917057E−11 |
| B8 | 1.657811E−12 | B8 | −2.831639E−13 |
| B9 | −1.718271E−14 | B9 | 1.681713E−14 |
| B10 | −5.994528E−16 | B10 | 2.656105E−16 |
| B11 | 1.985903E−17 | B11 | −2.685418E−17 |
| B12 | −1.045568E−19 | B12 | 2.071068E−19 |
| B13 | −2.688281E−21 | B13 | 2.054328E−22 |
| B14 | −1.306990E−22 | B14 | 3.640436E−22 |
| B15 | −1.083567E−23 | B15 | −2.156995E−24 |
| B16 | 8.755850E−25 | B16 | −3.225429E−25 |
| B17 | −9.883745E−27 | B17 | −7.999019E−27 |
| B18 | −4.519063E−28 | B18 | 8.137120E−28 |

TABLE 12-continued

Aspheric data of Example 4

| | 36th surface | | 40th surface |
|---|---|---|---|
| B19 | 1.332911E−29 | B19 | −1.715626E−29 |
| B20 | −1.042503E−31 | B20 | 1.197174E−31 |

Example 5

Figure 5:
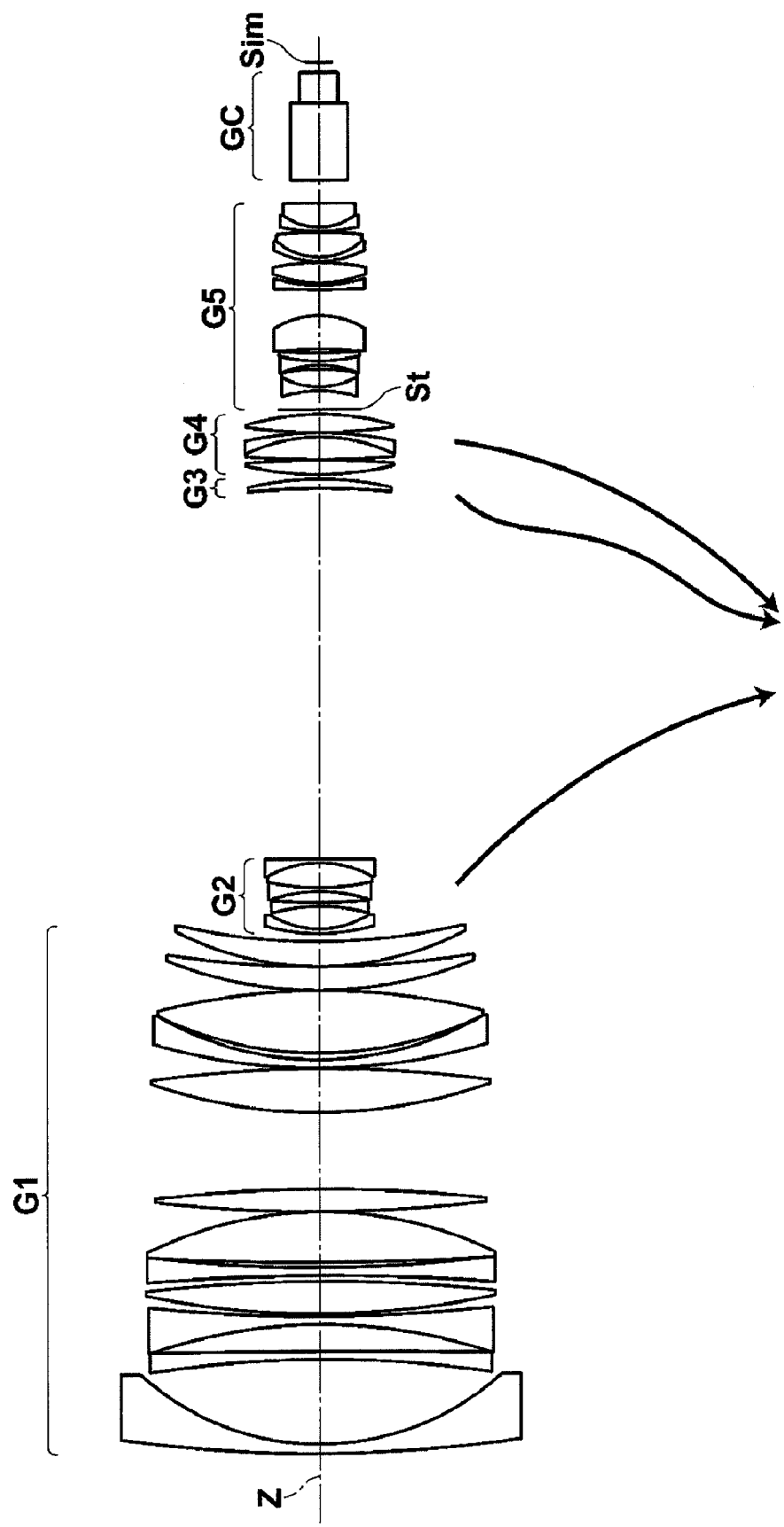
FIG. 5 is a sectional diagram illustrating a lens configuration of a high power zoom lens system according to Example 5 of the invention.
Figure 12A:
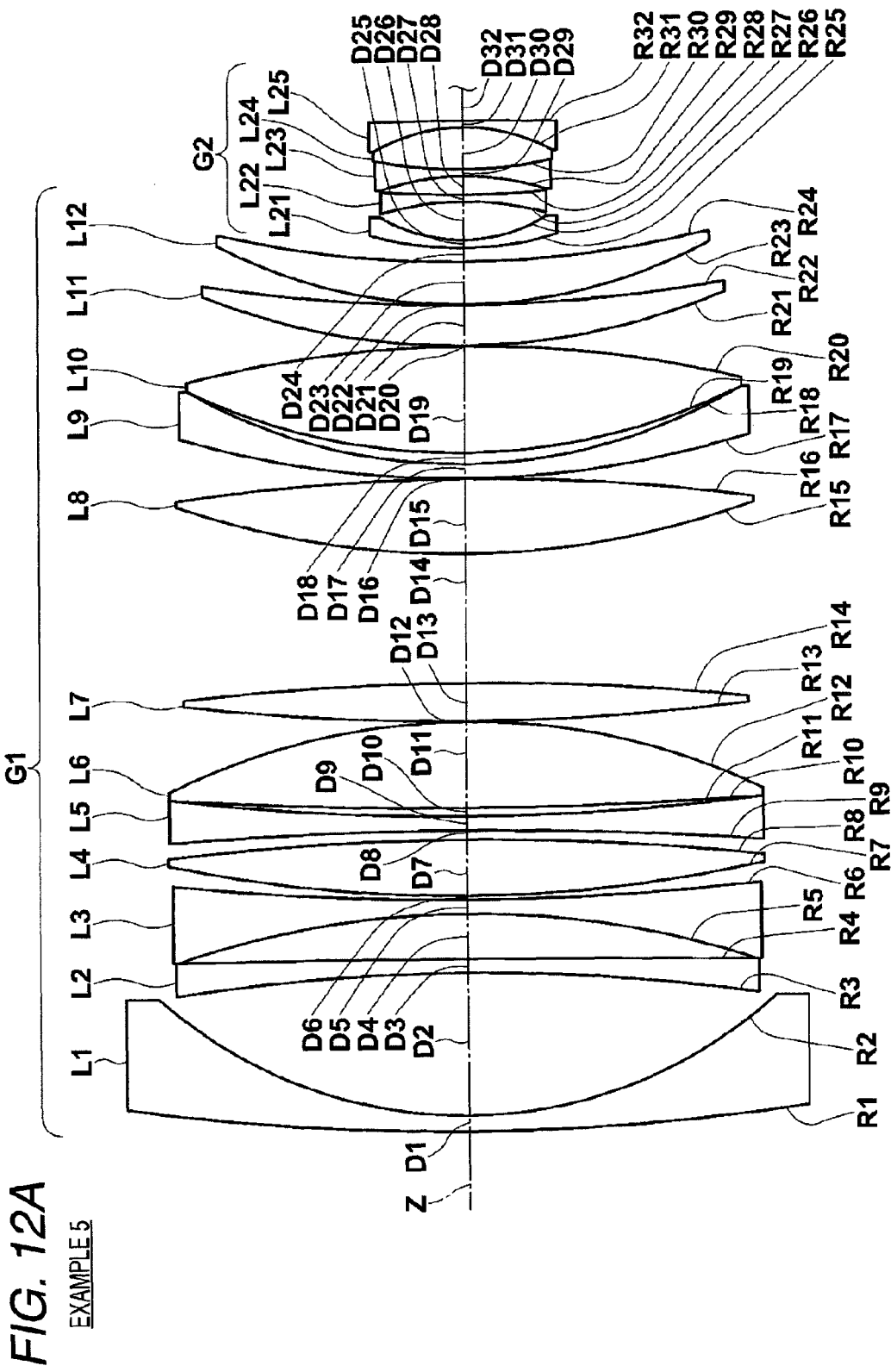
FIG. 12A is a sectional diagram illustrating a detailed configuration of a first lens group and a second lens group of the high power zoom lens system according to Example 5 of the invention.
Figure 12B:
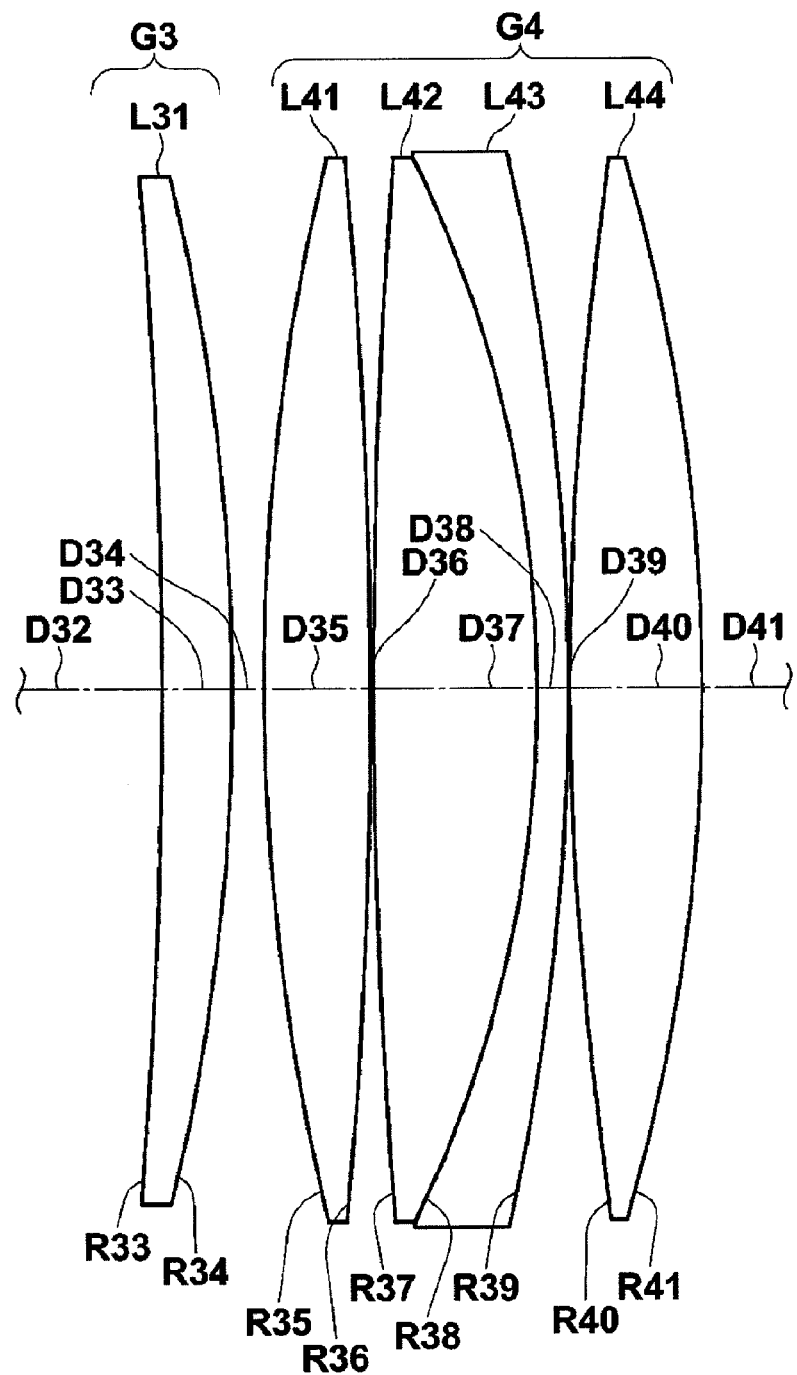
FIG. 12B is a sectional diagram illustrating a detailed configuration of a third lens group and a fourth lens group of the high power zoom lens system according to Example 5 of the invention.
Figure 12C:
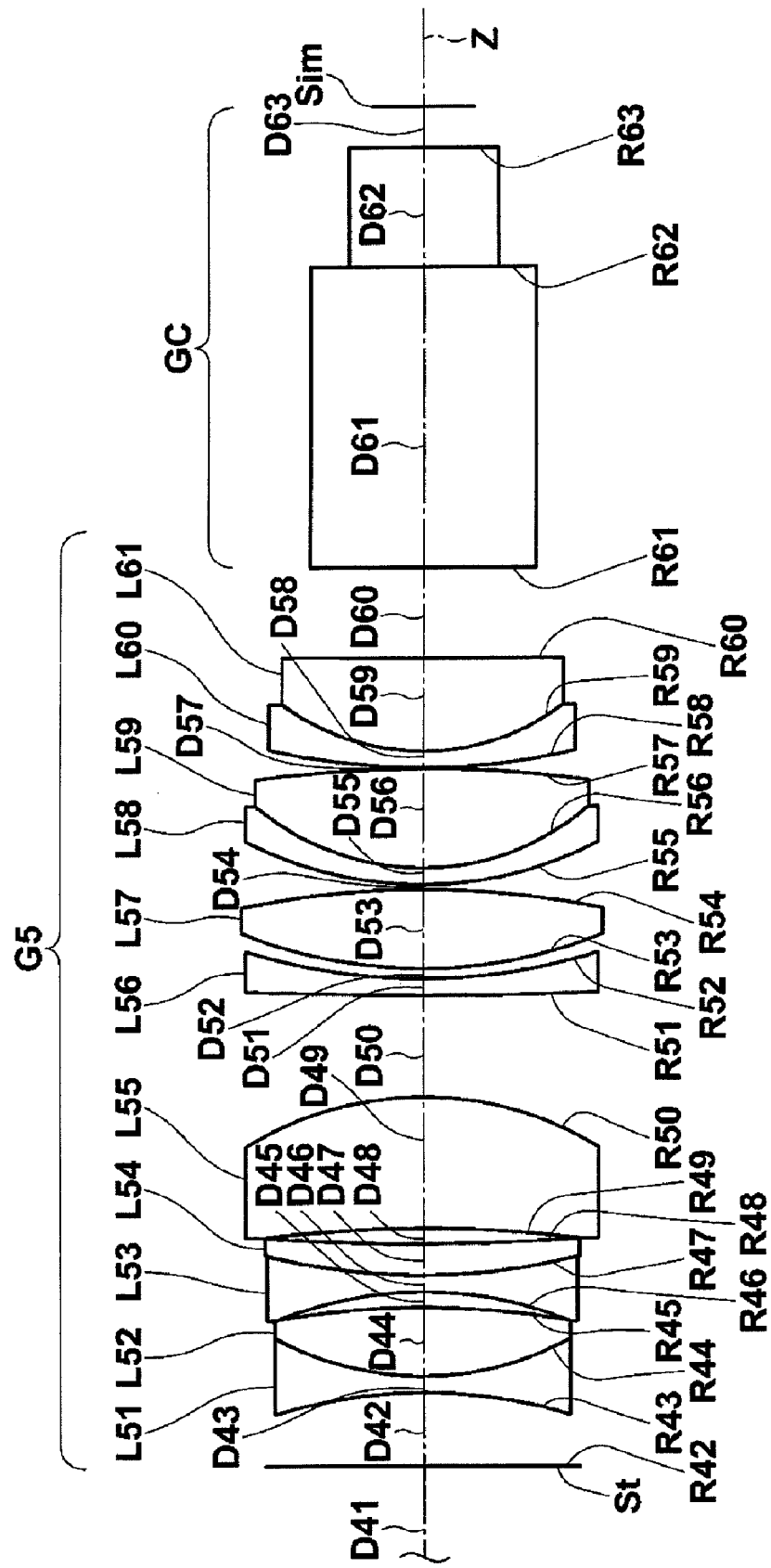
FIG. 12C is a sectional diagram illustrating a detailed configuration from a fifth lens group to an imaging plane of the high power zoom lens system according to Example 5 of the invention.

A lens sectional diagram of Example 5 is shown in FIG. 5, and the detailed configuration is shown in FIGS. 12A to 12C. FIG. 12A shows a detailed configuration of the first lens group G1 and the second lens group G2. FIG. 12B shows a detailed configuration of the third lens group G3 and the fourth lens group G4. FIG. 12C shows a detailed configuration from the fifth lens group G5 to the imaging plane Sim.

In Example 5, the first lens group G1 has a twelve-lens configuration of lenses L1 to L12, the second lens group G2 has a five-lens configuration of lenses L21 to L25, the third lens group G3 has an one-lens configuration of a lens L31, the fourth lens group has a four-lens configuration of lenses L41 to L44, and the fifth lens group G5 has an eleven-lens configuration of lenses L51 to L61 and an aperture diaphragm St.

The surface data of the high power zoom lens system according to Example 5 is represented in Table 13. The various data thereof is represented in Table 14. The aspheric data thereof is represented in Table 15.

TABLE 13

Surface data of Example 5

| S No. | Ri | Di | Nej | vdj |
|---|---|---|---|---|
| 1 | 602.4249 | 4.000 | 1.75844 | 52.3 |
| 2 | 115.9533 | 35.906 | | |
| 3 | −501.2490 | 3.500 | 1.74435 | 52.7 |
| 4 | −5552.5911 | 11.403 | | |
| 5 | −229.1409 | 3.500 | 1.73233 | 54.7 |
| 6 | 702.5416 | 1.000 | | |
| 7 | 356.4516 | 14.100 | 1.81263 | 25.4 |
| 8 | −658.0051 | 2.398 | | |
| 9 | −999.9725 | 3.500 | 1.81263 | 25.4 |
| 10 | 614.8776 | 2.082 | | |
| 11 | 1126.0550 | 21.787 | 1.43496 | 95.1 |
| 12 | −169.4164 | 0.120 | | |
| 13 | 604.5637 | 9.638 | 1.43496 | 95.1 |
| 14 | −648.7133 | 32.735 | | |
| 15 | 219.7250 | 18.840 | 1.43496 | 95.1 |
| 16 | −524.5831 | 0.120 | | |
| 17 | 252.2156 | 3.600 | 1.72309 | 29.5 |
| 18 | 138.8892 | 2.822 | | |
| 19 | 160.7711 | 26.833 | 1.43496 | 95.1 |
| 20 | −286.6558 | 0.120 | | |
| 21 | 174.5465 | 10.234 | 1.49845 | 81.6 |
| 22 | 411.8865 | 0.120 | | |
| 23 | 133.9368 | 10.724 | 1.49845 | 81.6 |
| 24 | 267.6877 | Variable | | |
| 25 | 83.7047 | 2.000 | 1.74435 | 52.7 |
| 26 | 39.7022 | 9.637 | | |
| 27 | −74.8625 | 1.700 | 1.71615 | 53.9 |
| 28 | 243.0118 | 4.688 | | |
| 29 | −64.5297 | 1.700 | 1.71615 | 53.9 |
| 30 | 104.9032 | 10.695 | 1.81263 | 25.4 |
| 31 | −44.8745 | 1.700 | 1.80811 | 46.6 |
| 32 | −1096.7397 | Variable | | |
| 33 | −362.3347 | 4.152 | 1.43985 | 95.0 |
| 34 | −128.7177 | Variable | | |
| 35 | 135.9960 | 6.372 | 1.43985 | 95.0 |
| 36 | −337.5061 | 0.120 | | |
| 37 | 432.4655 | 9.650 | 1.49845 | 81.6 |

TABLE 13-continued

Surface data of Example 5

| S No. | Ri | Di | Nej | vdj |
|---|---|---|---|---|
| 38 | −72.4233 | 1.800 | 1.85495 | 23.9 |
| 39 | −145.4440 | 0.120 | | |
| *40 | 184.3899 | 7.830 | 1.49845 | 81.6 |
| 41 | −111.7699 | Variable | | |
| 42 | ∞(AP) | 8.037 | | |
| 43 | −55.8164 | 1.800 | 1.77621 | 49.6 |
| 44 | 33.2482 | 7.564 | 1.81263 | 25.4 |
| 45 | −91.5511 | 1.739 | | |
| 46 | −42.2292 | 1.800 | 1.80811 | 46.6 |
| 47 | 69.5223 | 3.438 | 1.81263 | 25.4 |
| 48 | 231.0834 | 1.735 | | |
| 49 | −139.9290 | 14.368 | 1.57088 | 63.1 |
| 50 | −36.7999 | 11.168 | | |
| 51 | 529.0729 | 1.800 | 1.88814 | 40.8 |
| 52 | 63.4121 | 1.145 | | |
| 53 | 52.2019 | 8.709 | 1.51825 | 64.1 |
| 54 | −97.1609 | 0.558 | | |
| 55 | 41.2954 | 1.800 | 1.81643 | 22.8 |
| 56 | 27.6118 | 10.982 | 1.48915 | 70.2 |
| 57 | −131.1450 | 0.120 | | |
| 58 | 73.2864 | 1.800 | 1.88814 | 40.8 |
| 59 | 25.5767 | 10.205 | 1.62033 | 63.4 |
| 60 | 1754.4149 | 0.000 | | |
| 61 | ∞ | 33.000 | 1.61170 | 46.5 |
| 62 | ∞ | 13.200 | 1.51825 | 64.1 |
| 63 | ∞ | 14.420 | | |
| IP | ∞ | | | |

TABLE 14

Various data of Example 5

| | D24 | D32 | D34 | D41 |
|---|---|---|---|---|
| 1x | 3.500 | 159.457 | 1.837 | 2.004 |
| 2x | 37.577 | 114.009 | 3.472 | 11.740 |
| 6x | 71.667 | 63.233 | 0.120 | 31.778 |
| 18x | 89.629 | 11.121 | 4.771 | 61.277 |
| 23x | 91.538 | 2.293 | 0.096 | 72.871 |

| Focal length | 7.20~165.60 |
|---|---|
| Fno. | 1.57~2.09 |

TABLE 15

Aspheric data of Example 5
40th surface

| K | 1.000000E+00 |
|---|---|
| B3 | 2.315606E−09 |
| B4 | −3.757699E−07 |
| B5 | −7.942111E−10 |
| B6 | 1.293328E−10 |
| B7 | −1.852334E−11 |
| B8 | 4.308518E−13 |
| B9 | 7.145468E−14 |
| B10 | −6.417790E−15 |
| B11 | 1.837500E−16 |
| B12 | 1.300051E−18 |
| B13 | −2.065409E−19 |
| B14 | 6.723806E−21 |
| B15 | −2.175365E−22 |
| B16 | 3.246417E−24 |
| B17 | 2.225695E−25 |
| B18 | −1.226139E−26 |
| B19 | 2.304419E−28 |
| B20 | −1.561412E−30 |

Example 6

Figure 6:
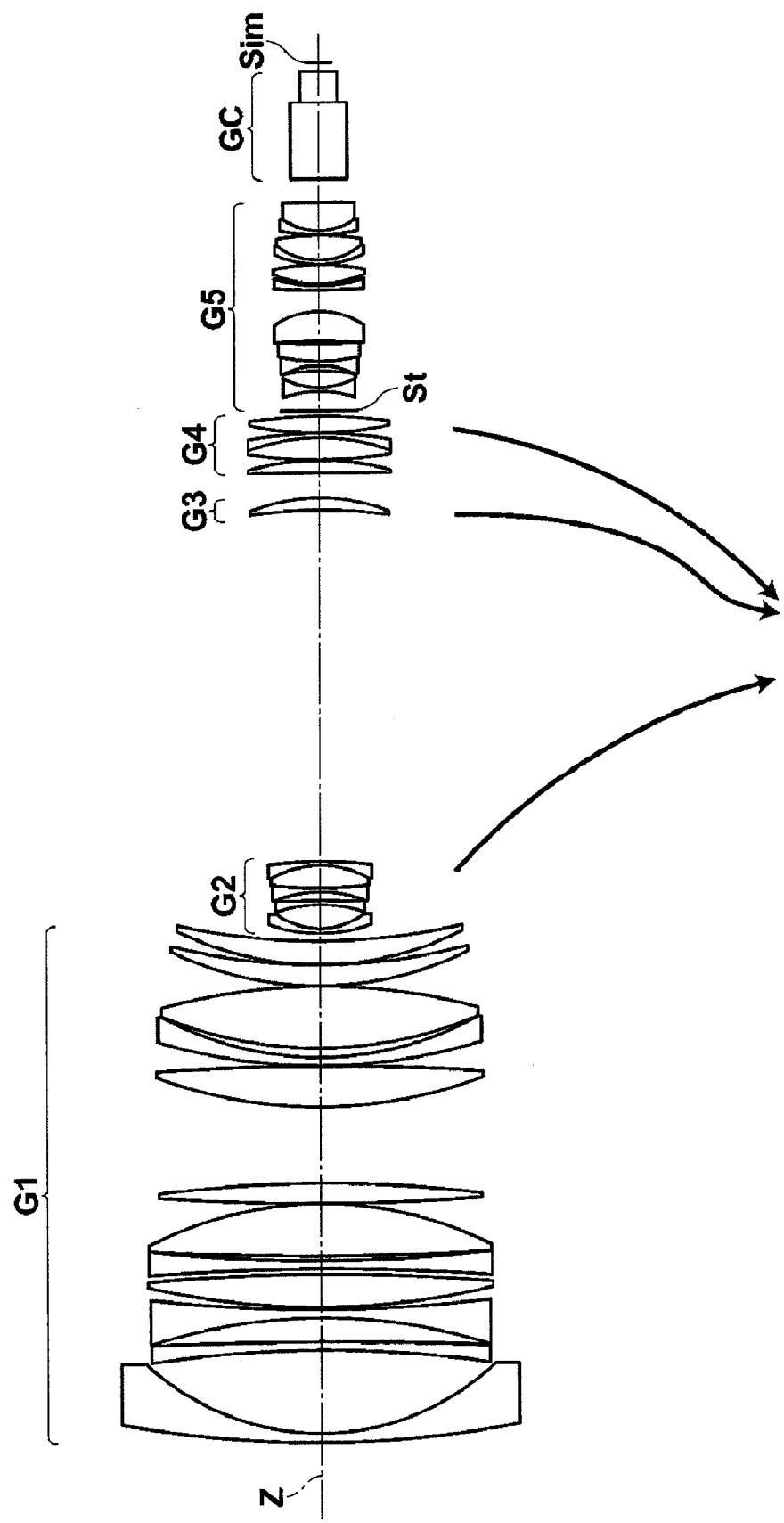
FIG. 6 is a sectional diagram illustrating a lens configuration of a high power zoom lens system according to Example 6 of the invention.
Figure 13A:
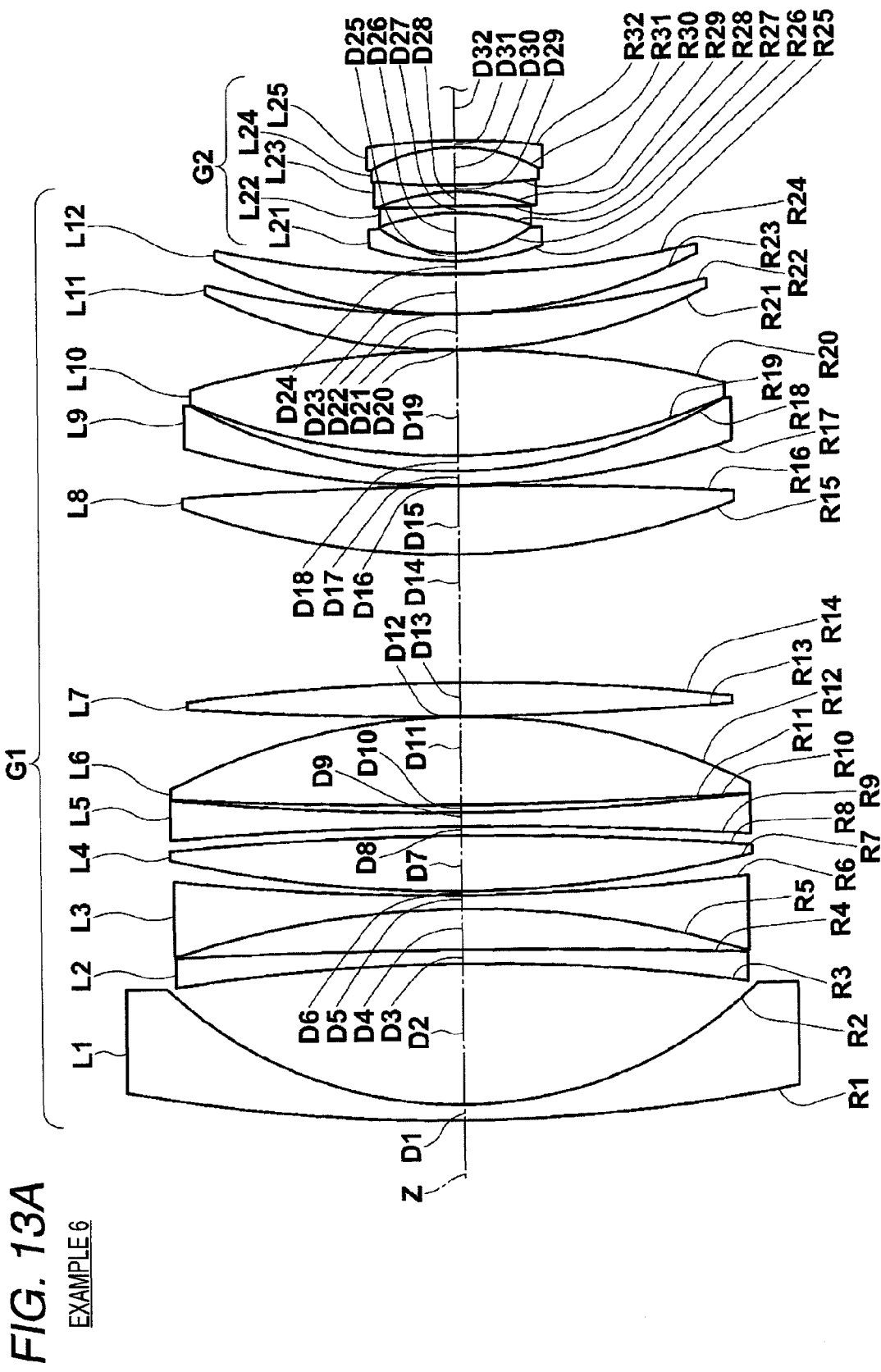
FIG. 13A is a sectional diagram illustrating a detailed configuration of a first lens group and a second lens group of the high power zoom lens system according to Example 6 of the invention.
Figure 13B:
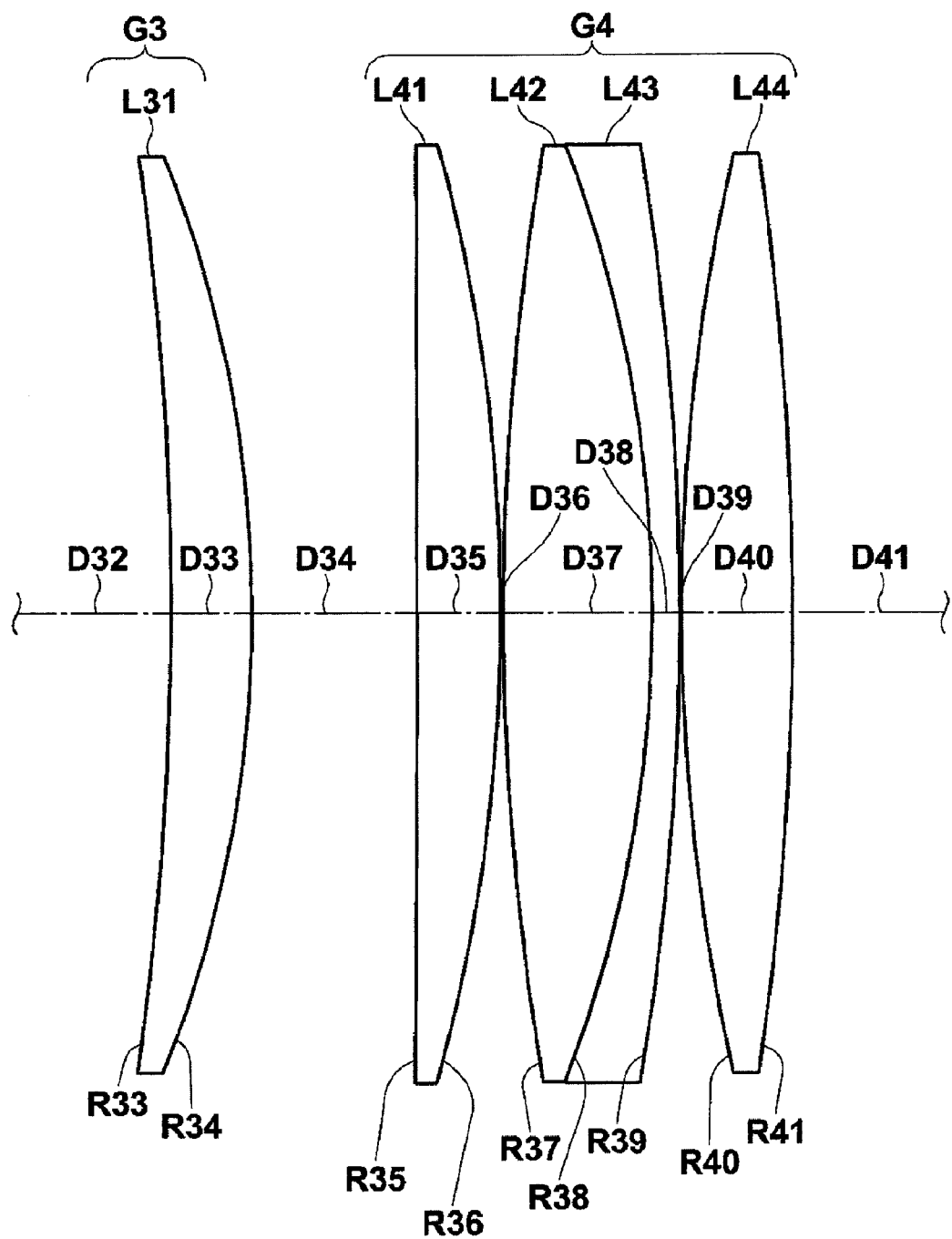
FIG. 13B is a sectional diagram illustrating a detailed configuration of a third lens group and a fourth lens group of the high power zoom lens system according to Example 6 of the invention.
Figure 13C:
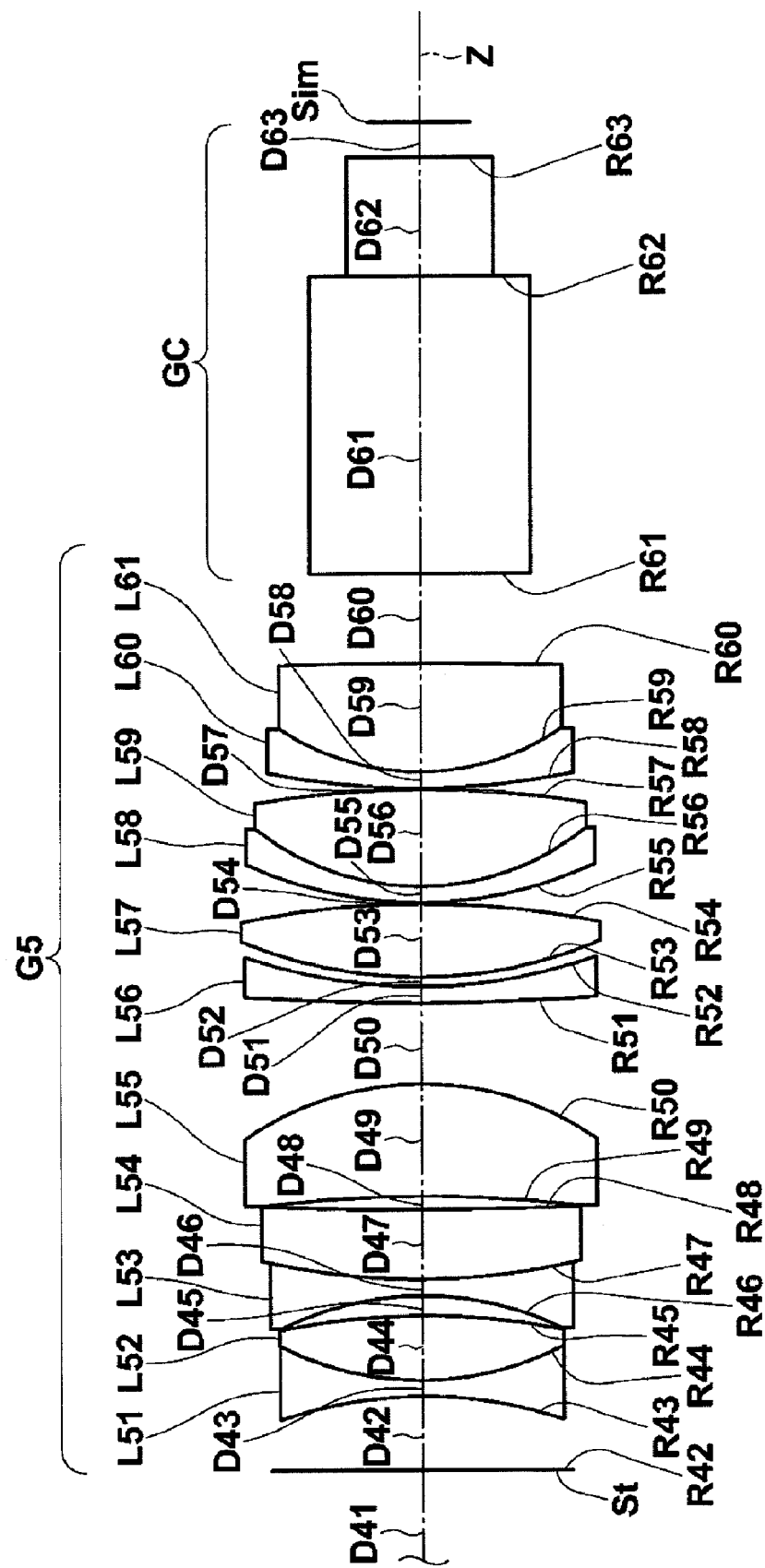
FIG. 13C is a sectional diagram illustrating a detailed configuration from a fifth lens group to an imaging plane of the high power zoom lens system according to Example 6 of the invention.

A lens sectional diagram of Example 6 is shown in FIG. 6, and the detailed configuration is shown in FIGS. 13A to 13C. FIG. 13A shows a detailed configuration of the first lens group G1 and the second lens group G2. FIG. 13B shows a detailed configuration of the third lens group G3 and the fourth lens group G4. FIG. 13C shows a detailed configuration from the fifth lens group G5 to the imaging plane Sim.

In Example 6, the first lens group G1 has a twelve-lens configuration of lenses L1 to L12, the second lens group G2 has a five-lens configuration of lenses L21 to L25, the third lens group G3 has an one-lens configuration of a lens L31, the fourth lens group has a four-lens configuration of lenses L41 to L44, and the fifth lens group G5 has an eleven-lens configuration of lenses L5 to L61 and an aperture diaphragm St.

The surface data of the high power zoom lens system according to Example 6 is represented in Table 16. The various data thereof is represented in Table 17. The aspheric data thereof is represented in Table 18.

TABLE 16

Surface data of Example 6

| S No. | Ri | Di | Nej | νdj |
|---|---|---|---|---|
| 1 | 458.8197 | 4.000 | 1.76730 | 50.6 |
| 2 | 108.6734 | 35.617 | | |
| 3 | −503.0553 | 3.500 | 1.74767 | 52.0 |
| 4 | −1979.6228 | 10.426 | | |
| 5 | −235.3778 | 3.500 | 1.74893 | 51.4 |
| 6 | 620.8133 | 1.000 | | |
| 7 | 317.3104 | 14.206 | 1.81263 | 25.4 |
| 8 | −856.6767 | 2.399 | | |
| 9 | −991.2615 | 3.500 | 1.81263 | 25.4 |
| 10 | 675.7109 | 1.981 | | |
| 11 | 1287.3631 | 22.493 | 1.43496 | 95.1 |
| 12 | −161.1693 | 0.120 | | |
| 13 | 965.9824 | 8.601 | 1.43496 | 95.1 |
| 14 | −570.0800 | 32.574 | | |
| 15 | 199.6003 | 17.565 | 1.43496 | 95.1 |
| 16 | −1082.3215 | 0.120 | | |
| 17 | 239.2270 | 3.600 | 1.72309 | 29.5 |
| 18 | 139.9081 | 3.964 | | |
| 19 | 173.9036 | 26.717 | 1.43496 | 95.1 |
| 20 | −255.1438 | 0.120 | | |
| 21 | 143.5091 | 9.040 | 1.49845 | 81.6 |
| 22 | 249.6559 | 0.120 | | |
| 23 | 136.0435 | 10.173 | 1.49845 | 81.6 |
| 24 | 277.8784 | Variable | | |
| *25 | 66.2803 | 2.000 | 1.74586 | 52.2 |
| 26 | 31.3802 | 10.279 | | |
| 27 | −57.5456 | 1.700 | 1.71804 | 53.6 |
| 28 | −1296.2781 | 3.707 | | |
| 29 | −53.4058 | 1.700 | 1.71834 | 53.4 |
| 30 | 185.6488 | 9.589 | 1.81263 | 25.4 |
| 31 | −43.9732 | 1.700 | 1.80811 | 46.6 |
| 32 | −179.4510 | Variable | | |
| 33 | −211.6891 | 5.281 | 1.43985 | 95.0 |
| 34 | −80.3068 | Variable | | |
| 35 | −2520.9182 | 5.395 | 1.43985 | 95.0 |
| 36 | −115.2212 | 0.120 | | |
| 37 | 188.5729 | 9.650 | 1.49845 | 81.6 |
| 38 | −84.5988 | 1.800 | 1.85495 | 23.9 |
| 39 | −178.0960 | 0.120 | | |
| 40 | 137.3204 | 7.225 | 1.49845 | 81.6 |
| 41 | −199.5720 | Variable | | |
| 42 | ∞(AP) | 8.159 | | |
| 43 | −48.0415 | 1.800 | 1.77621 | 49.6 |
| 44 | 33.5884 | 7.166 | 1.81263 | 25.4 |
| 45 | −77.0507 | 2.202 | | |
| 46 | −34.9225 | 1.800 | 1.80811 | 46.6 |
| 47 | 75.7655 | 7.720 | 1.81263 | 25.4 |
| 48 | 457.6580 | 1.496 | | |
| 49 | −140.0353 | 12.450 | 1.57088 | 63.1 |
| 50 | −33.7922 | 8.948 | | |

TABLE 16-continued

Surface data of Example 6

| S No. | Ri | Di | Nej | νdj |
|---|---|---|---|---|
| 51 | 298.7856 | 1.800 | 1.88814 | 40.8 |
| 52 | 58.5207 | 1.017 | | |
| 53 | 50.1771 | 8.143 | 1.51825 | 64.1 |
| 54 | −97.5302 | 0.127 | | |
| 55 | 45.1867 | 1.800 | 1.81643 | 22.8 |
| 56 | 28.8939 | 10.775 | 1.48915 | 70.2 |
| 57 | −111.7599 | 0.120 | | |
| 58 | 84.3876 | 1.800 | 1.88814 | 40.8 |
| 59 | 27.1384 | 12.128 | 1.62033 | 63.4 |
| 60 | −613.0379 | 0.000 | | |
| 61 | ∞ | 33.000 | 1.61170 | 46.5 |
| 62 | ∞ | 13.200 | 1.51825 | 64.1 |
| 63 | ∞ | 13.830 | | |
| IP | ∞ | | | |

TABLE 17

Various data of Example 6

| | D24 | D32 | D34 | D41 |
|---|---|---|---|---|
| 1x | 3.283 | 151.846 | 10.736 | 2.483 |
| 2x | 41.640 | 111.830 | 4.128 | 10.749 |
| 6x | 77.761 | 61.328 | 0.120 | 29.139 |
| 18x | 97.090 | 11.311 | 4.893 | 55.055 |
| 23x | 98.660 | 2.012 | 0.119 | 67.558 |

Focal length 6.99~160.81
Fno. 1.57~2.10

TABLE 18

Aspheric data of Example 6
25th surface

| K | 1.000000E+00 |
|---|---|
| B3 | −8.433239E−10 |
| B4 | 2.123001E−07 |
| B5 | −3.333804E−10 |
| B6 | −1.999290E−11 |
| B7 | −3.318926E−12 |
| B8 | −7.824388E−14 |
| B9 | 2.660079E−14 |
| B10 | 9.822009E−17 |
| B11 | −1.461077E−16 |
| B12 | 3.168126E−18 |
| B13 | 2.440386E−19 |
| B14 | −1.150793E−21 |
| B15 | −7.231254E−22 |
| B16 | 3.208005E−24 |
| B17 | 1.383411E−24 |
| B18 | −2.720865E−26 |
| B19 | −5.488985E−28 |
| B20 | 1.460571E−29 |

Example 7

Figure 7:
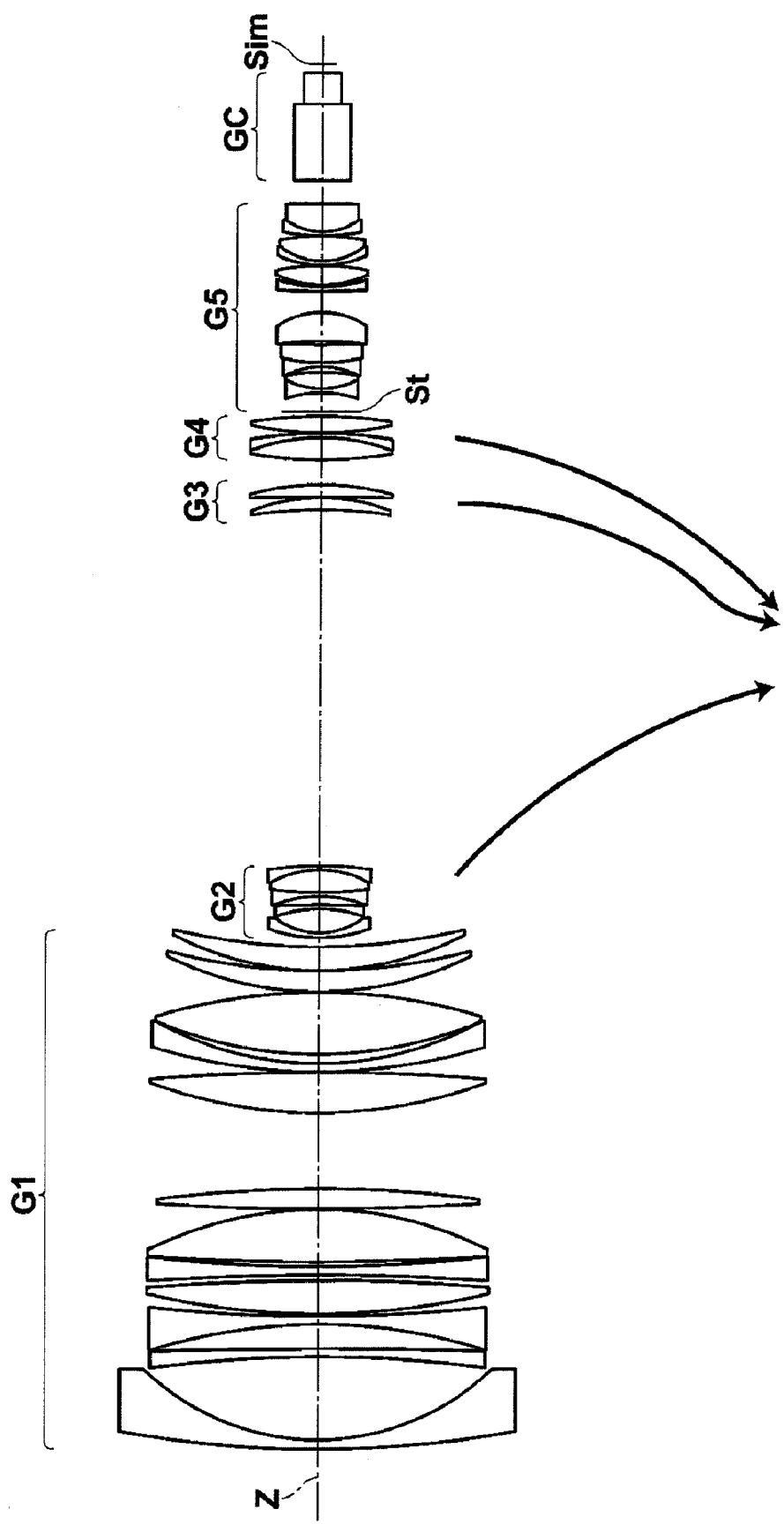
FIG. 7 is a sectional diagram illustrating a lens configuration of a high power zoom lens system according to Example 7 of the invention.
Figure 14A:
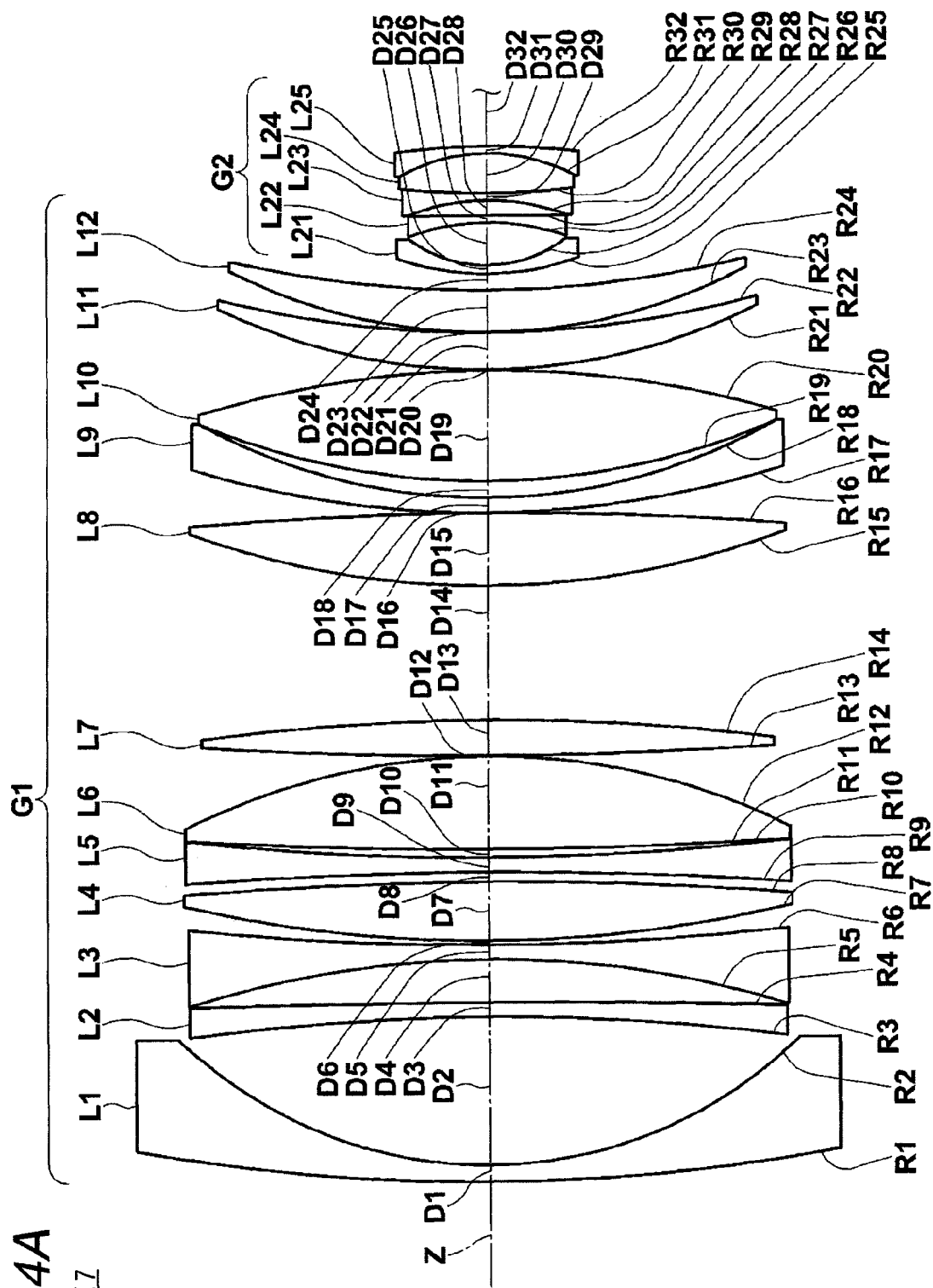
FIG. 14A is a sectional diagram illustrating a detailed configuration of a first lens group and a second lens group of the high power zoom lens system according to Example 7 of the invention.
Figure 14B:
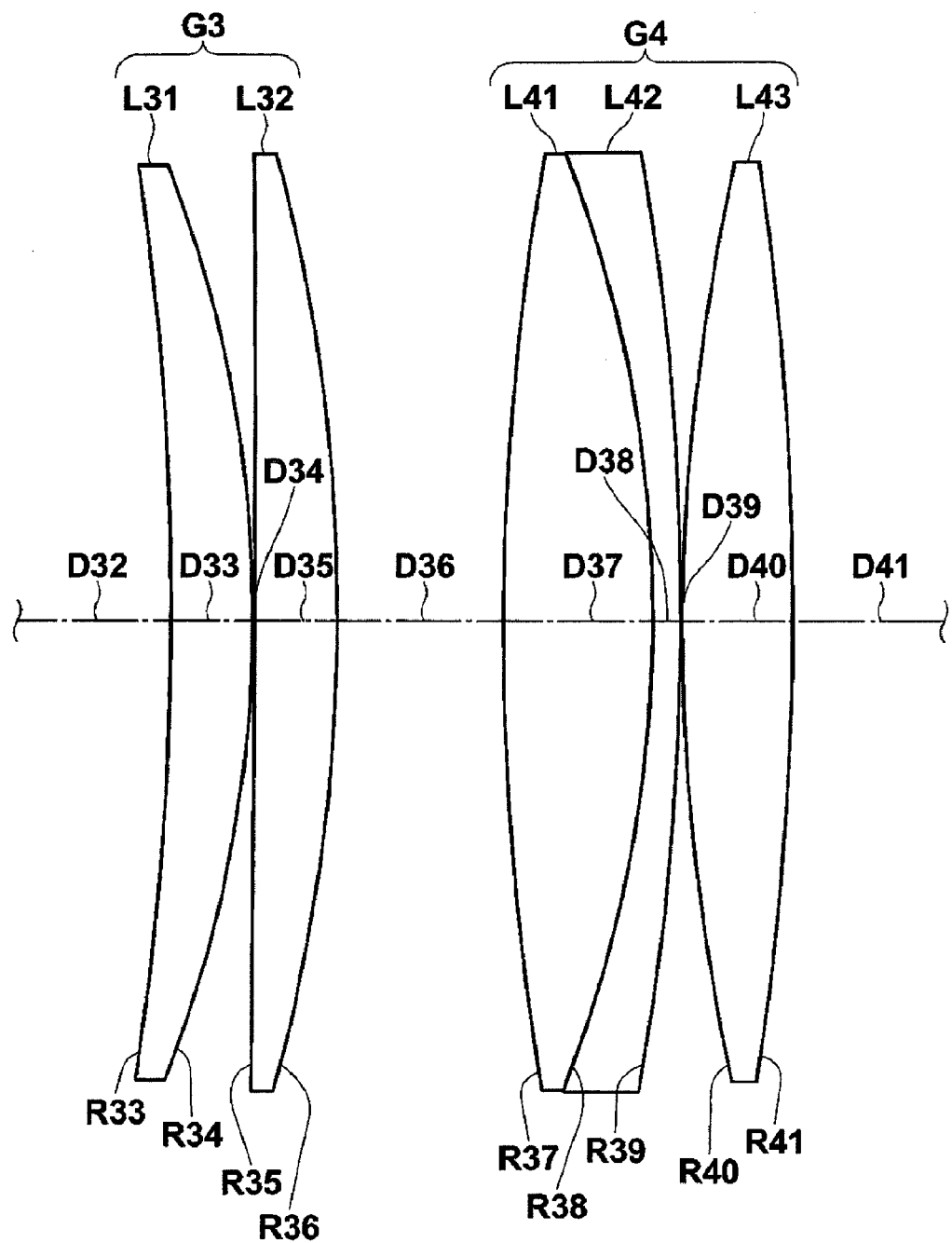
FIG. 14B is a sectional diagram illustrating a detailed configuration of a third lens group and a fourth lens group of the high power zoom lens system according to Example 7 of the invention.
Figure 14C:
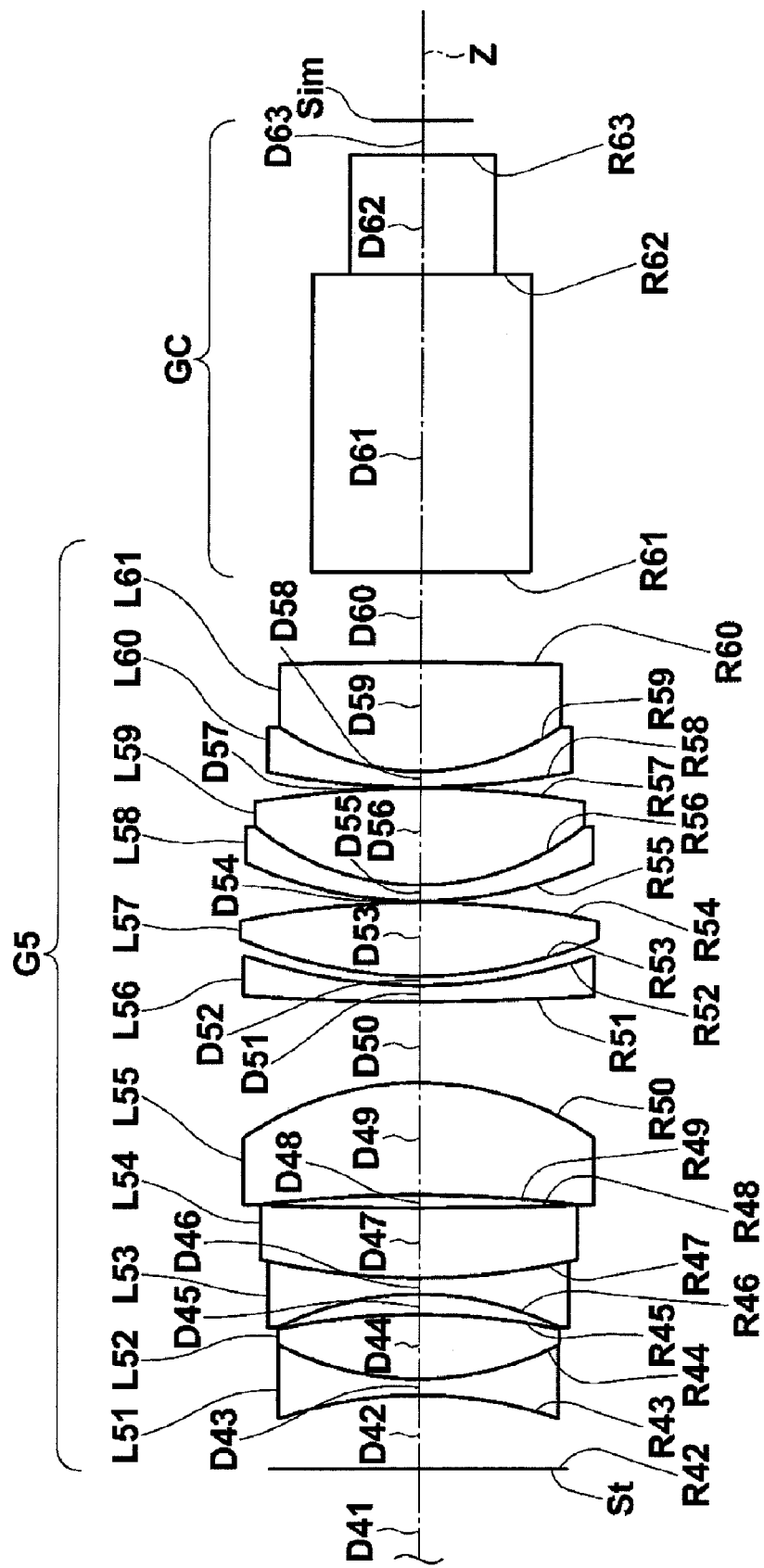
FIG. 14C is a sectional diagram illustrating a detailed configuration from a fifth lens group to an imaging plane of the high power zoom lens system according to Example 7 of the invention.
Figure 15:
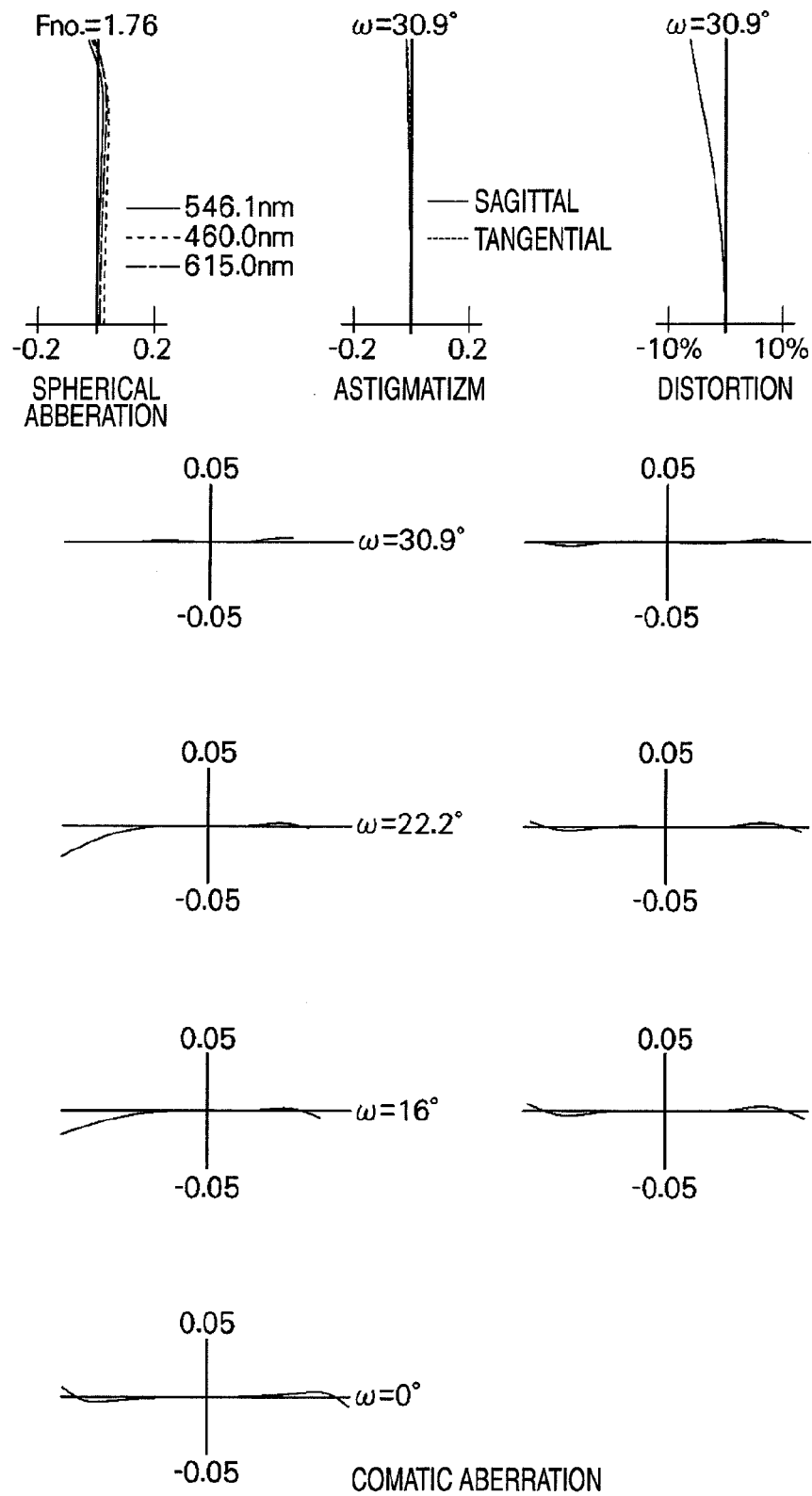
FIG. 15 is a diagram illustrating aberrations of the high power zoom lens system according to Example 1 of the invention.
Figure 16:
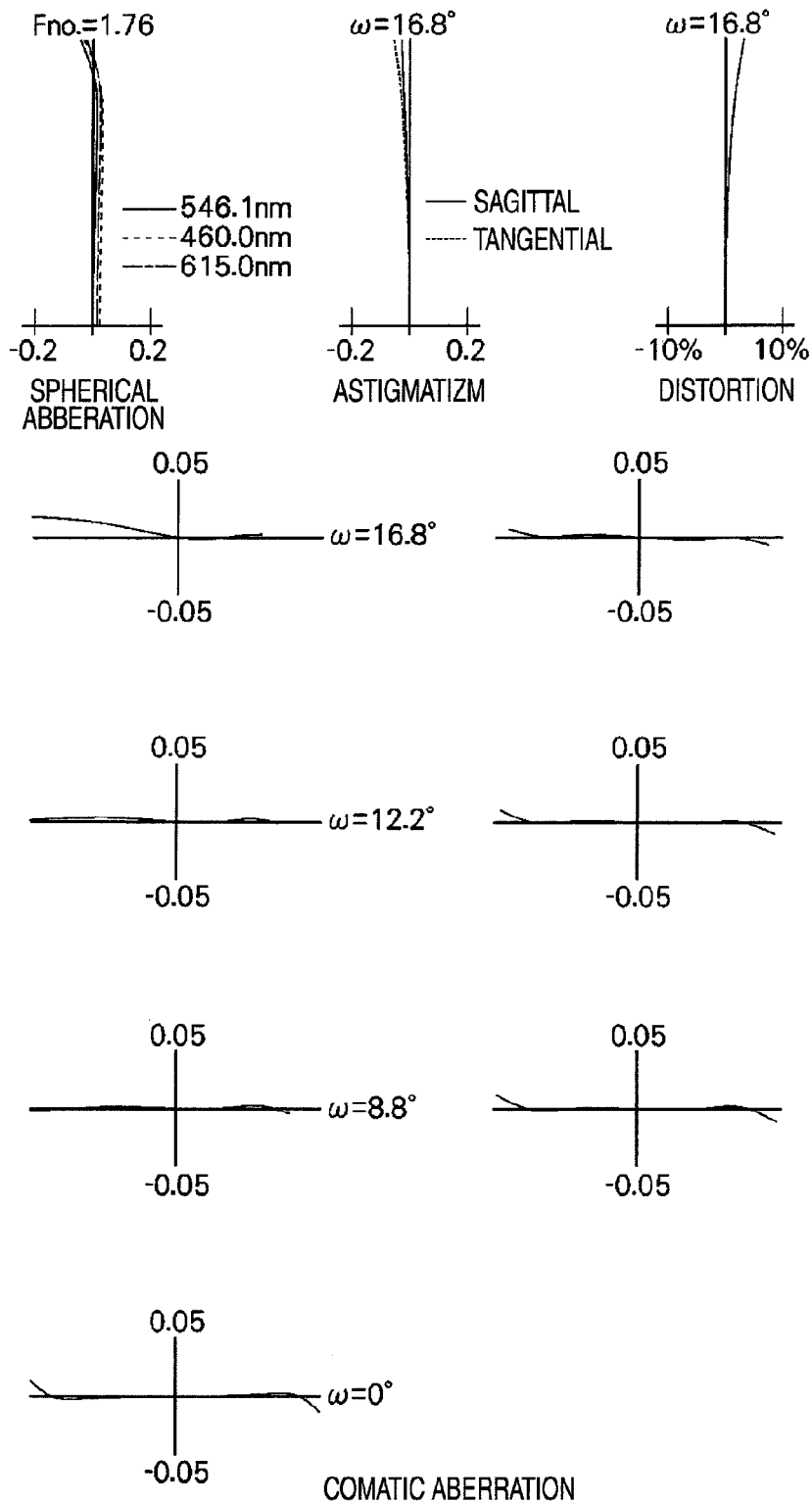
FIG. 16 is a diagram illustrating aberrations of the high power zoom lens system according to Example 1 of the invention.
Figure 17:
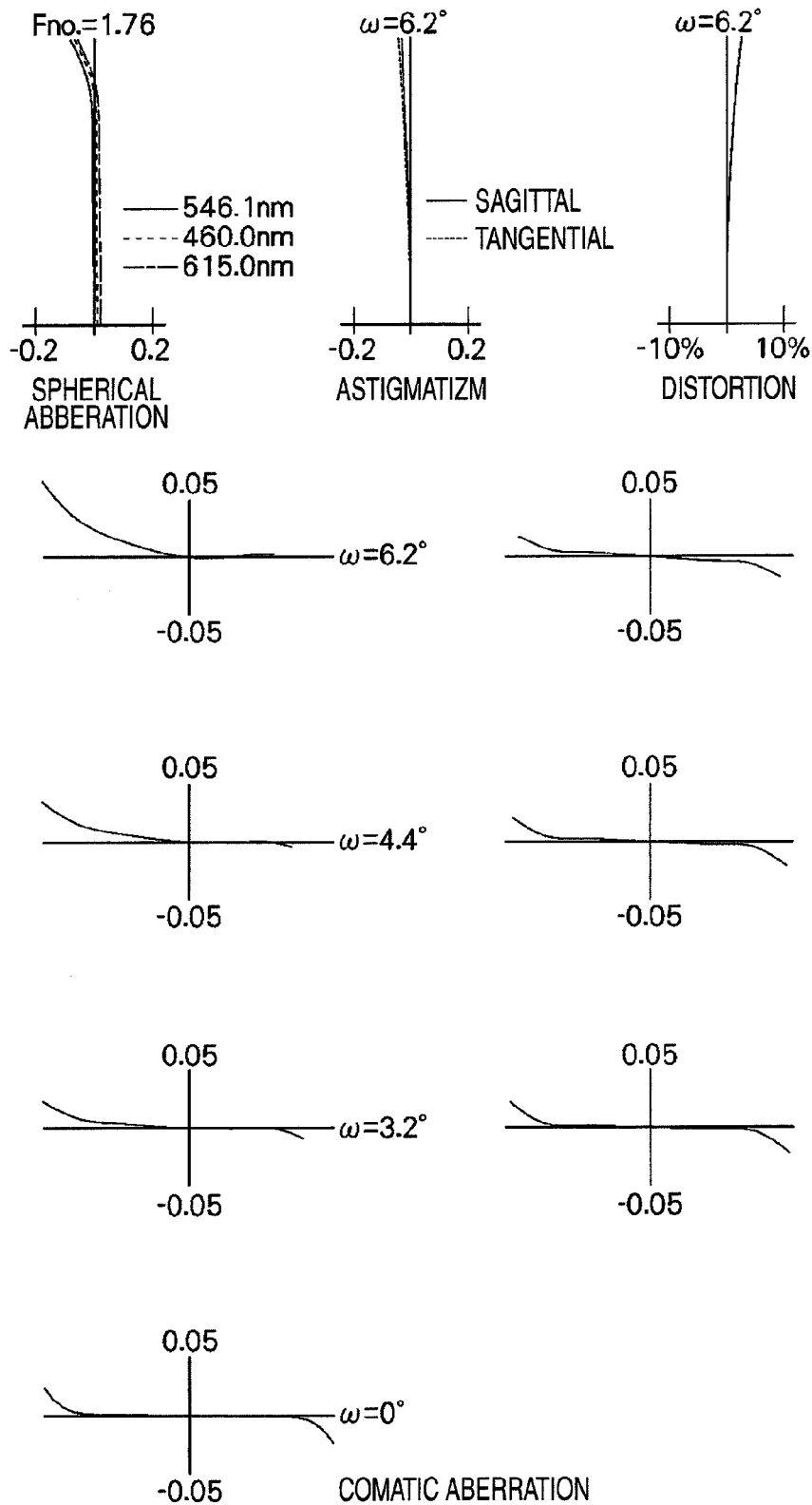
FIG. 17 is a diagram illustrating aberrations of the high power zoom lens system according to Example 1 of the invention.
Figure 18:
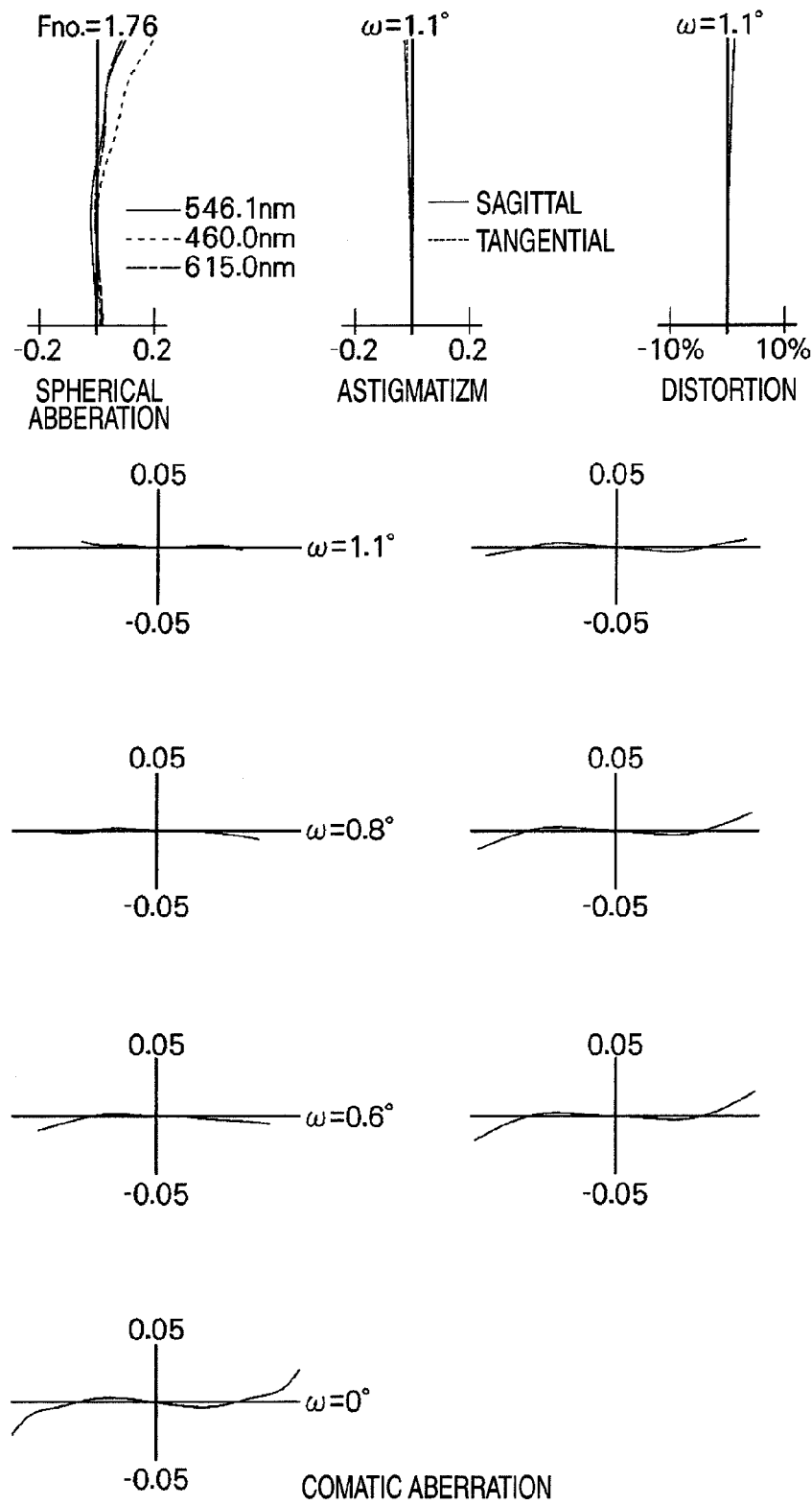
FIG. 18 is a diagram illustrating aberrations of the high power zoom lens system according to Example 1 of the invention.
Figure 19:
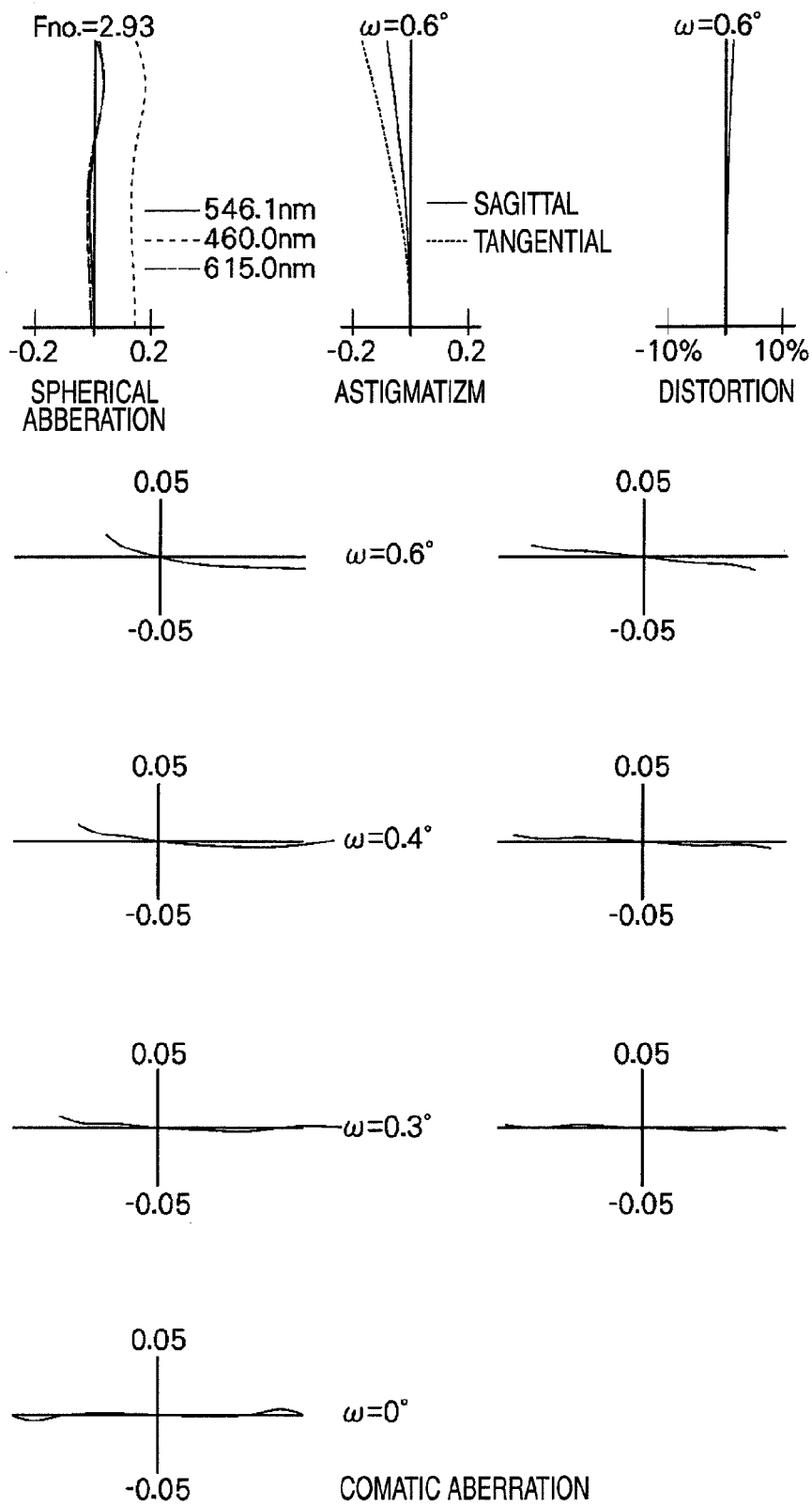
FIG. 19 is a diagram illustrating aberrations of the high power zoom lens system according to Example 1 of the invention.
Figure 20:
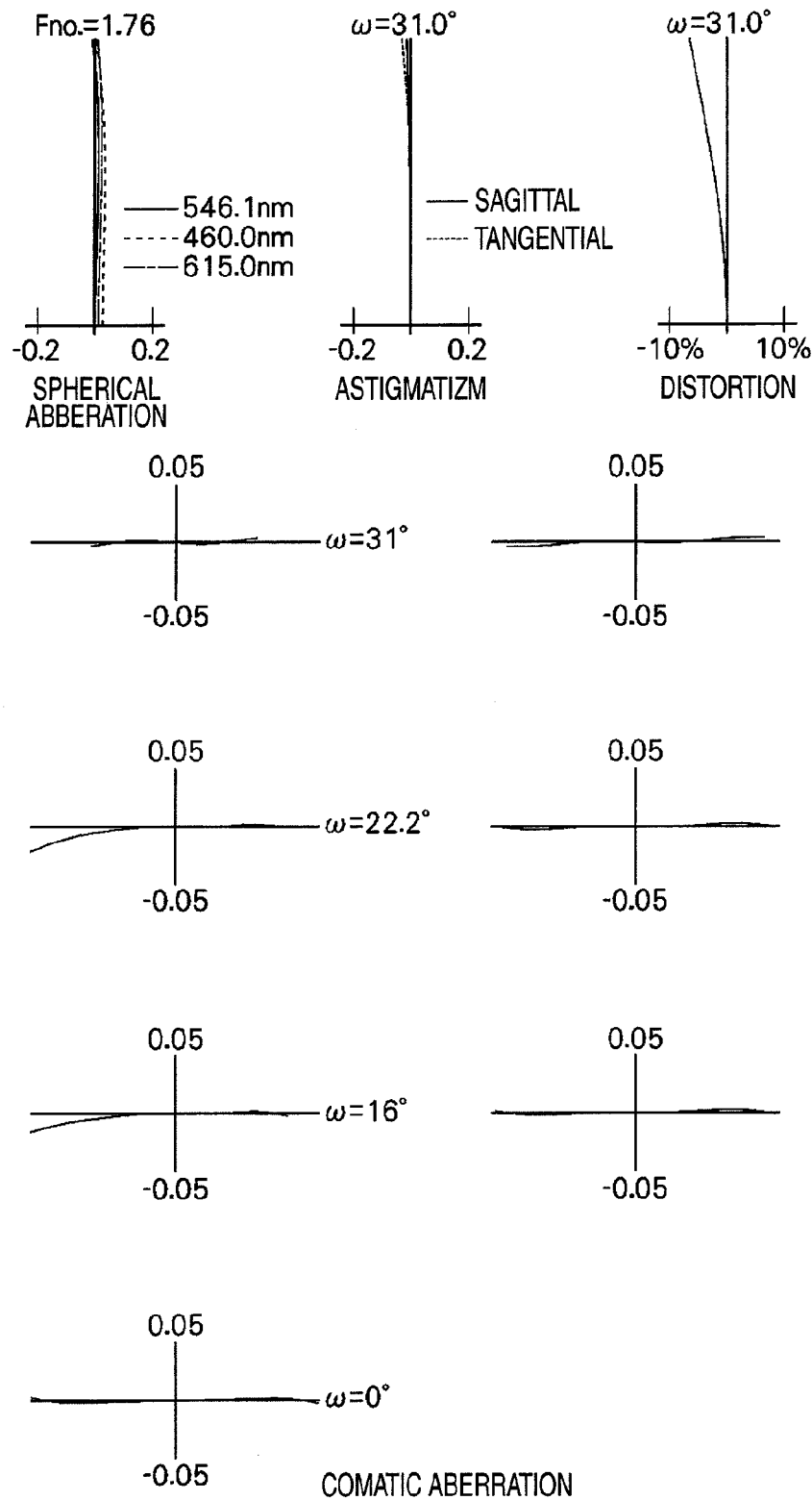
FIG. 20 is a diagram illustrating aberrations of the high power zoom lens system according to Example 2 of the invention.
Figure 21:
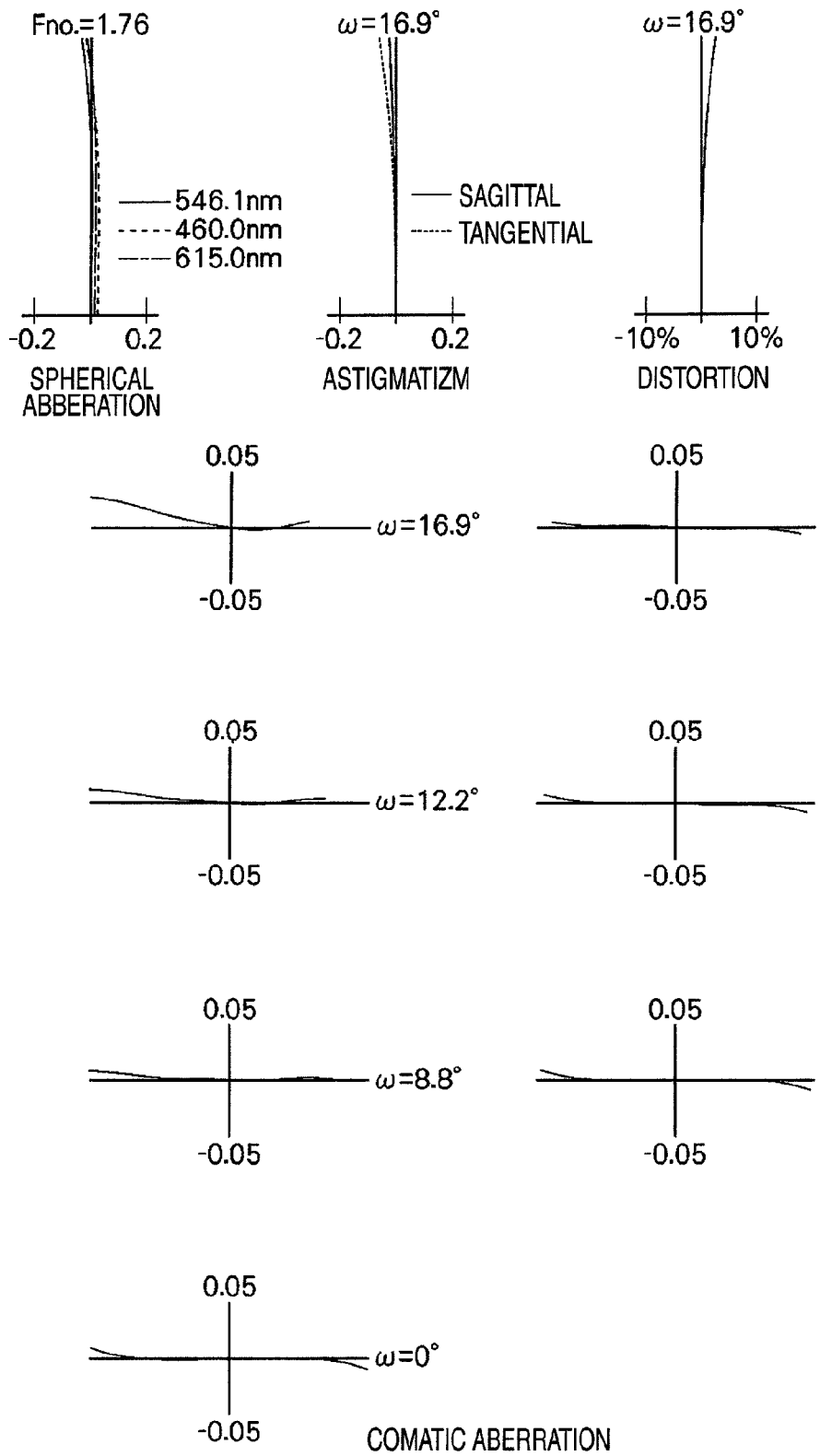
FIG. 21 is a diagram illustrating aberrations of the high power zoom lens system according to Example 2 of the invention.
Figure 22:
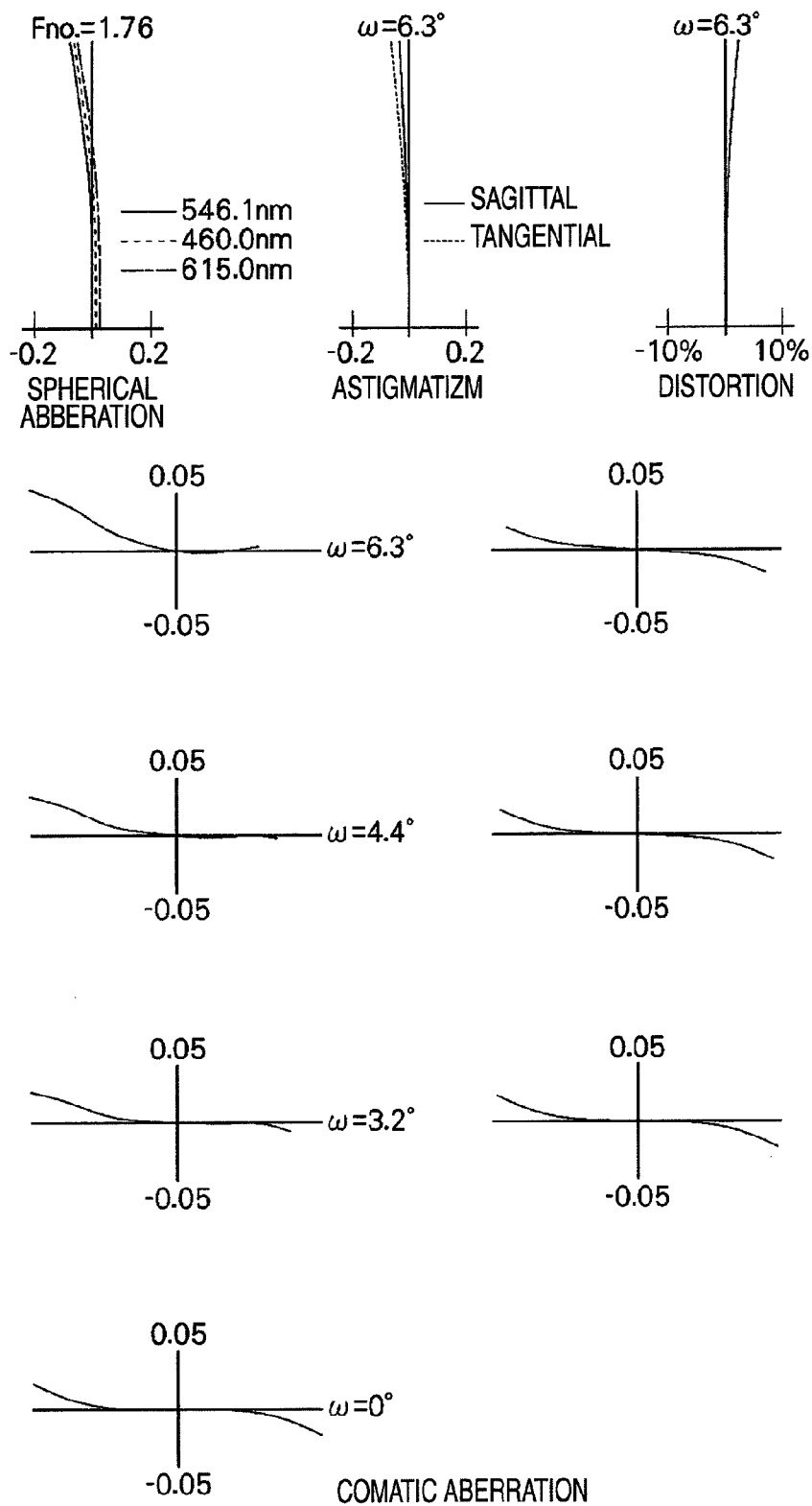
FIG. 22 is a diagram illustrating aberrations of the high power zoom lens system according to Example 2 of the invention.
Figure 23:
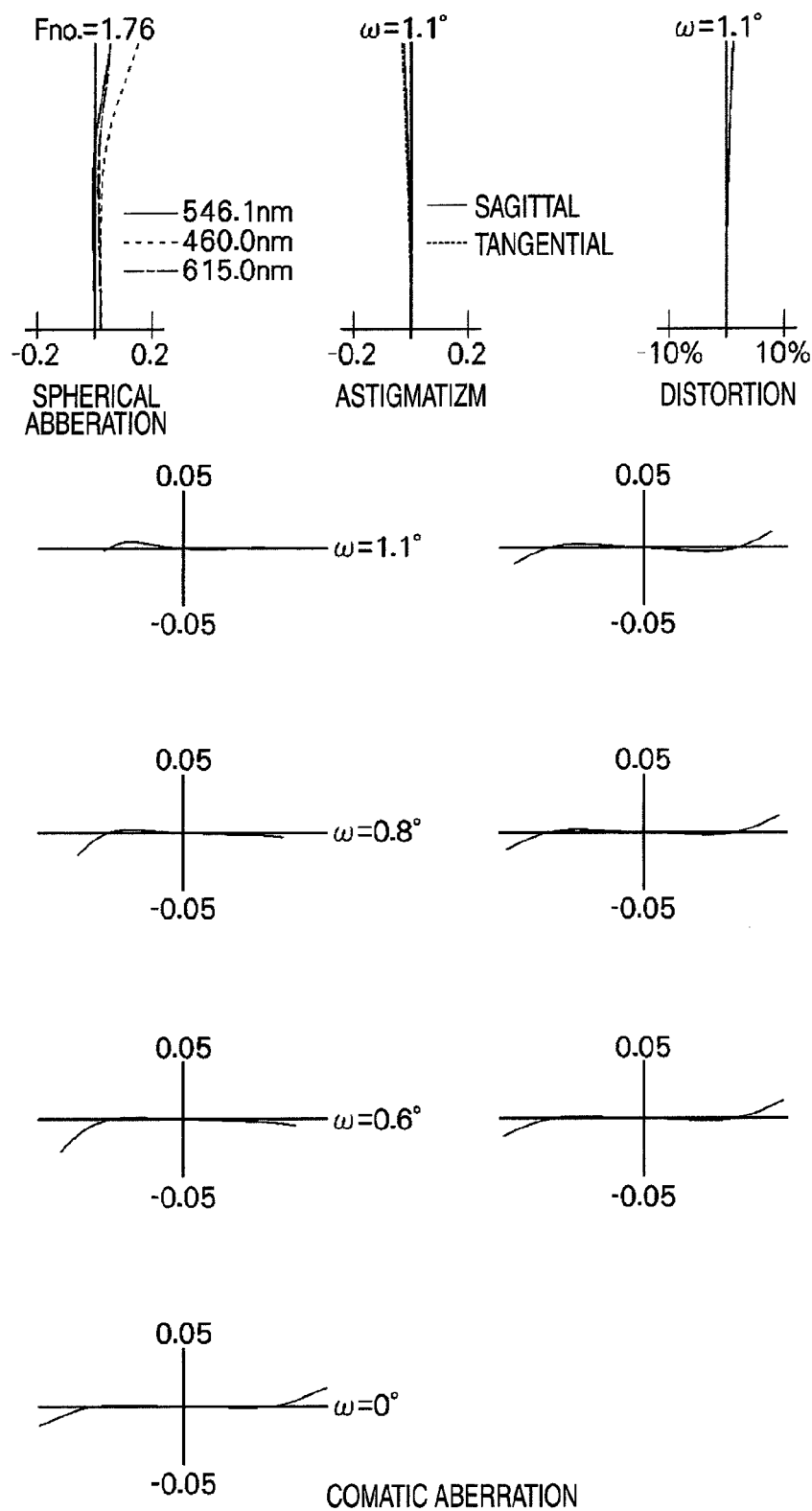
FIG. 23 is a diagram illustrating aberrations of the high power zoom lens system according to Example 2 of the invention.
Figure 24:
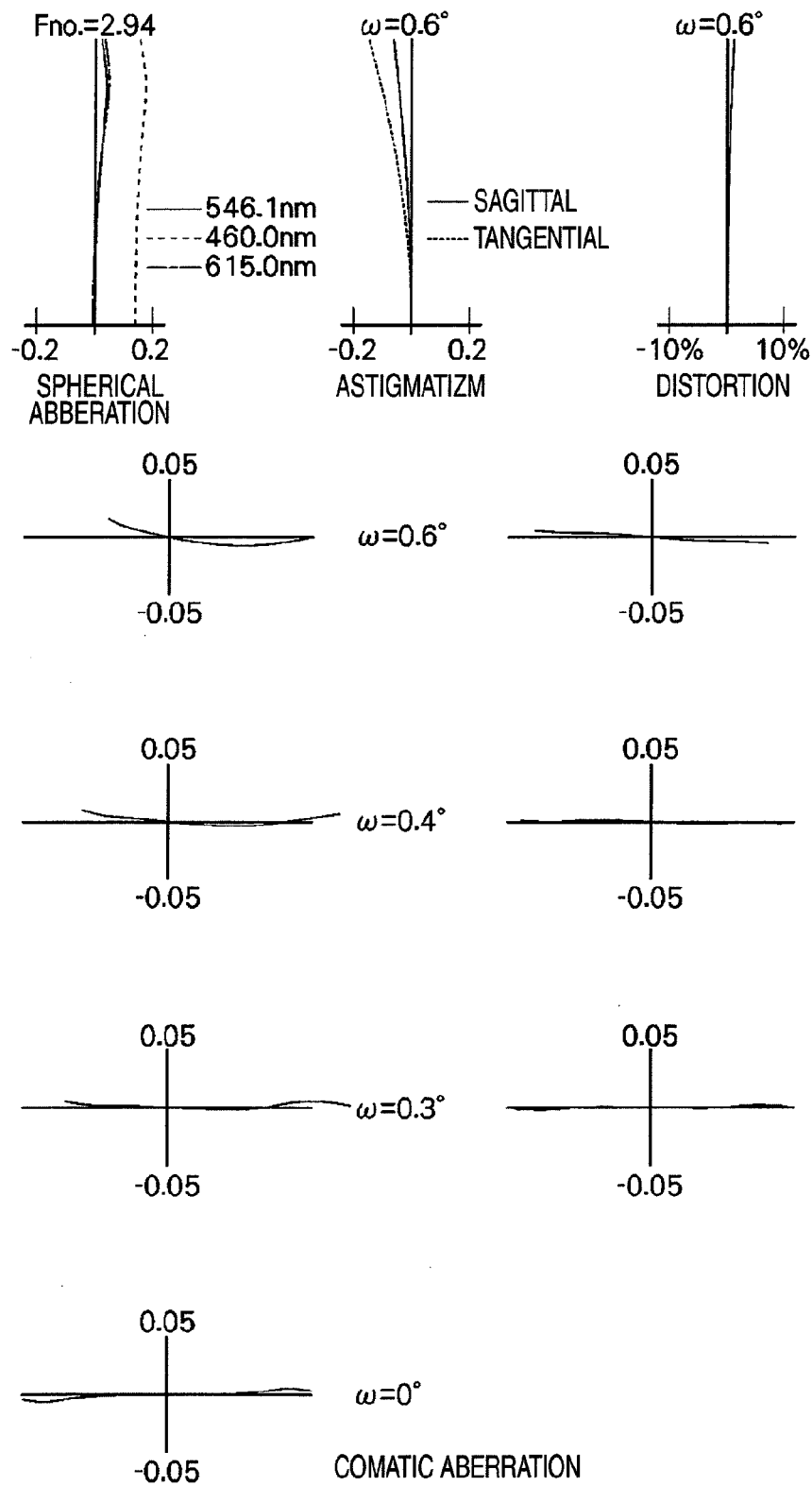
FIG. 24 is a diagram illustrating aberrations of the high power zoom lens system according to Example 2 of the invention.
Figure 25:
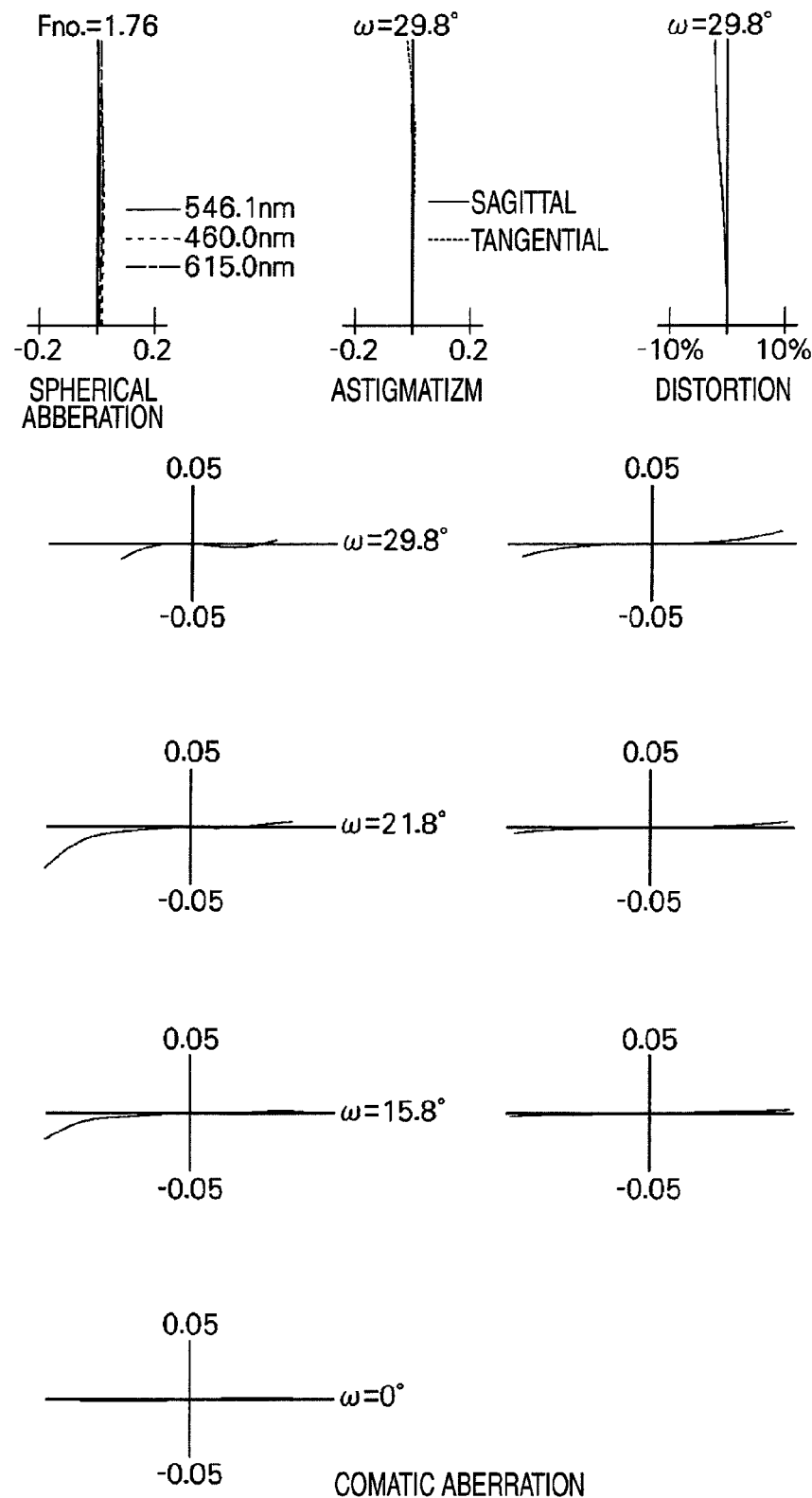
FIG. 25 is a diagram illustrating aberrations of the high power zoom lens system according to Example 3 of the invention.
Figure 26:
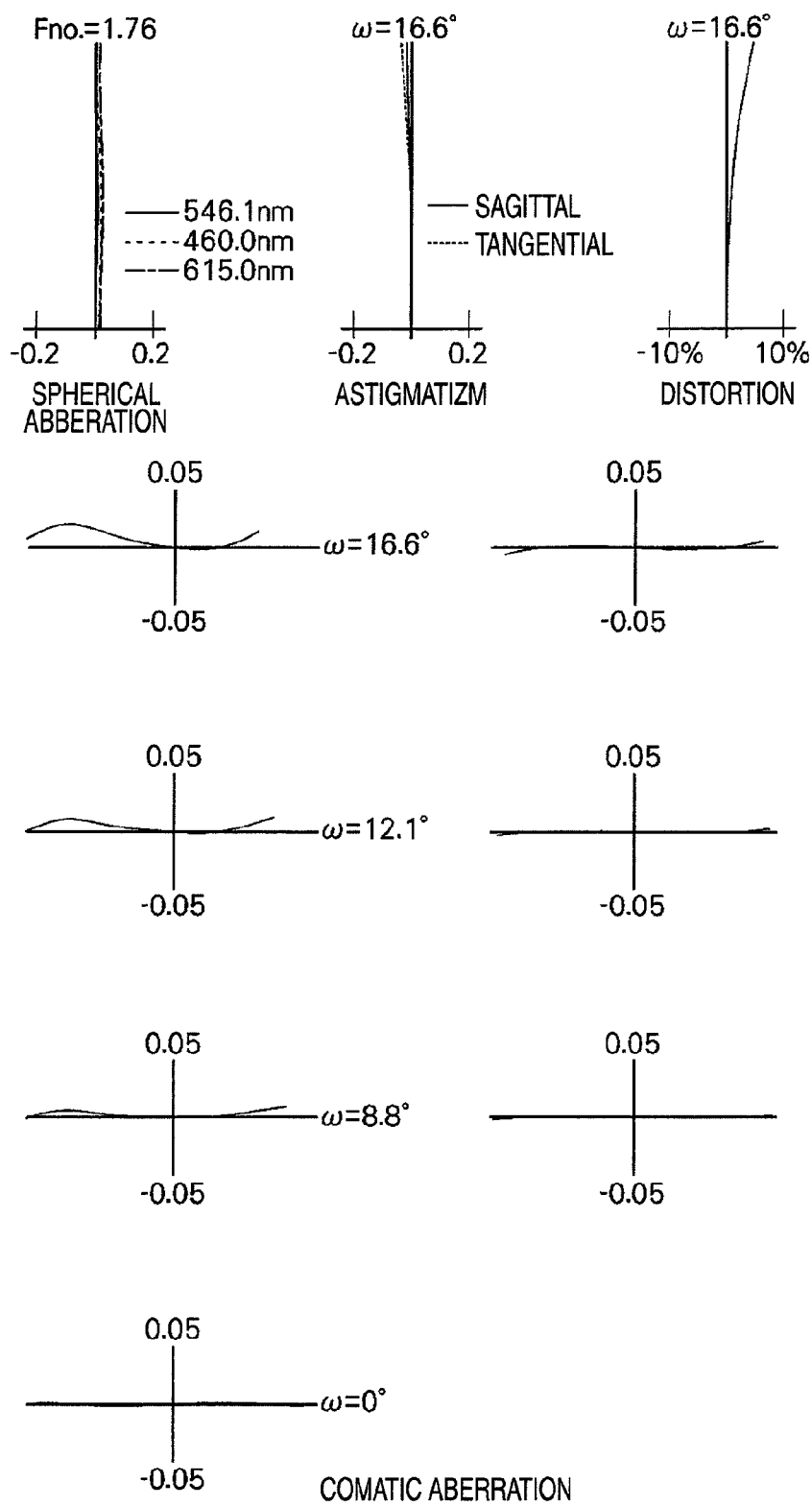
FIG. 26 is a diagram illustrating aberrations of the high power zoom lens system according to Example 3 of the invention.
Figure 27:
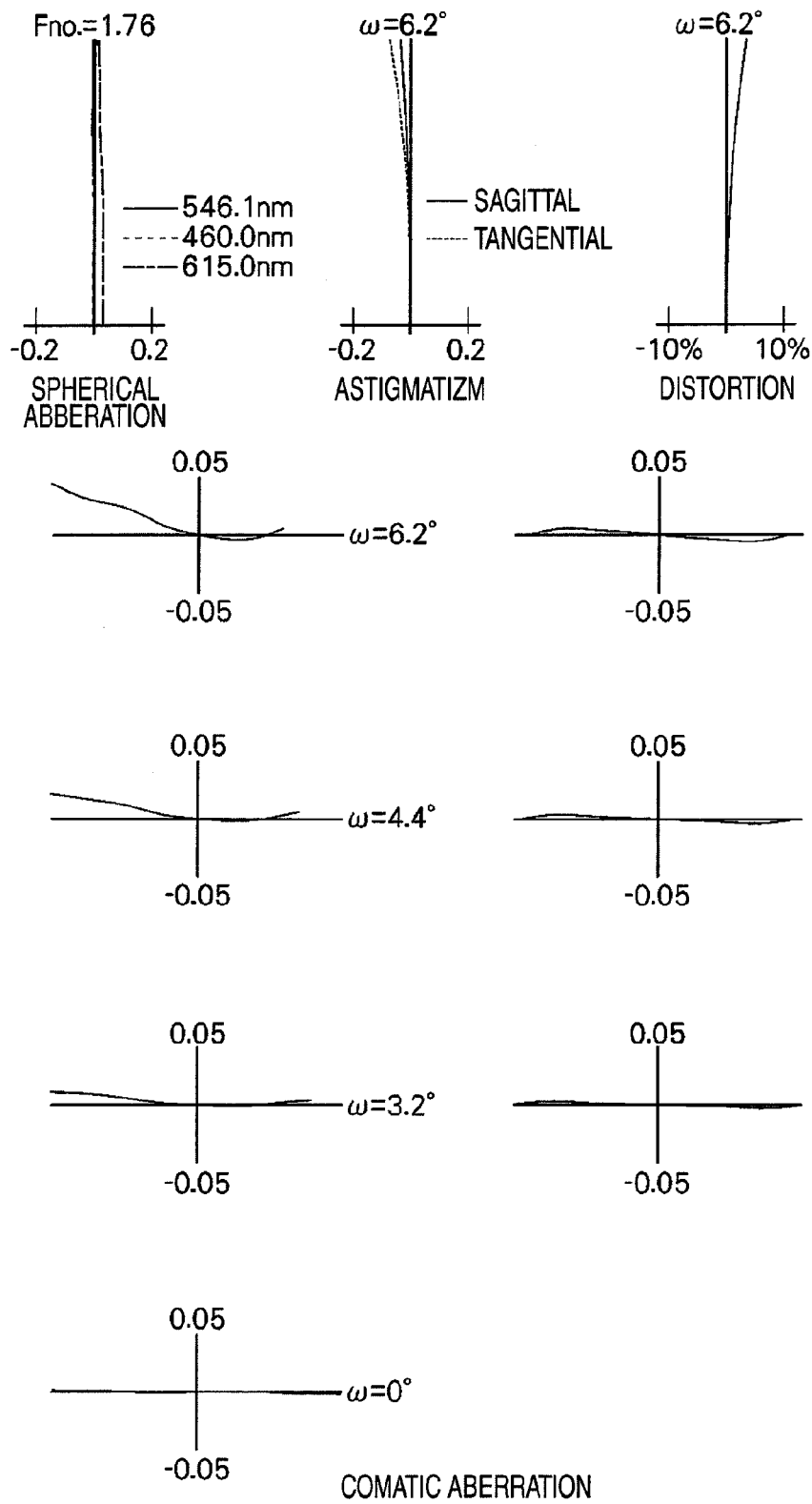
FIG. 27 is a diagram illustrating aberrations of the high power zoom lens system according to Example 3 of the invention.
Figure 28:
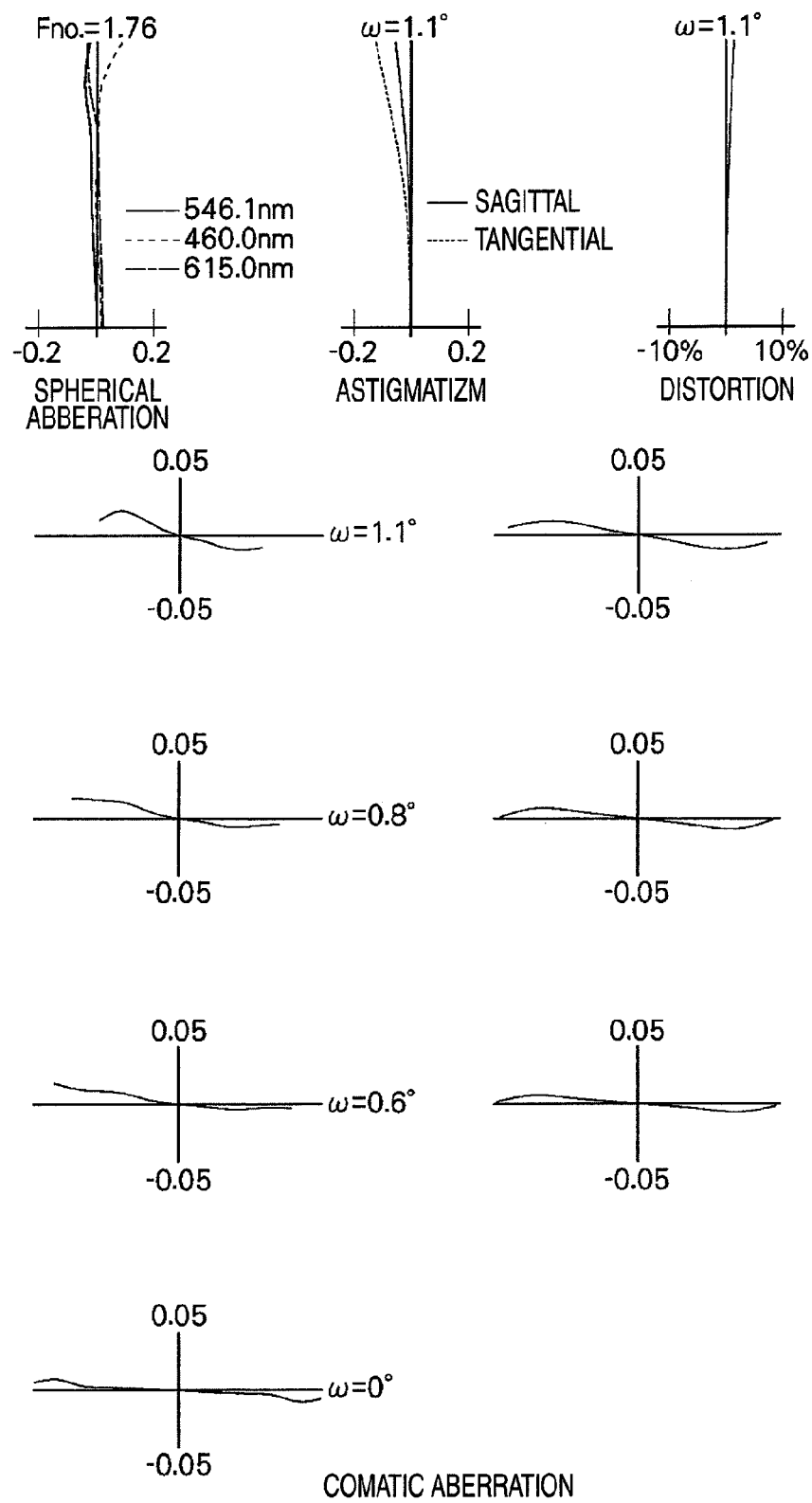
FIG. 28 is a diagram illustrating aberrations of the high power zoom lens system according to Example 3 of the invention.
Figure 29:
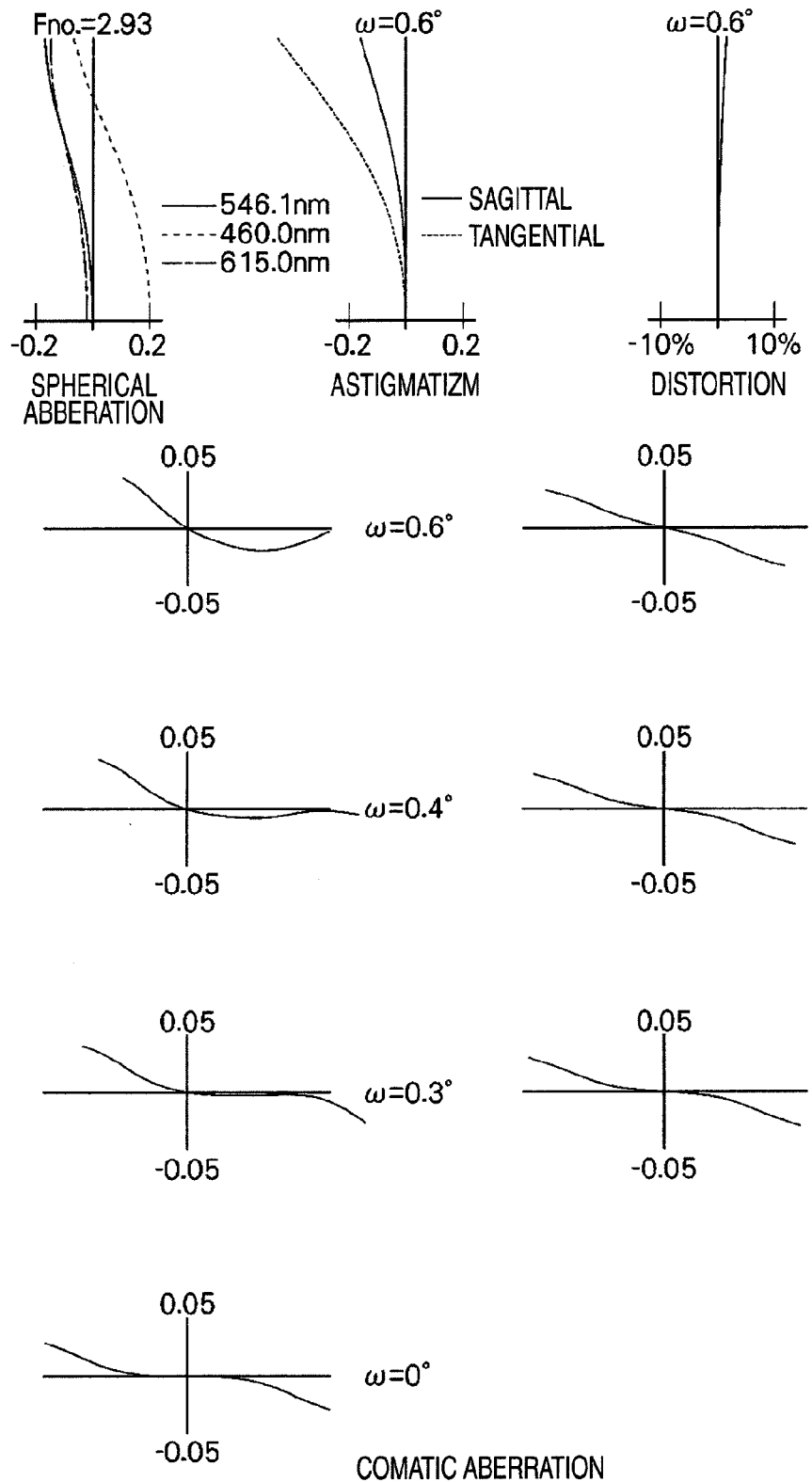
FIG. 29 is a diagram illustrating aberrations of the high power zoom lens system according to Example 3 of the invention.
Figure 30:
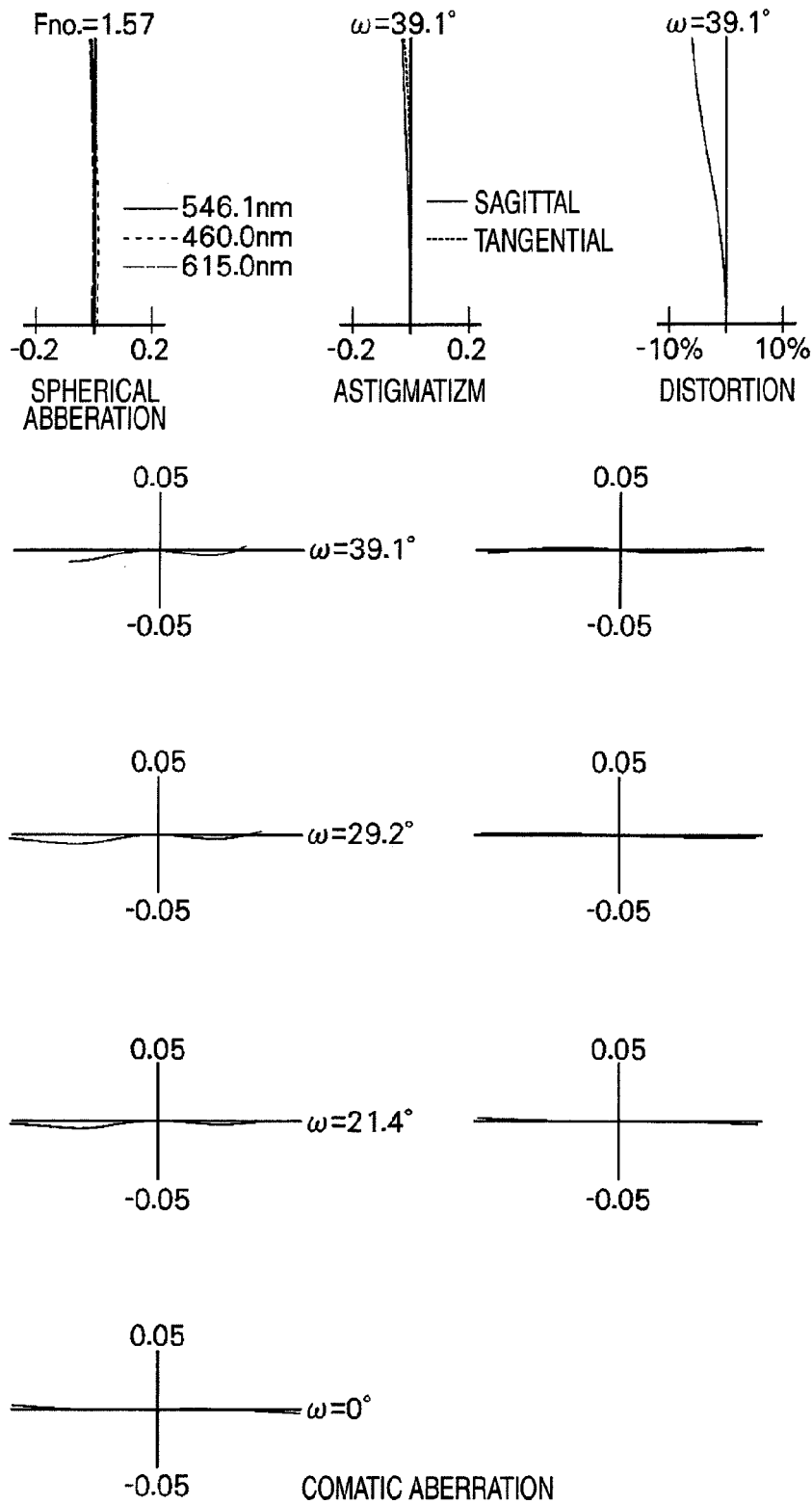
FIG. 30 is a diagram illustrating aberrations of the high power zoom lens system according to Example 4 of the invention.
Figure 32:
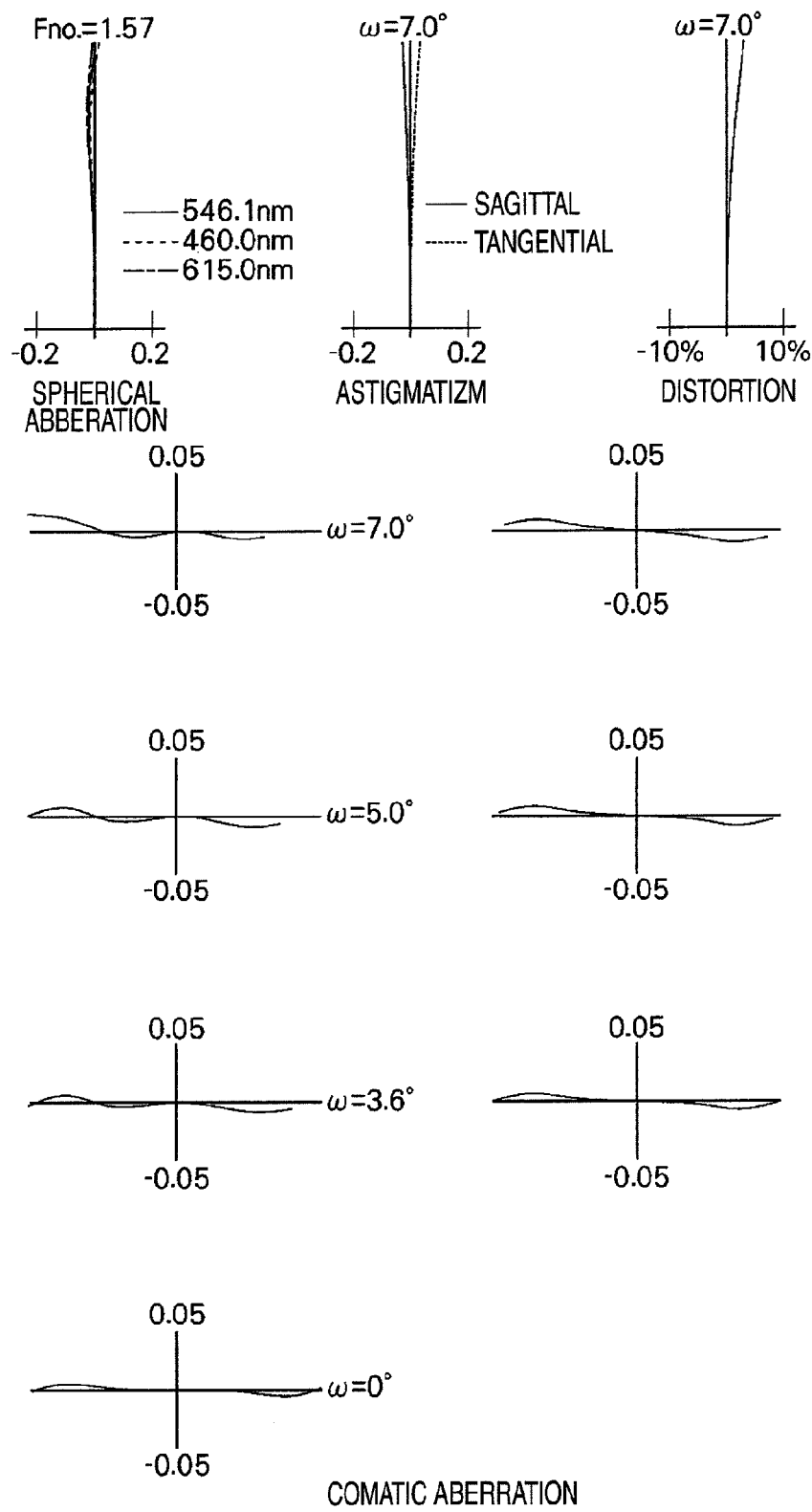
FIG. 32 is a diagram illustrating aberrations of the high power zoom lens system according to Example 4 of the invention.
Figure 33:
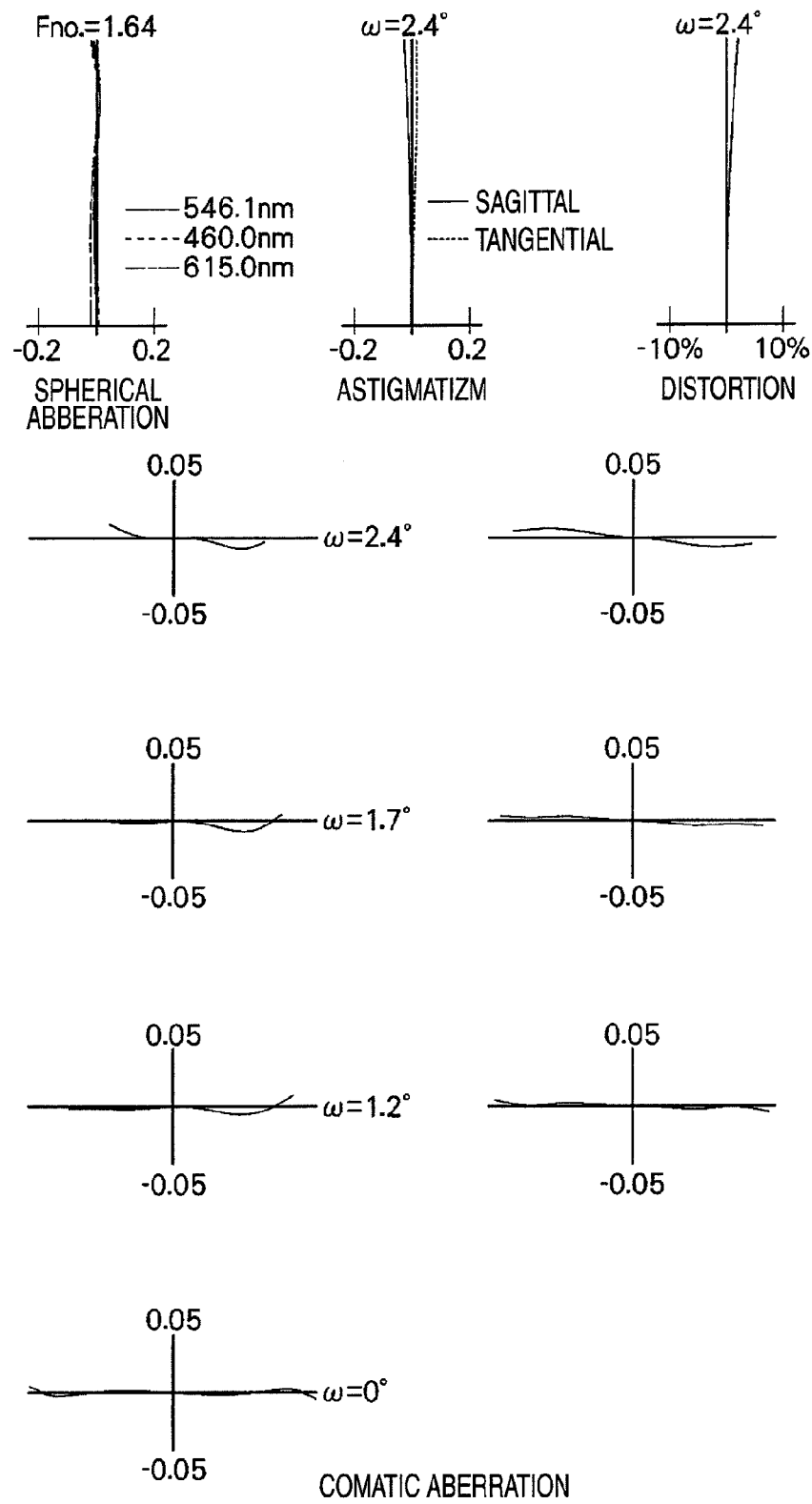
FIG. 33 is a diagram illustrating aberrations of the high power zoom lens system according to Example 4 of the invention.
Figure 34:
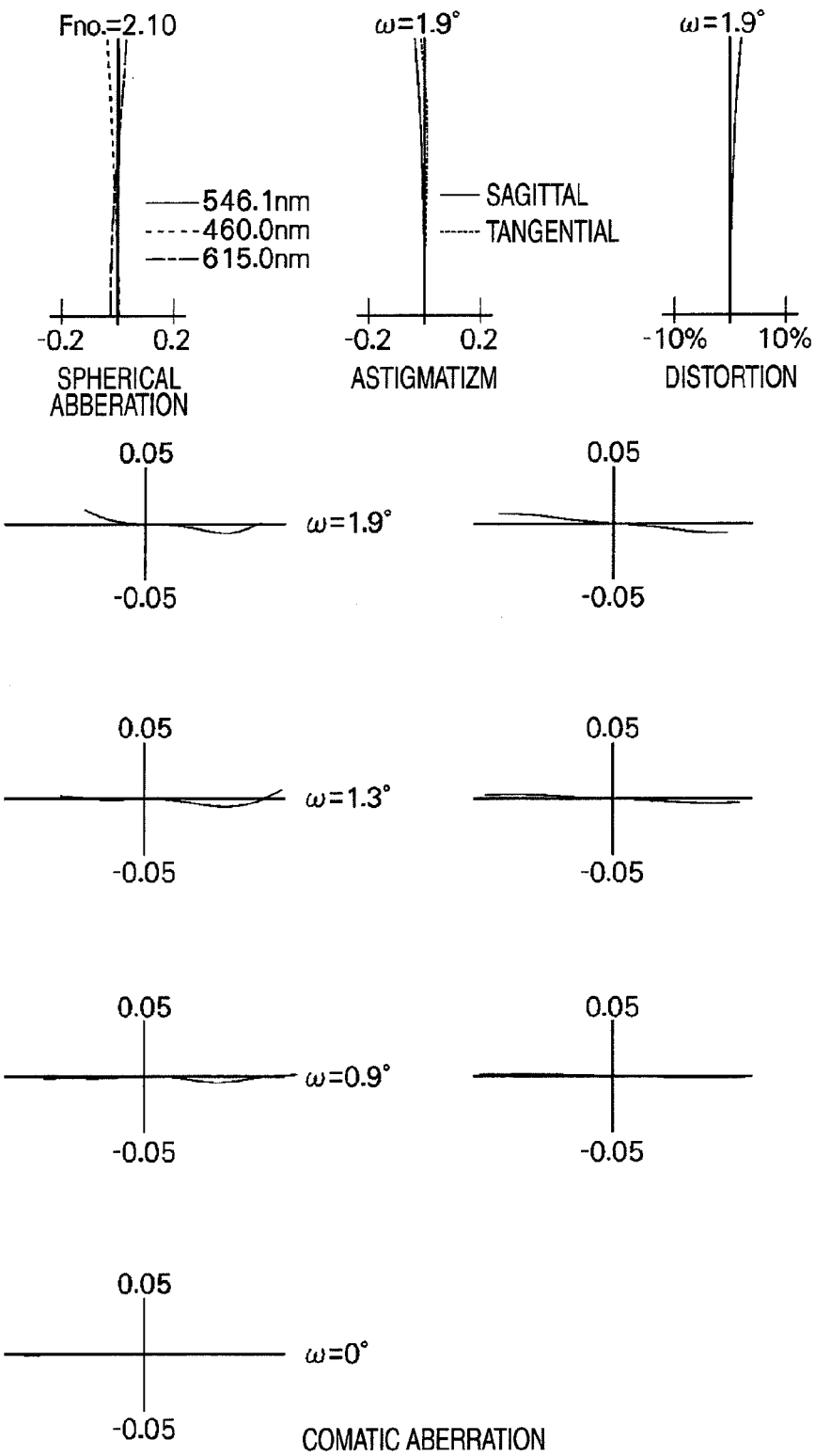
FIG. 34 is a diagram illustrating aberrations of the high power zoom lens system according to Example 4 of the invention.
Figure 35:
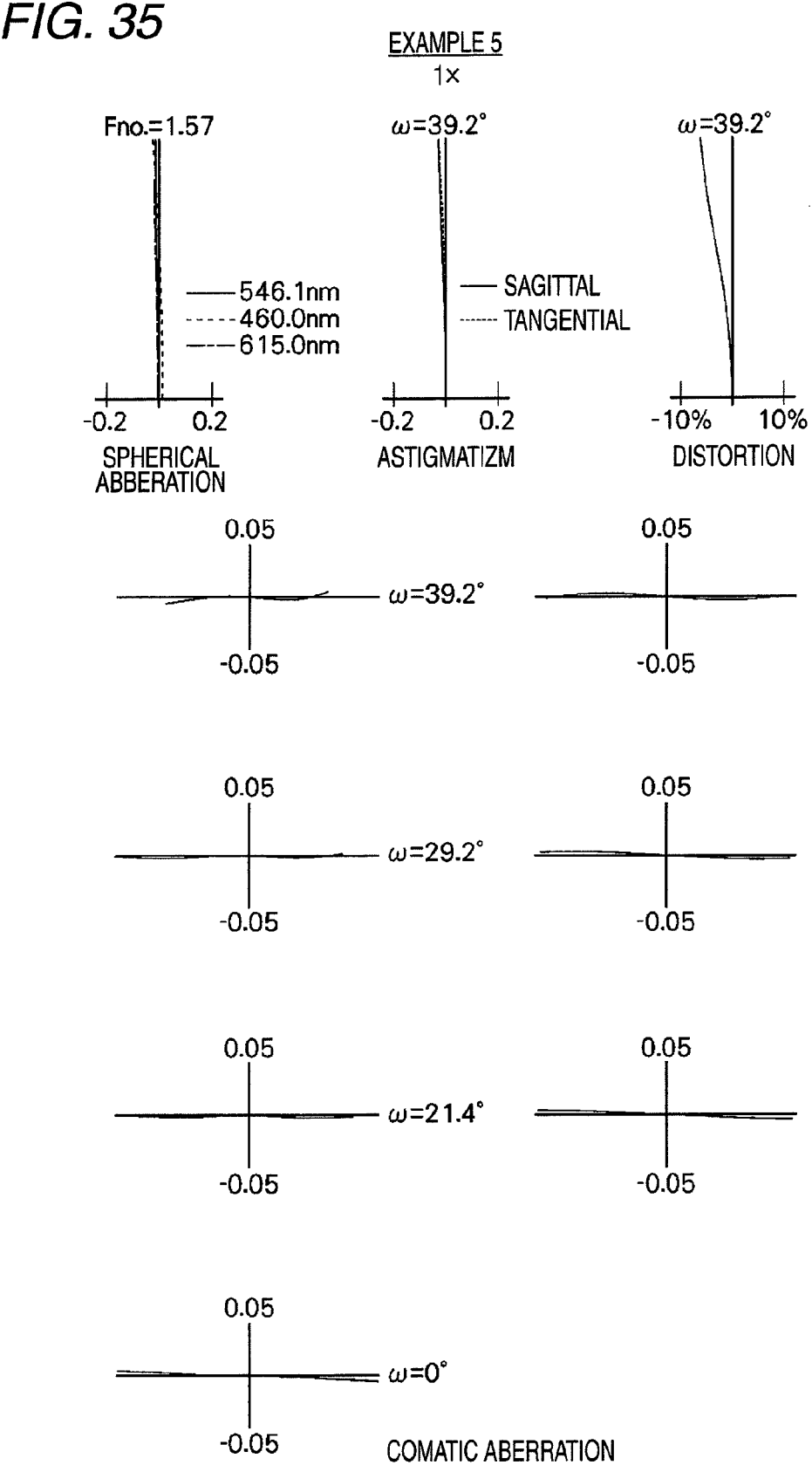
FIG. 35 is a diagram illustrating aberrations of the high power zoom lens system according to Example 5 of the invention.
Figure 37:
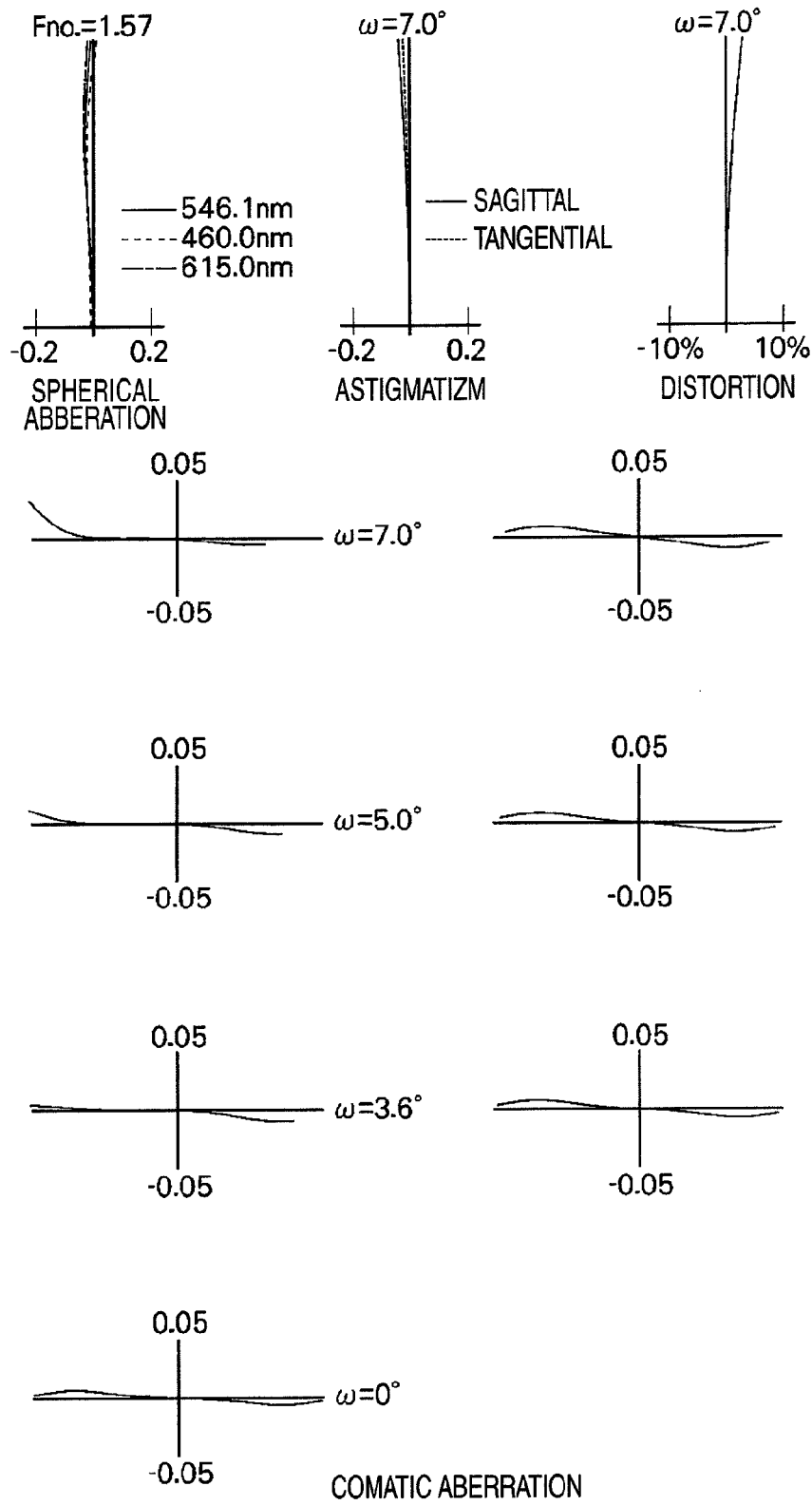
FIG. 37 is a diagram illustrating aberrations of the high power zoom lens system according to Example 5 of the invention.
Figure 38:
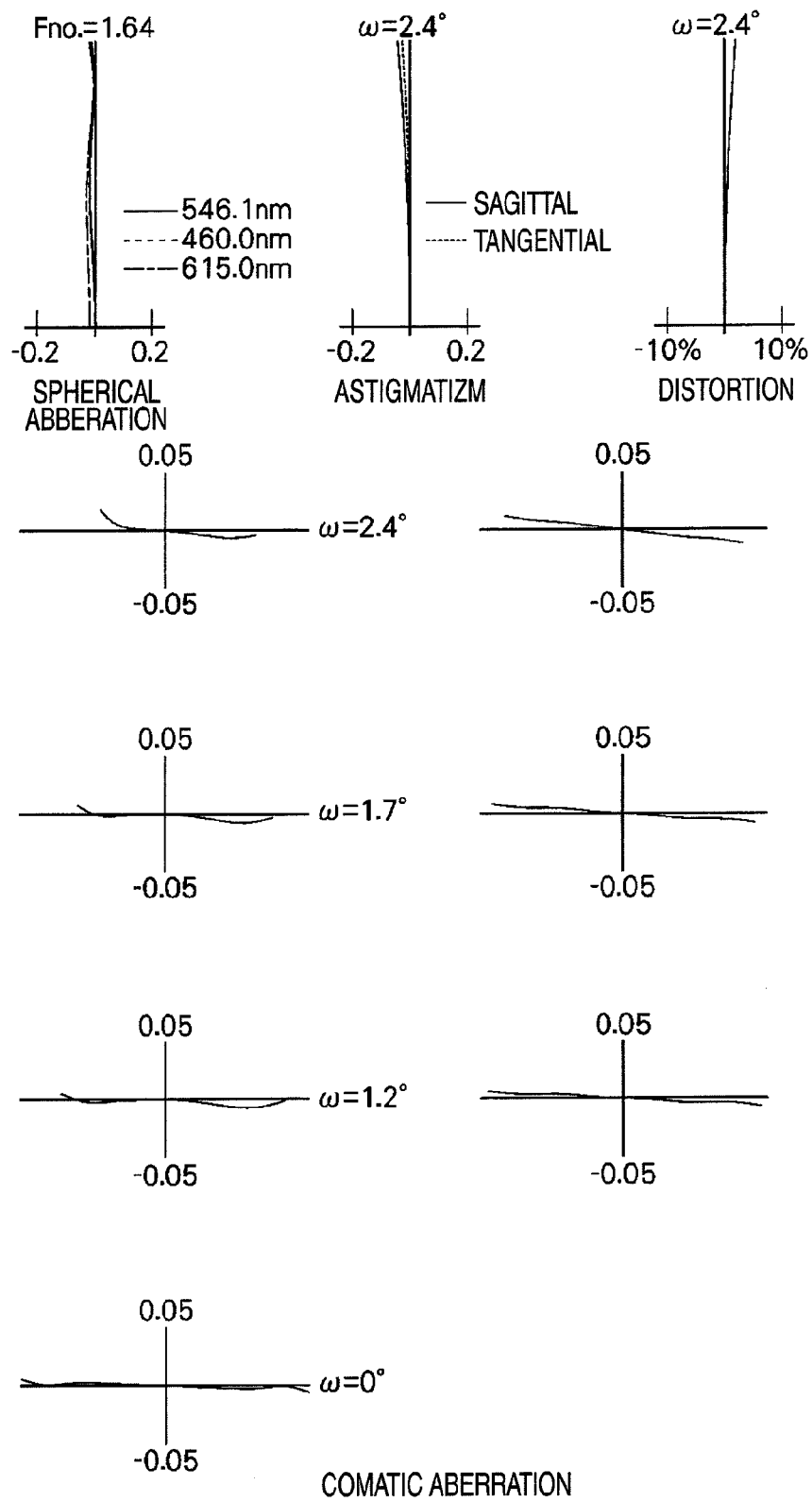
FIG. 38 is a diagram illustrating aberrations of the high power zoom lens system according to Example 5 of the invention.
Figure 39:
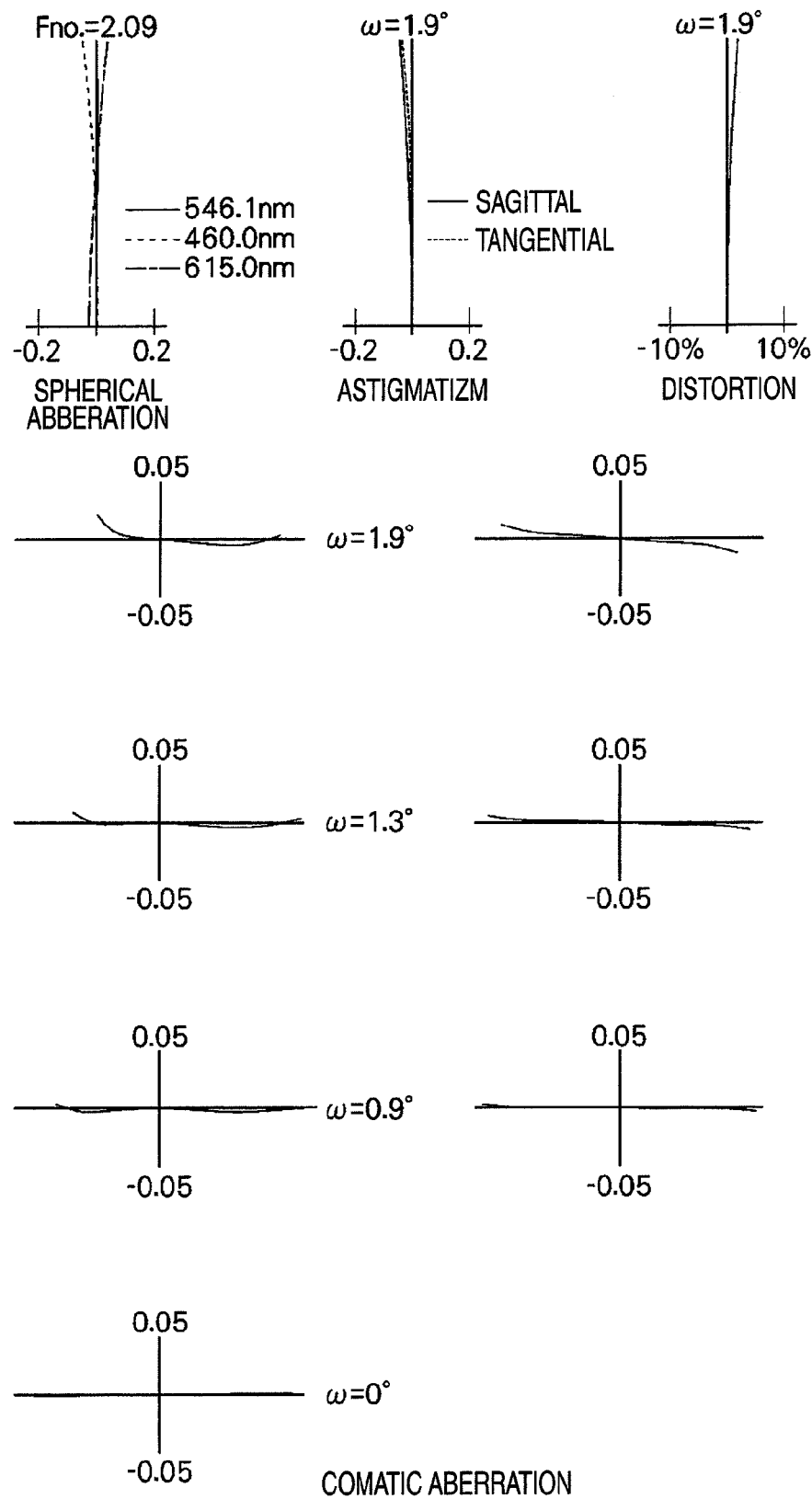
FIG. 39 is a diagram illustrating aberrations of the high power zoom lens system according to Example 5 of the invention.
Figure 41:
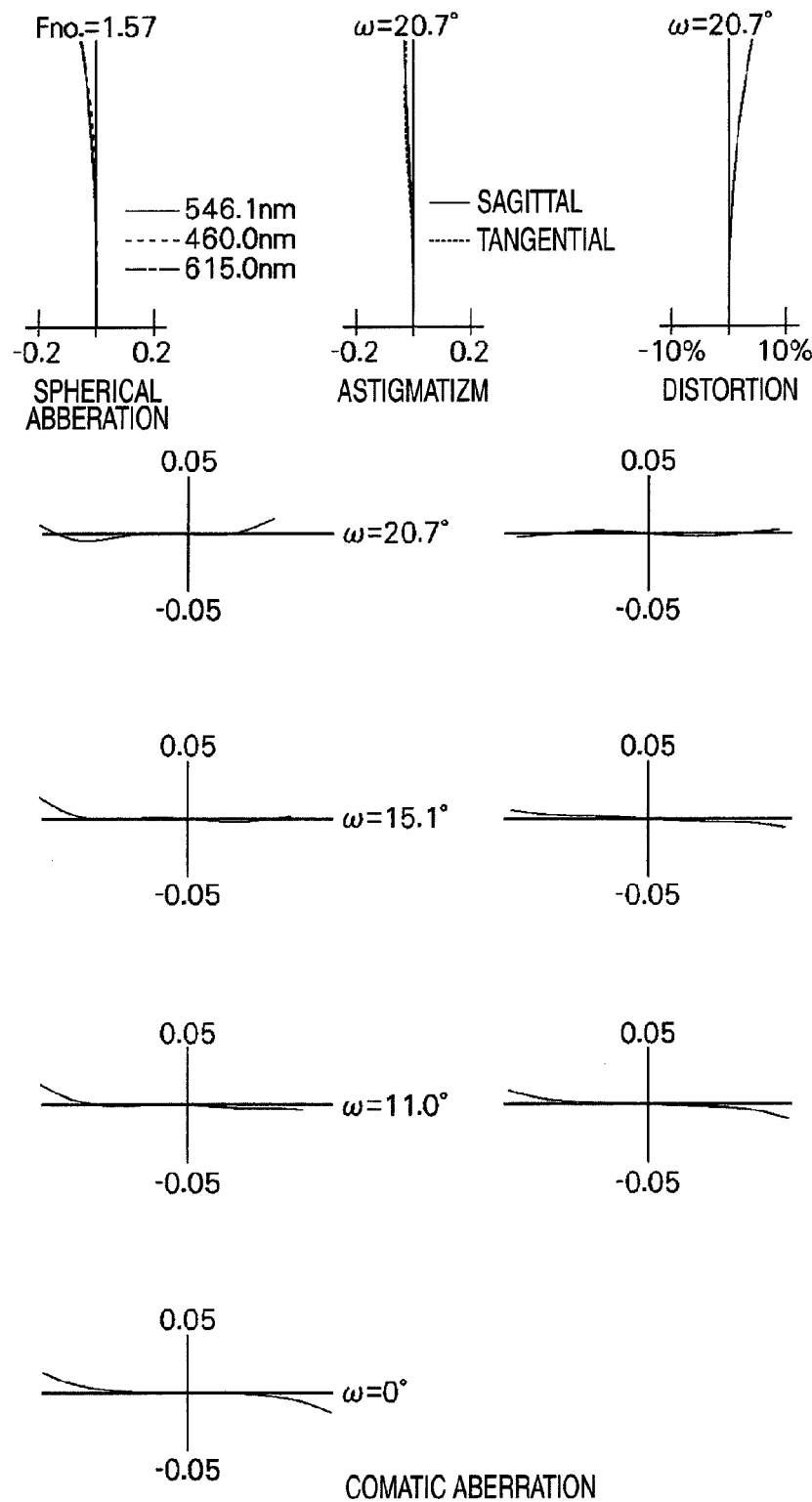
FIG. 41 is a diagram illustrating aberrations of the high power zoom lens system according to Example 6 of the invention.
Figure 42:
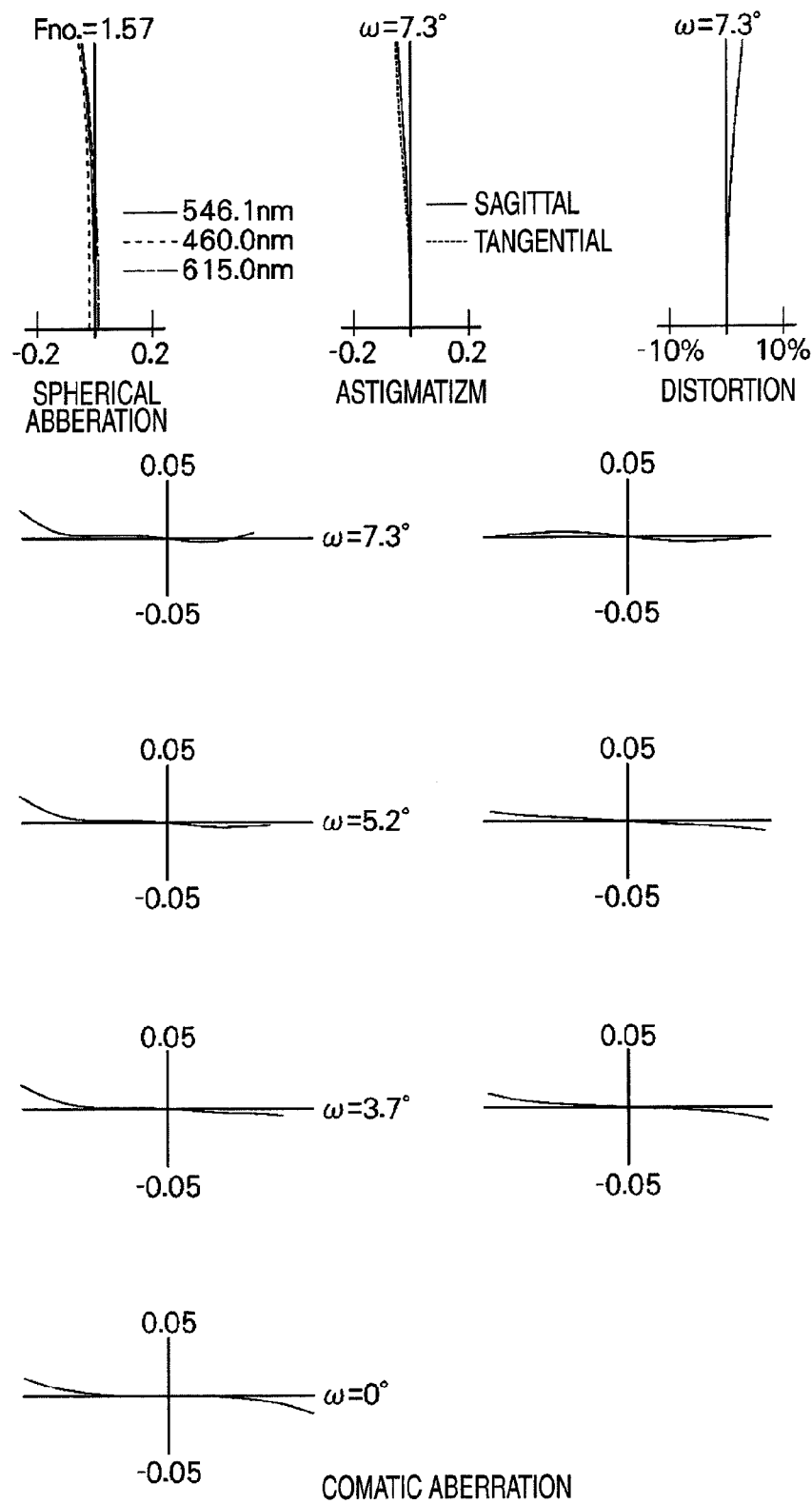
FIG. 42 is a diagram illustrating aberrations of the high power zoom lens system according to Example 6 of the invention.
Figure 43:
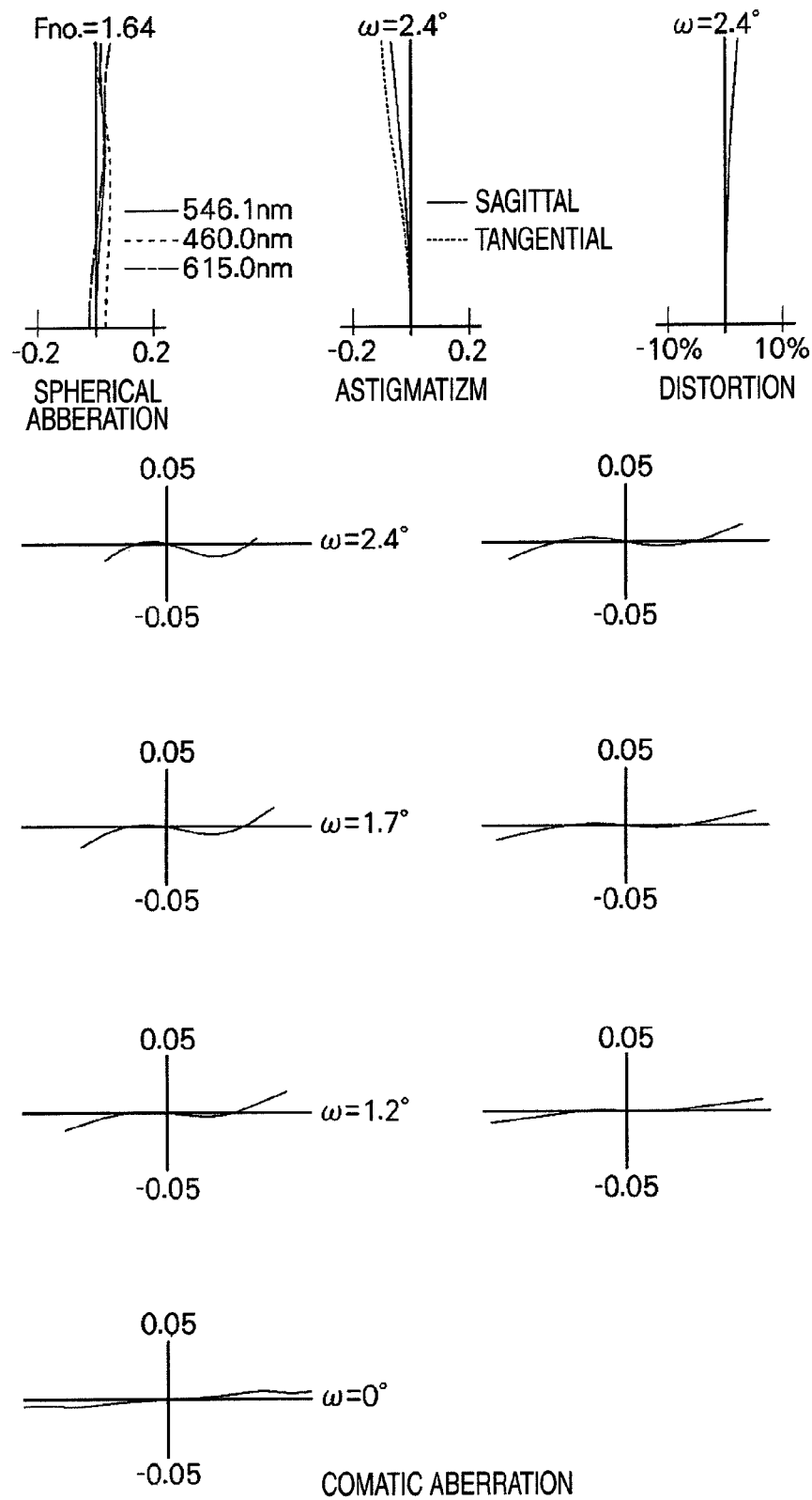
FIG. 43 is a diagram illustrating aberrations of the high power zoom lens system according to Example 6 of the invention.
Figure 44:
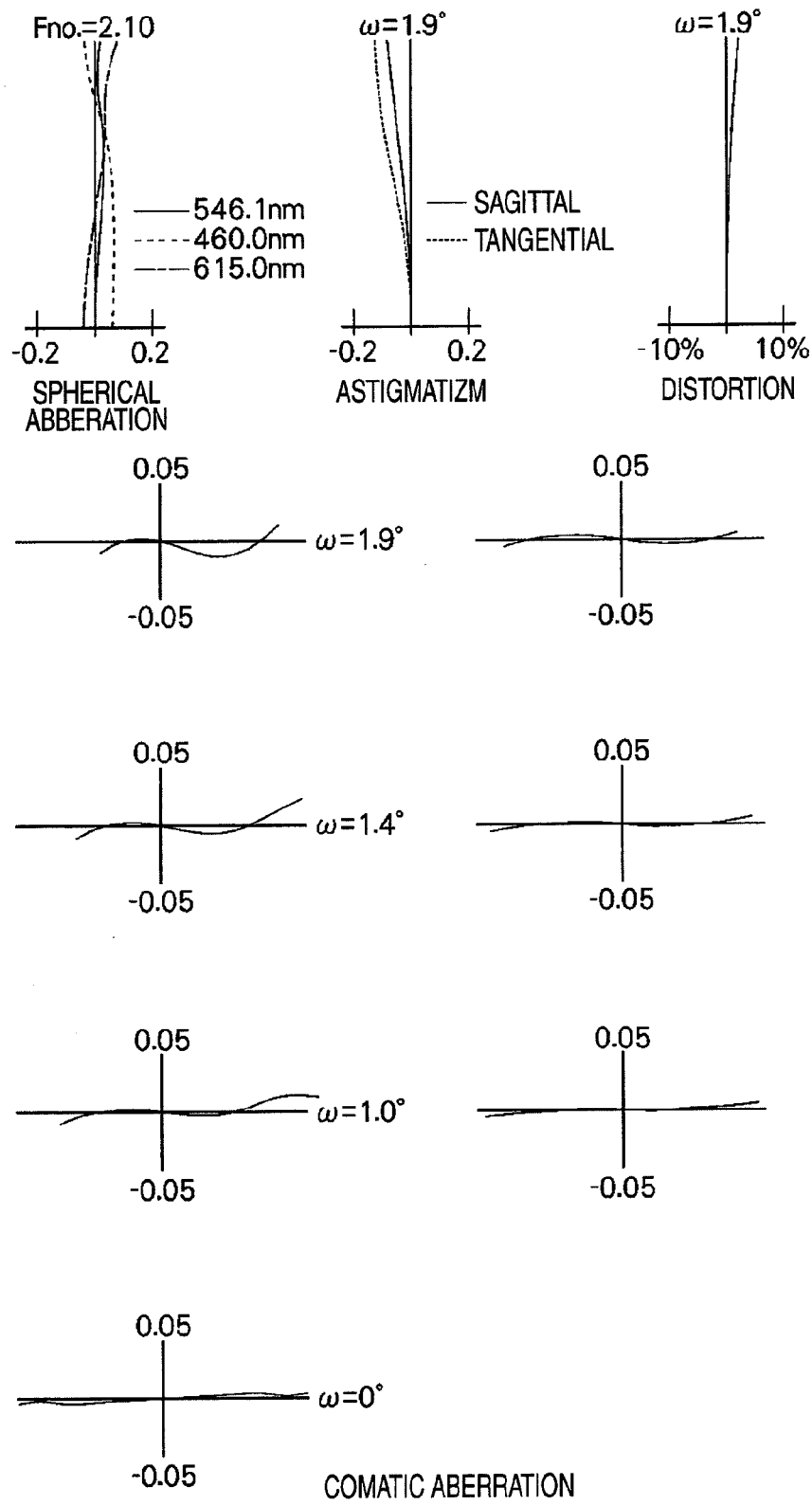
FIG. 44 is a diagram illustrating aberrations of the high power zoom lens system according to Example 6 of the invention.
Figure 45:
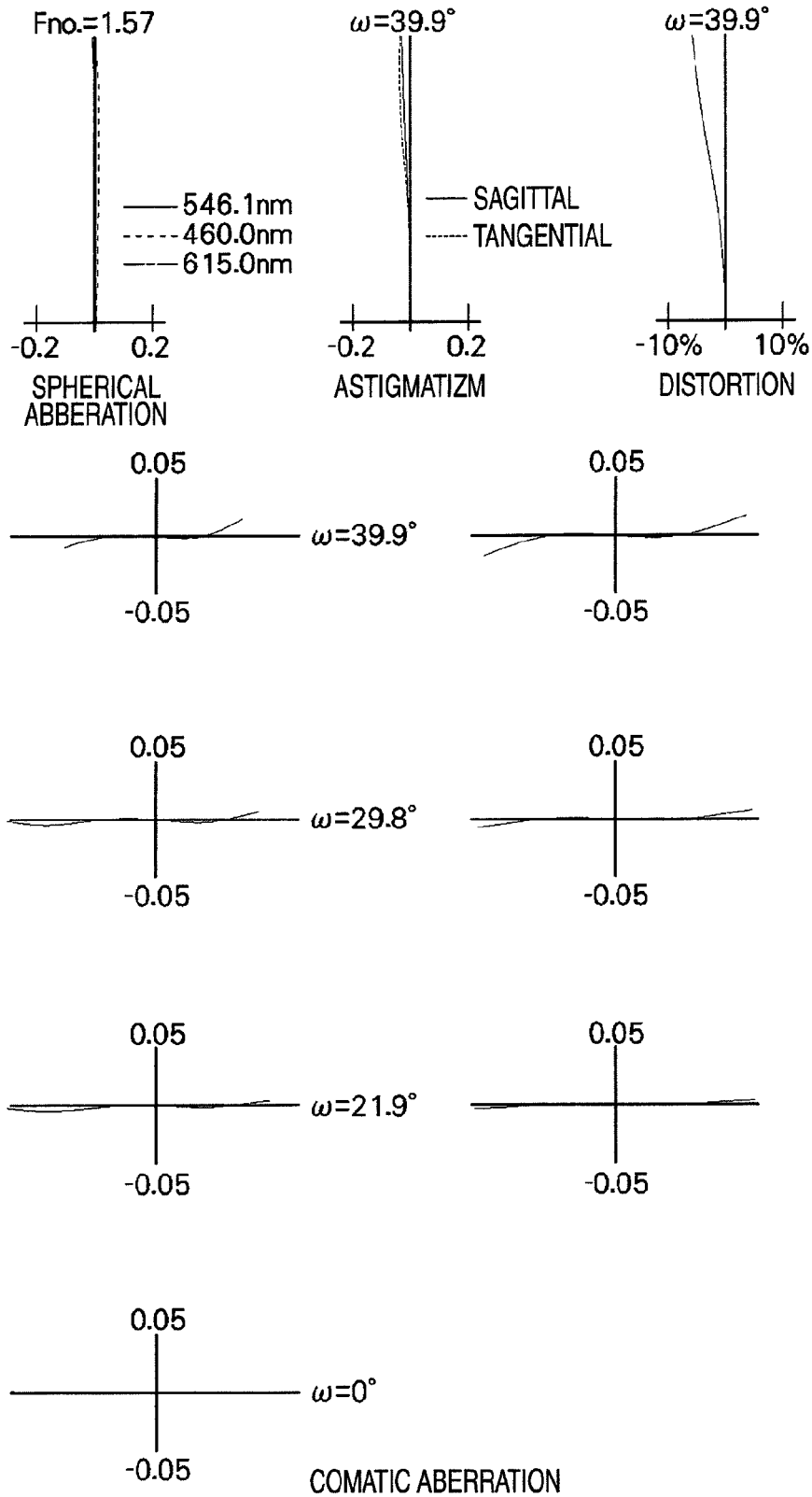
FIG. 45 is a diagram illustrating aberrations of the high power zoom lens system according to Example 7 of the invention.
Figure 46:
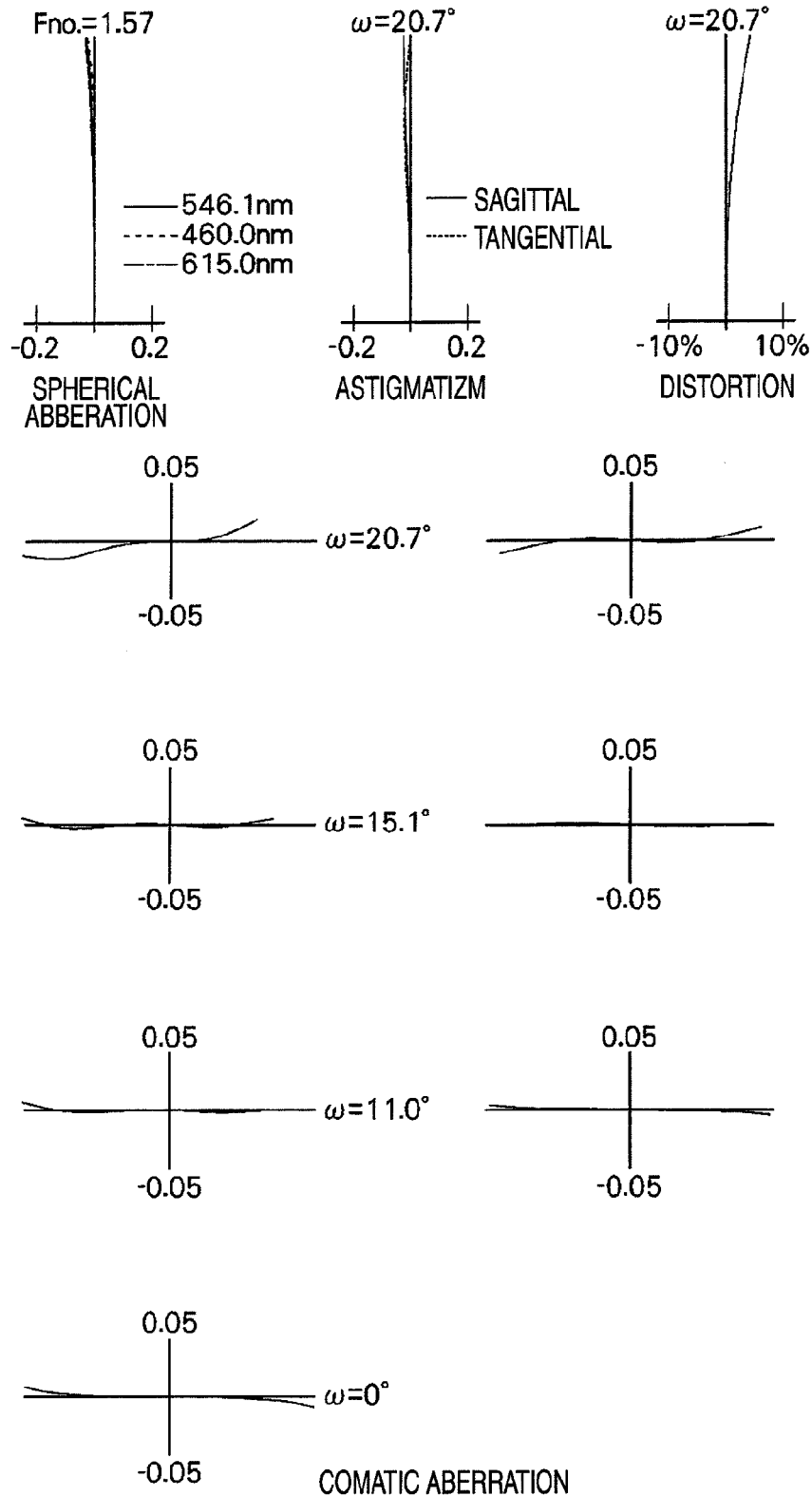
FIG. 46 is a diagram illustrating aberrations of the high power zoom lens system according to Example 7 of the invention.
Figure 47:
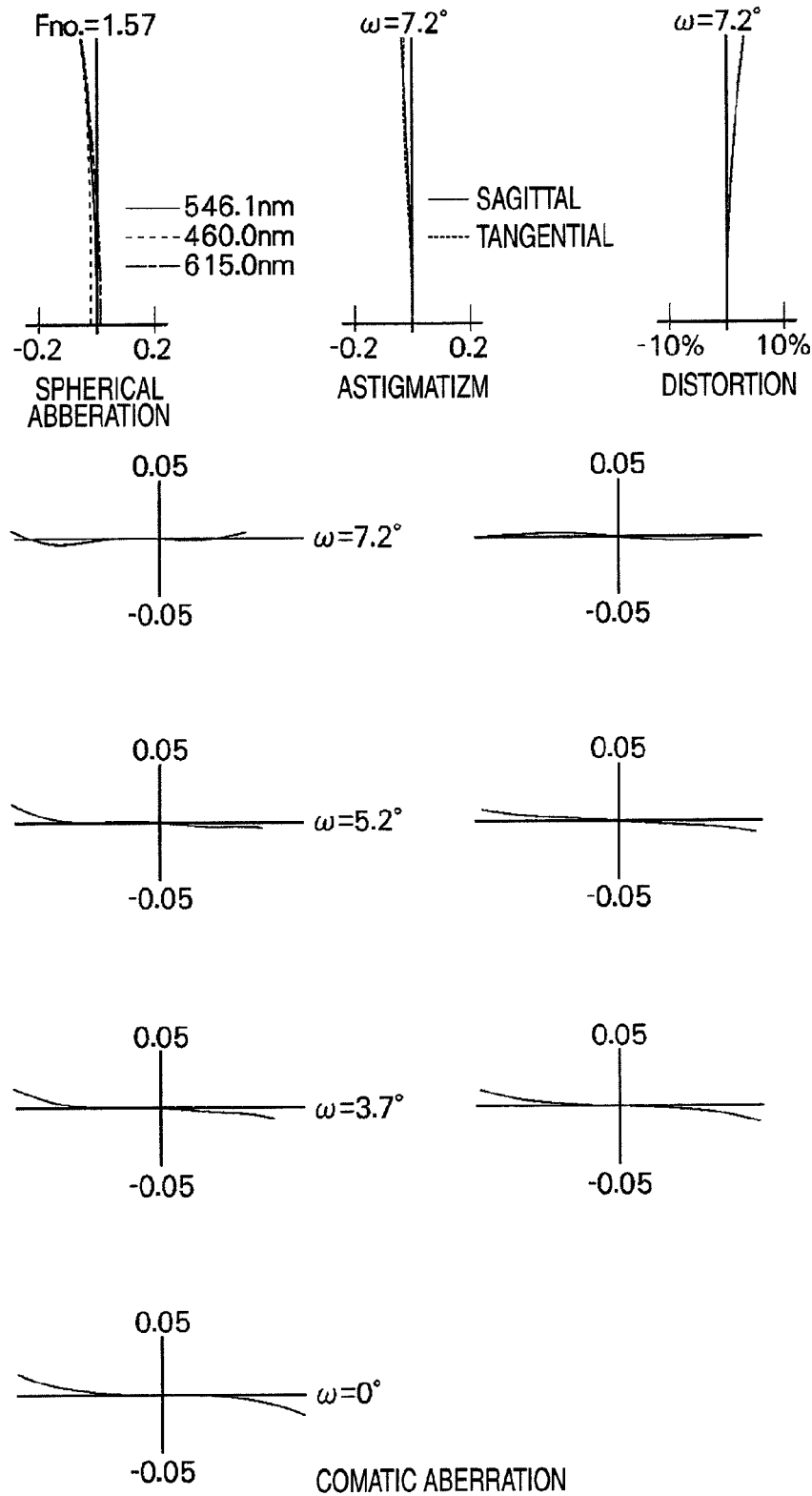
FIG. 47 is a diagram illustrating aberrations of the high power zoom lens system according to Example 7 of the invention.
Figure 48:
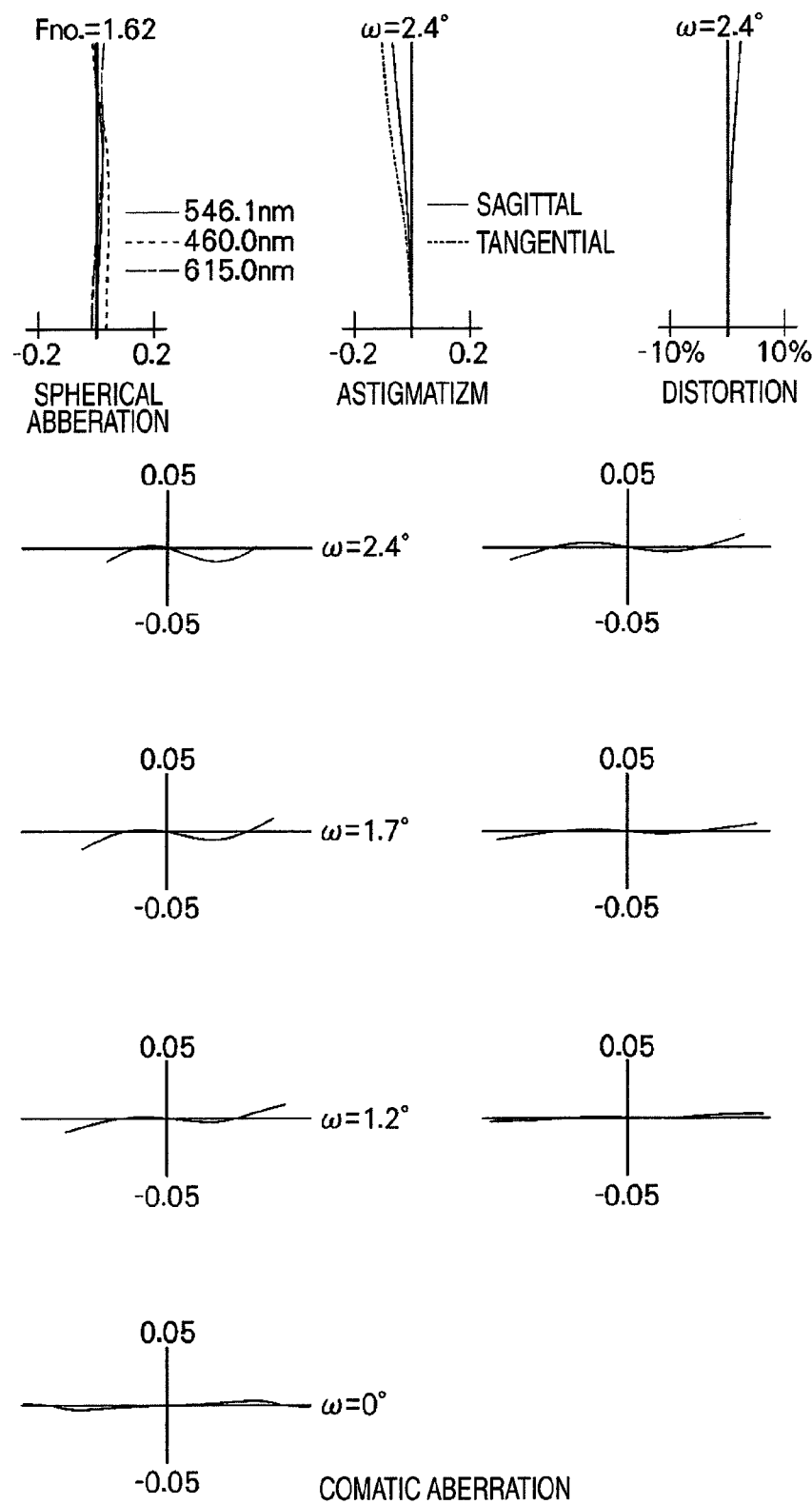
FIG. 48 is a diagram illustrating aberrations of the high power zoom lens system according to Example 7 of the invention.
Figure 49:
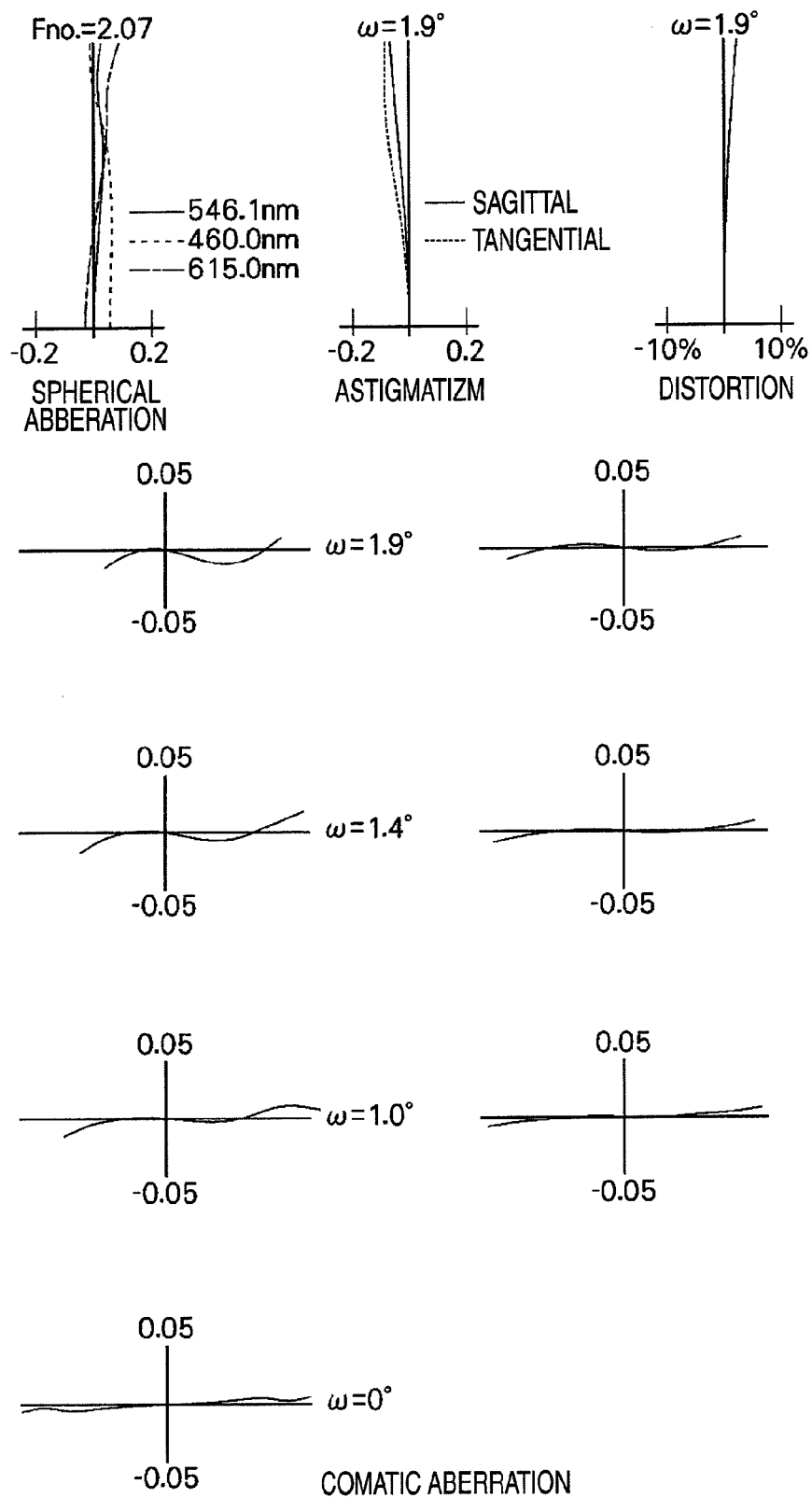
FIG. 49 is a diagram illustrating aberrations of the high power zoom lens system according to Example 7 of the invention.

A lens sectional diagram of Example 7 is shown in FIG. 7, and the detailed configuration is shown in FIGS. 14A to 14C. FIG. 14A shows a detailed configuration of the first lens group G1 and the second lens group G2. FIG. 14B shows a detailed configuration of the third lens group G3 and the fourth lens group G4. FIG. 14C shows a detailed configuration from the fifth lens group G5 to the imaging plane Sim.

In Example 7, the first lens group G1 has a twelve-lens configuration of lenses L1 to L12, the second lens group G2 has a five-lens configuration of lenses L21 to L25, the third lens group G3 has an two-lens configuration of lenses L31 to L32, the fourth lens group has a three-lens configuration of lenses L41 to L43, and the fifth lens group G5 has an eleven-lens configuration of lenses L51 to L61 and an aperture diaphragm St.

The surface data of the high power zoom lens system according to Example 7 is represented in Table 19. The various data thereof is represented in Table 20. The aspheric data thereof is represented in Table 21.

TABLE 19

Surface data of Example 7

| S No. | Ri | Di | Nej | vdj |
|---|---|---|---|---|
| 1 | 471.8856 | 4.000 | 1.76670 | 50.8 |
| 2 | 107.0997 | 35.626 | | |
| 3 | −548.5623 | 3.500 | 1.74696 | 52.1 |
| 4 | −2758.8744 | 10.432 | | |
| 5 | −238.3734 | 3.500 | 1.74504 | 52.1 |
| 6 | 672.3160 | 1.000 | | |
| 7 | 320.1460 | 14.215 | 1.81263 | 25.4 |
| 8 | −916.9169 | 2.399 | | |
| 9 | −1000.0021 | 3.500 | 1.81263 | 25.4 |
| 10 | 642.8456 | 1.990 | | |
| 11 | 1177.3627 | 22.493 | 1.43496 | 95.1 |
| 12 | −162.7812 | 0.120 | | |
| 13 | 1111.4752 | 8.601 | 1.43496 | 95.1 |
| 14 | −529.6422 | 32.584 | | |
| 15 | 207.4894 | 17.566 | 1.43496 | 95.1 |
| 16 | −881.0461 | 0.120 | | |
| 17 | 243.3380 | 3.600 | 1.72309 | 29.5 |
| 18 | 142.6850 | 3.988 | | |
| 19 | 178.8674 | 26.727 | 1.43496 | 95.1 |
| 20 | −241.3928 | 0.120 | | |
| 21 | 146.9731 | 9.042 | 1.49845 | 81.6 |
| 22 | 256.3268 | 0.120 | | |
| 23 | 136.0393 | 10.172 | 1.49845 | 81.6 |
| 24 | 270.9493 | Variable | | |
| *25 | 66.1208 | 2.000 | 1.74503 | 52.4 |
| 26 | 31.3759 | 10.280 | | |
| 27 | −56.9658 | 1.700 | 1.71827 | 53.7 |
| 28 | −1390.3706 | 3.705 | | |
| 29 | −53.0736 | 1.700 | 1.71896 | 53.5 |
| 30 | 184.2186 | 9.593 | 1.81263 | 25.4 |
| 31 | −43.8886 | 1.700 | 1.80811 | 46.6 |
| 32 | −180.1923 | Variable | | |
| 33 | −203.1177 | 5.281 | 1.43985 | 95.0 |
| 34 | −82.2667 | 0.120 | | |
| 35 | −2518.7369 | 5.390 | 1.43985 | 95.0 |
| 36 | −115.4051 | Variable | | |
| 37 | 183.6760 | 9.650 | 1.49845 | 81.6 |
| 38 | −84.0616 | 1.800 | 1.85495 | 23.9 |
| 39 | −173.6069 | 0.120 | | |
| 40 | 138.7716 | 7.227 | 1.49845 | 81.6 |
| 41 | −194.7397 | Variable | | |
| 42 | ∞(AP) | 8.128 | | |
| 43 | −47.6704 | 1.800 | 1.77621 | 49.6 |
| 44 | 33.5433 | 7.149 | 1.81263 | 25.4 |
| 45 | −76.3602 | 2.199 | | |
| 46 | −34.8219 | 1.800 | 1.80811 | 46.6 |
| 47 | 75.9944 | 7.723 | 1.81263 | 25.4 |
| 48 | 458.4338 | 1.488 | | |
| 49 | −140.0741 | 12.452 | 1.57088 | 63.1 |
| 50 | −33.8326 | 8.950 | | |
| 51 | 292.6897 | 1.800 | 1.88814 | 40.8 |
| 52 | 58.5398 | 1.015 | | |
| 53 | 50.0358 | 8.143 | 1.51825 | 64.1 |
| 54 | −96.5643 | 0.128 | | |
| 55 | 45.3705 | 1.800 | 1.81643 | 22.8 |
| 56 | 28.8667 | 10.776 | 1.48915 | 70.2 |
| 57 | −111.4376 | 0.120 | | |
| 58 | 83.9654 | 1.800 | 1.88814 | 40.8 |
| 59 | 27.0916 | 12.130 | 1.62033 | 63.4 |
| 60 | −595.4431 | 0.000 | | |
| 61 | ∞ | 33.000 | 1.61170 | 46.5 |
| 62 | ∞ | 13.200 | 1.51825 | 64.1 |

TABLE 19-continued

Surface data of Example 7

| S No. | Ri | Di | Nej | vdj |
|---|---|---|---|---|
| 63 | ∞ | 13.852 | | |
| IP | ∞ | | | |

TABLE 20

Various data of Example 7

| | D24 | D32 | D36 | D41 |
|---|---|---|---|---|
| 1x | 3.913 | 153.550 | 10.731 | 1.999 |
| 2x | 43.083 | 112.025 | 4.129 | 10.956 |
| 6x | 79.436 | 61.162 | 0.120 | 29.476 |
| 18x | 98.955 | 13.167 | 4.892 | 53.180 |
| 23x | 100.013 | 1.998 | 0.119 | 68.064 |

| Focal length | 6.99~160.82 |
|---|---|
| Fno. | 1.57~2.07 |

TABLE 21

Aspheric data of Example 7
25th surface

| K | 1.000000E+00 |
|---|---|
| B3 | −1.683393E−08 |
| B4 | 2.319437E−07 |
| B5 | −6.513375E−09 |
| B6 | 1.246893E−09 |
| B7 | −1.593159E−10 |
| B8 | 1.032305E−11 |
| B9 | −2.695025E−13 |
| B10 | −5.878776E−16 |
| B11 | −3.991885E−16 |
| B12 | 4.464731E−17 |
| B13 | −2.998515E−20 |
| B14 | −9.752273E−20 |
| B15 | 4.298170E−22 |
| B16 | 1.761547E−22 |
| B17 | −7.960822E−25 |
| B18 | −3.407646E−25 |
| B19 | 1.134646E−26 |
| B20 | −1.137706E−28 |

FIGS. 15 to 49 are aberration diagrams showing spherical aberration, astigmatism, distortion, and comatic aberration at magnifying powers of the high power zoom lens systems according to Examples 1 to 7. In each drawing of FIGS. 15 to 49, example numbers are represented on the top of the drawing, and jut below the numbers, magnifying powers are represented. In the aberration diagrams, there are shown aberrations in which e-line (in spherical aberration diagram, a wavelength of 546.1 nm is applied) is set as a reference wavelength. However, in the spherical aberration diagram, there are also shown aberrations at a wavelength of 460.0 nm and a wavelength of 615.0 nm. The Fno. in the spherical aberration diagram represents an F number, the ω in astigmatism diagram, distortion diagram, and comatic aberration diagram represents a half angle of view. Furthermore, when a unit of surface data is mm, a unit of size of aberration in each aberration diagram is mm.

From the data mentioned above, it can be observed that the high power zoom lens systems according to Examples 1 to 7 is configured to be light in weight and have a high zoom ratio of 23× to 54× magnification and a F number of 1.57 to 1.76 at the wide-angle end. Furthermore, from the aberration diagrams shown in FIGS. 15 to 49, it can be observed that the high power zoom lens systems according to Examples 1 to 7 is configured to satisfactorily correct aberrations and minimize variation of aberrations including spherical aberration and comatic aberration during zooming from the wide-angle end to the telephoto end.

Figure 50:
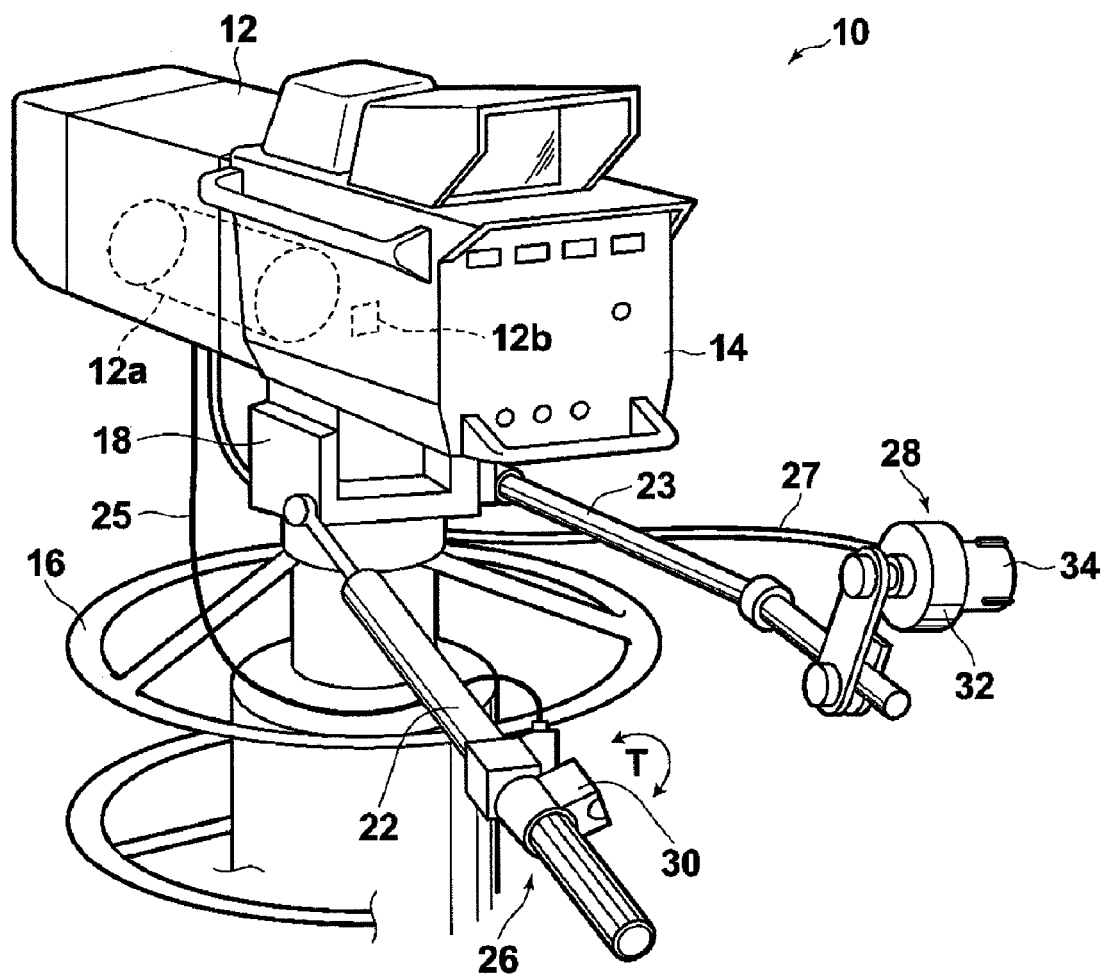
FIG. 50 is a perspective diagram illustrating an image pickup apparatus according to an embodiment of the invention.

Hereinafter, an image pickup apparatus according to an embodiment of the invention will be described. FIG. 50 is a perspective diagram illustrating a television camera 10 which is an image pickup apparatus according to the embodiment of invention. The television camera 10 shown in FIG. 50 includes a lens apparatus 12 and a camera main body 14. The lens apparatus 12 has the high power zoom lens system 12a according to the embodiment of the invention, an image pickup device 12b for taking an object image formed by the high power zoom lens system 12a. Furthermore, in FIG. 50, the high power zoom lens system 12a is schematically illustrated.

The television camera 10 is supported on a pan head 18 installed on the upper part of a pedestal dolly 16 to freely move in a pan direction and a tilt direction. From the pan head 18, two pan rods 22 and 23 manually operated by a camera operator extends rearward. A zoom demand 26 connected to the lens apparatus 12 via a cable 25 is mounted on the end of the pan rod 22. A focus demand 28 connected to the lens apparatus 12 via a cable 27 is mounted on the end of the pan rod 23.

A thumb ring 30 rotatable in both directions from a reference position is disposed on the zoom demand 26. When the thumb ring 30 is rotated by a camera operator, a zoom instruction signal based on an operation amount from the reference position, that is, a rotation amount and a rotation direction is sent from the zoom demand 26 to the lens apparatus 12, and the high power zoom lens 12a of the lens apparatus 12 is zoomed toward the wide-angle side or toward the telephoto side. With such a configuration, zooming is performed by a manual operation.

Meanwhile, in the main body 32 of the focus demand 28 fixedly attached to the pan rod 23, focus ring (rotating member) 34 is provided to freely rotate. When the focus ring 34 is rotated by a camera man, a focus instruction signal based on an operation amount, that is, a rotation amount and a rotation direction is sent from the focus demand 28 to the lens apparatus 12, the focus lens of the lens apparatus 12 is moved toward the near point or toward the infinity. With such a configuration, the focusing is performed by manual operation.

As described above, the high power zoom lens system 12a according to the embodiment of the invention is able to achieve miniaturization with a high zoom ratio and suppress variation of spherical aberration and comatic aberration during zooming thereby having excellent optical performance. Thus, the television camera 10 equipped with the high power zoom lens system 12a is configured to have a small size and a function of a high zoom ratio, and is operable to form a sharp image on the image pickup surface of the image pickup device 12b.

The invention has been hitherto described with reference to embodiments and examples, but is not limited to the embodiments and the examples, and may be modified to various forms. For example, the values of the radius of curvature, the on-axis surface spacing, and the refractive index in the lens components are not limited to the values shown in the numerical examples, and may have different values.

Furthermore, in the embodiment, the television camera has been described as an example of the image pickup apparatus, but the invention is not limited to this, and may be applied to different image pickup apparatuses such as a video camera and a surveillance camera.

What is claimed is:

1. A high power zoom lens system comprising, in order from an object side:
    a first lens group that has a positive refractive power and remains stationary during zooming;
    a second lens group that has a negative refractive power and moving during zooming;
    a third lens group and a fourth lens group that respectively have a positive refractive power and are movable relative to each other to correct image plane variation accompanied by zooming; and
    a fifth lens group that has a positive refractive power and including a stop, the fifth lens group being used to form an image,
    wherein a composite lens group is formed by combining the third lens group and the fourth lens group,
    the second lens group and the composite lens group pass simultaneously through −1× magnification points of the respective groups during zooming from a wide-angle end to a telephoto end, and
    the fourth lens group has at least one aspheric surface.

2. The high power zoom lens system according to claim 1, wherein the fourth lens group includes at least three positive lenses and one negative lens.

3. The high power zoom lens system according to claim 1, wherein the at least one aspheric surface of the fourth lens group has a shape showing that a positive refractive power is gradually reduced from an optical axis toward a periphery of the aspheric surface.

4. The high power zoom lens system according to claim 1, wherein the at least one aspheric surface of the fourth lens group is an object side surface of a positive lens of the fourth lens group closest to an image side.

5. The high power zoom lens system according to claim 1, wherein the third lens group is formed of two or less lenses.

6. The high power zoom lens system according to claim 1, wherein the second lens group has at least one aspheric surface.

7. The high power zoom lens system according to claim 6, wherein the at least one aspheric surface of the second lens group is a surface of a negative lens of the second lens group closest to the object side.

8. An image pickup apparatus comprising:
    the high power zoom lens system according to claim 1; and
    an image pickup device taking an object image formed by the high power zoom lens system.

* * * * *